(12) United States Patent
Okada et al.

(10) Patent No.: US 10,121,603 B2
(45) Date of Patent: Nov. 6, 2018

(54) DYE-SENSITIZED SOLAR CELL ELEMENT

(71) Applicant: FUJIKURA LTD., Tokyo (JP)

(72) Inventors: Kenichi Okada, Chiba (JP); Takeshi Yamaguchi, Tokyo (JP); Katsuyoshi Endo, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 55 days.

(21) Appl. No.: 14/778,135

(22) PCT Filed: Dec. 18, 2013

(86) PCT No.: PCT/JP2013/083825
§ 371 (c)(1),
(2) Date: Sep. 18, 2015

(87) PCT Pub. No.: WO2014/162640
PCT Pub. Date: Oct. 9, 2014

(65) Prior Publication Data
US 2016/0284478 A1   Sep. 29, 2016

(30) Foreign Application Priority Data

Mar. 30, 2013 (JP) .................................. 2013-075451
Mar. 30, 2013 (JP) .................................. 2013-075452

(51) Int. Cl.
*H01G 9/20* (2006.01)
*H01M 14/00* (2006.01)

(52) U.S. Cl.
CPC ......... *H01G 9/2077* (2013.01); *H01G 9/2027* (2013.01); *H01G 9/2068* (2013.01);
(Continued)

(58) Field of Classification Search
CPC .. H01G 9/2068; H01G 9/2022; H01G 9/2095; H01G 9/2081; H01G 9/2027; H01G 9/207
See application file for complete search history.

(56) References Cited

U.S. PATENT DOCUMENTS

2004/0238026 A1   12/2004  Miyoshi
2005/0109391 A1*  5/2005   Kobayashi ........... H01G 9/2004
                                                         136/263
(Continued)

FOREIGN PATENT DOCUMENTS

CN    102792518 A    11/2012
EP    2 369 603 A2    9/2011
(Continued)

OTHER PUBLICATIONS

International Search Report of PCT/JP2013/083825, dated Jan. 21, 2014. [PCT/ISA/210].
(Continued)

*Primary Examiner* — Bethany L Martin
(74) *Attorney, Agent, or Firm* — Sughrue Mion, PLLC

(57) ABSTRACT

Provided is a dye-sensitized solar cell element comprising at least one dye-sensitized solar cell, wherein the dye-sensitized solar cell includes a first base material including a transparent substrate, a second base material which faces the first base material, an annular sealing portion which bonds the first base material and the second base material, and an oxide semiconductor layer which is provided between the first base material and the second base material, wherein the second base material has a flexibility, wherein the second base material includes an annular bonding edge portion which is bonded to the sealing portion and a main body portion in an inner side of the bonding edge portion, and wherein a portion of the main body portion is a convex bending portion which is bent to be convex toward a side opposite to the first base material.

12 Claims, 29 Drawing Sheets

(52) U.S. Cl.
CPC ........ *H01G 9/2095* (2013.01); *H01M 14/005* (2013.01); *Y02E 10/542* (2013.01)

(56) References Cited

U.S. PATENT DOCUMENTS

| | | | |
|---|---|---|---|
| 2009/0000661 A1 | 1/2009 | Yoshimoto et al. | |
| 2009/0272433 A1* | 11/2009 | Morooka | H01G 9/2031 136/256 |
| 2010/0300534 A1* | 12/2010 | Pettersson | H01G 9/2081 136/259 |
| 2011/0223704 A1* | 9/2011 | Doi | H01G 9/2077 438/64 |
| 2012/0012150 A1 | 1/2012 | Yang et al. | |
| 2013/0032193 A1 | 2/2013 | Okada | |
| 2013/0153021 A1 | 6/2013 | Doi | |

FOREIGN PATENT DOCUMENTS

| | | |
|---|---|---|
| JP | 2004-319383 A | 11/2004 |
| JP | 2004-362793 A | 12/2004 |
| JP | 2007-59181 A | 3/2007 |
| JP | 2007-66875 A | 3/2007 |
| JP | 2007-220606 A | 8/2007 |
| JP | 2008-226552 A | 9/2008 |
| JP | 2009-9866 A | 1/2009 |
| JP | 2009-217970 A | 9/2009 |
| JP | 2009-277399 A | 11/2009 |
| JP | 2011-204680 A | 10/2011 |
| JP | 2012-28314 A | 2/2012 |
| JP | 2012-182040 A | 9/2012 |
| WO | 2011/129250 A1 | 10/2011 |
| WO | 2012/046796 | 4/2012 |

OTHER PUBLICATIONS

Written Opinion of PCT/JP2013/083825, dated Jan. 21, 2014. [PCT/ISA/237].
Communication dated Apr. 17, 2017, issued by the Chinese Patent Office in counterpart Chinese application No. 201380074976.7.

* cited by examiner

DYE-SENSITIZED SOLAR CELL ELEMENT

CROSS REFERENCE TO RELATED APPLICATIONS

This application is a National Stage of International Application No. PCT/JP2013/083825 filed Dec. 18, 2013, claiming priority based on Japanese Patent Application Nos. 2013-075452, filed Mar. 30, 2013, and 2013-075451, filed Mar. 30, 2013, the contents of all of which are incorporated herein by reference in their entirety.

TECHNICAL FIELD

The present invention relates to a dye-sensitized solar cell element.

BACKGROUND ART

As a photoelectric conversion element, a dye-sensitized solar cell element has attracted attention since it is inexpensive and a high photoelectric conversion efficiency can be obtained, and various developments have been conducted with regard to the dye-sensitized solar cell element.

The dye-sensitized solar cell element includes at least one dye-sensitized solar cell, and the dye-sensitized solar cell includes an annular sealing portion connecting a conductive substrate and a counter substrate such as a counter electrode.

As such a dye-sensitized solar cell element, for example, there is known a dye-sensitized solar cell element disclosed in the following Patent Document 1. The following Patent Document 1 discloses an electrode comprising a conductive substrate, an electrode facing the conductive substrate, an oxide semiconductor layer which is provided on the conductive substrate, an electrolyte which is provided between the two electrodes, and a sealing material which connects the two electrodes in a periphery of the electrolyte, in which the two electrodes are parallel to each other.

In addition, as the above-described dye-sensitized solar cell element, there is known a dye-sensitized cell including an annular sealing portion between an optical electrode and a counter electrode (See the following Patent Document 2). Herein, an interface between the sealing portion and the counter electrode or an interface between the sealing portion and the optical electrode is configured so that four linear portions intersect each other so as to form an annular shape.

CITATION LIST

Patent Document

Patent Document 1: JP 2007-59181 A (FIG. 1)
Patent Document 2: JP 2011-204680 A

SUMMARY OF THE INVENTION

Problem to be Solved by the Invention

However, both the dye-sensitized solar cells disclosed in the above-described Patent Documents 1 and 2 had a room for improvement in terms of durability.

The invention has been conducted in view of the above circumstances, a purpose thereof is to provide a dye-sensitized solar cell element having excellent durability.

Means for Solving Problem

First, the inventor of the present invention studied causes of the above-described problems occurring in the dye-sensitized solar cell disclosed in the above-described Patent Document 1. With respect to the dye-sensitized solar cell disclosed in the above-described Patent Document 1, if the dye-sensitized solar cell is placed under an environment where a change in temperature is large, a space between the two electrodes is expanded or contracted. At this time, if an excessive stress is applied on the two electrodes, these electrodes are immediately in a strained state. As a result, the inventor considered that the excessive stress was directly transferred to interfaces between the electrodes and a sealing material. Therefore, as a result of intensive studies, the inventor found out that the above-described problems can be solved by the following invention.

Namely, the invention is a dye-sensitized solar cell element including at least one dye-sensitized solar cell, wherein the dye-sensitized solar cell includes a first base material including a transparent substrate, a second base material which faces the first base material, an annular sealing portion which bonds the first base material and the second base material, and an oxide semiconductor layer which is provided between the first base material and the second base material, wherein the second base material has a flexibility, wherein the second base material includes an annular bonding edge portion which is bonded to the sealing portion and a main body portion in an inner side of the bonding edge portion, and wherein a portion of the main body portion is a convex bending portion which is bent to be convex toward a side opposite to the first base material.

If the dye-sensitized solar cell element is placed under an environment where a change in temperature is large, a space among the first base material, the second base material, and the sealing portion is expanded or contracted. At this time, even when the second base material is likely to be in a strained state due to an excessive stress applied on the second base material, since a portion of the main body portion of the second base material is the convex bending portion, the stress is absorbed into the convex bending portion. For this reason, the stress applied on the interface between the bonding edge portion of the second base material and the sealing portion can be sufficiently reduced. For this reason, even in a case where the dye-sensitized solar cell element is placed under an environment where a change in temperature is large, the dye-sensitized solar cell element can have excellent durability.

In the above dye-sensitized solar cell element, for example, the first base material is configured as a first electrode, and the second base material is configured as a second electrode.

In the above dye-sensitized solar cell element, preferably, the oxide semiconductor layer is provided on the first electrode, and a remaining portion of the main body portion includes a concave bending portion which is bent to be concave toward a side close to the oxide semiconductor layer.

In this case, the remaining portion of the main body portion includes the concave bending portion, so that an inter-electrode distance between the first electrode and the second electrode can be reduced. For this reason, the dye-sensitized solar cell element can have excellent photoelectric conversion characteristics.

In the above dye-sensitized solar cell element, preferably, the convex bending portion is arranged at a position adjacent to the bonding edge portion.

On the interface between the bonding edge portion and the sealing portion, a stress is easily applied. In this respect, if the convex bending portion is arranged at a position adjacent to the bonding edge portion, the application of the excessive stress on the bonding edge portion can be effectively suppressed.

In the above dye-sensitized solar cell element, preferably, a bonding surface of the sealing portion with at least one of the first base material and the second base material includes a plurality of linear portions and outward-swelling portions which swell toward outer sides of intersecting portions of the linear portions.

According to the dye-sensitized solar cell element, if the dye-sensitized solar cell element is placed under a high-temperature environment and, thus, the first base material and the second base material are thermally expanded, a stress directing toward outer sides of the intersecting portions of the linear portions is concentrated on the bonding surface between the sealing portion and at least one of the first base material and the second base material accordingly. In this respect, in the invention, the bonding surface includes the outward-swelling portions which swell toward outer sides of the intersecting portions. For this reason, the stress is also distributed to the outward-swelling portions. As a result, a decrease in strength of adhesion between the sealing portion and at least one of the first base material and the second base material is more sufficiently suppressed, so that it is possible to have more excellent durability.

In the above dye-sensitized solar cell element, preferably, the bonding surface of the sealing portion with at least one of the first base material and the second base material further includes inward-swelling portions which swell toward inner sides of the intersecting portions.

In this case, if the dye-sensitized solar cell element is placed under a low temperature environment and, thus, the first base material and the second base material are contracted, a stress directing toward inner sided with respect to the intersecting portions of the linear portions is concentrated on the bonding surface between the sealing portion and the first base material and between the sealing portion and the second base material. In this respect, in the invention, the bonding surface includes the inward-swelling portions which swell toward inner sides of the intersecting portions. For this reason, the stress is also distributed to the inward-swelling portions. As a result, a decrease in strength of adhesion between the sealing portion and at least one of the first base material and the second base material is sufficiently suppressed, so that the dye-sensitized solar cell element can have more excellent durability.

In addition, in the above dye-sensitized solar cell element, the at least one dye-sensitized solar cell is a plurality of the dye-sensitized solar cells, the transparent substrate is used as a common substrate of the plurality of the dye-sensitized solar cells, the sealing portions of the two dye-sensitized solar cells adjacent to each other among the plurality of the dye-sensitized solar cells are integrated to constitute an integrated sealing portion, and the bonding surface of the integrated sealing portion with at least one of the first base material and the second base material includes a plurality of linear portions and outward-s welling portions which swell toward outer sides of intersecting portions of the linear portions.

According to the dye-sensitized solar cell element, if the dye-sensitized solar cell element is placed under a high-temperature environment and, thus, the first base material and the second base material are thermally expanded, a stress directing toward outer sides with respect to the intersecting portions of the linear portions is concentrated on the bonding surface between the integrated sealing portion and the first base material and between the integrated sealing portion and the second base material. In this respect, in the invention, the bonding surface includes the outward-swelling portions which swell toward outer sides of the intersecting portions. For this reason, the stress is also distributed to the outward-swelling portions. As a result, a decrease in strength of adhesion between the integrated sealing portion and at least one of the first base material and the second base material is more sufficiently suppressed, so that it is possible to have more excellent durability.

In the above dye-sensitized solar cell element, preferably, the bonding surface of the integrated sealing portion with at least one of the first base material and the second base material further includes inward-swelling portions which swell toward inner sides of the intersecting portions.

In this case, even if the dye-sensitized solar cell element is placed under a low temperature environment and, thus, the first base material are the second base material are contracted, a stress directing toward inner sides with respect to the intersecting portions of the linear portions is concentrated on the bonding surface between the integrated sealing portion and the first base material and between the integrated sealing portion and the second base material accordingly. In this respect, in the invention, the bonding surface includes the inward-swelling portions which swell toward inner sides of the intersecting portions. For this reason, the stress is also distributed to the inward-swelling portions. As a result, a decrease in strength of adhesion between the integrated sealing portion and at least one of the first base material and the second base material is more sufficiently suppressed, so that it is possible to have more excellent durability.

In the above dye-sensitized solar cell element, preferably, an edge portion of the outward-swelling portion has a circular arc shape.

In this case, even in a case where the dye-sensitized solar cell element is placed under a high-temperature environment and, thus, a stress directing toward outer sides with respect to the outward-swelling portions is applied, since the edge portions of the outward-swelling portions have a circular arc shape, the stress can be distributed over the entire edge portions.

In addition, the inventors made intensive studies in order to solve the above-described problems. First, in the dye-sensitized cell disclosed in Patent Document 2, a linear expansion coefficient is generally different among an optical electrode or a counter electrode and a sealing portion. For this reason, if the dye-sensitized cell is placed under a high-temperature environment and, thus, the optical electrode or the counter electrode is thermally expanded, a stress is concentrated on an intersecting portion of two straight-lined portions constituting the sealing portion in the interface between the optical electrode or the counter electrode and the sealing portion. For this reason, the inventors considered that, in order to improve durability, the intersecting portion of the two straight-lined portions are required to withstand the concentration of stress. Therefore, as a result of intensive studies, the inventors found out that the above-described problems can be solved by the following invention.

Namely, the invention is a dye-sensitized solar cell element comprising a dye-sensitized solar cell having a first base material including a transparent substrate, a second base material which faces the first base material, and an annular sealing portion which bonds the first base material and the second base material, wherein a bonding surface of the sealing portion with at least one of the first base material and the second base material includes a plurality of linear portions and outward-swelling portions which swell toward outer sides of intersecting portions of the linear portions.

According to the dye-sensitized solar cell element, if the dye-sensitized solar cell element is placed under a high-temperature environment and, thus, the first base material and the second base material are thermally expanded, a stress directing toward outer sides with respect to the intersecting portions of the linear portions is concentrated on the bonding surface between the sealing portion and at least one of the first base material and the second base material accordingly. In this respect, in the invention, the bonding surface includes the outward-swelling portions which swell toward outer sides of the intersecting portions. For this reason, the stress is also distributed to the outward-swelling portions. As a result, a decrease in strength of adhesion between the sealing portion and at least one of the first base material and the second base material is sufficiently suppressed, so that it is possible to have excellent durability.

In the above dye-sensitized solar cell element, preferably, the bonding surface of the sealing portion with at least one of the first base material and the second base material further includes inward-swelling portions which swell toward inner sides of the intersecting portions.

In this case, even if the dye-sensitized solar cell element is placed under a low temperature environment and, thus, the first base material and the second base material are contracted, a stress directing toward inner sides with respect to the intersecting portions of the linear portions is concentrated on the bonding surface between the sealing portion and the first base material and between the sealing portion and the second base material accordingly. In this respect, in the invention, the bonding surface includes the inward-swelling portions which swell toward inner sides of the intersecting portions. For this reason, the stress is also distributed to the inward-swelling portions. As a result, a decrease in strength of adhesion between the sealing portion and at least one of the first base material and the second base material is sufficiently suppressed, so that it is possible to have more excellent durability.

In addition, the invention is a dye-sensitized solar cell element comprising a plurality of dye-sensitized solar cells having a first base material including a transparent substrate, a second base material which faces the first base material, and an annular sealing portion which bonds the first base material and the second base material, wherein the transparent substrate is used as a common substrate of the plurality of the dye-sensitized solar cells, wherein the sealing portions of the two dye-sensitized solar cells adjacent to each other among the plurality of the dye-sensitized solar cells are integrated to constitute an integrated sealing portion, wherein the bonding surface of the integrated sealing portion with at least one of the first base material and the second base material includes a plurality of linear portions and outward-swelling portions which swell toward outer sides of intersecting portions of the linear portions.

According to the dye-sensitized solar cell element, if the dye-sensitized solar cell element is placed under a high-temperature environment and, thus, the first base material and the second base material are thermally expanded, a stress directing toward outer sides with respect to the intersecting portions of the linear portions is concentrated on the bonding surface between the integrated sealing portion and the first base material and between the integrated sealing portion and the second base material accordingly. In this respect, in the invention, the bonding surface includes the outward-swelling portions which swell toward outer sides of the intersecting portions. For this reason, the stress is also distributed to the outward-swelling portions. As a result, a decrease in strength of adhesion between the integrated sealing portion and at least one of the first base material and the second base material is sufficiently suppressed, so that it is possible to have excellent durability.

In the above dye-sensitized solar cell element, preferably, the bonding surface of the integrated sealing portion with at least one of the first base material and the second base material further includes inward-swelling portions which swell toward inner sides of the intersecting portions.

In this case, even if the dye-sensitized solar cell element is placed under a low temperature environment and, thus, the first base material and the second base material are contracted, a stress directing toward inner sides with respect to the intersecting portions of the linear portions is concentrated on the bonding surface between the integrated sealing portion and the first base material and between the integrated sealing portion and the second base material. In this respect, in the invention, the bonding surface includes the inward-swelling portions which swell toward inner sides of the intersecting portions. For this reason, the stress is also distributed to the inward-swelling portions. As a result, a decrease in strength of adhesion between the integrated sealing portion and at least one of the first base material and the second base material is sufficiently suppressed, so that it is possible to have more excellent durability.

In the above dye-sensitized solar cell element, preferably, an edge portion of the outward-swelling portion has a circular arc shape.

In this case, even in a case where the dye-sensitized solar cell element is placed under a high-temperature environment and, thus, a stress directing toward outer sides with respect to the outward-swelling portions is applied, since the edge portions of the outward-swelling portions have a circular arc shape, the stress can be distributed over the entire edge portions.

Meanwhile, in the invention, the phrase that the second base material "has a flexibility" denotes that, when under a 20° C. environment, two edge portions (each having a width of 5 mm) of longitudinal sides of the second base material having a sheet shape of 50 mm×200 mm are fastened horizontally with a tension of 1 N and then a load of 20 g is applied on the center of the second base material, a maximum deformation ratio of bending of the second base material exceeds 20%. Herein, the maximum deformation ratio is a value calculated based on the following formula:

Maximum Deformation Ratio (%)=100×(Maximum Displacement Amount)/(Thickness of Second base material Having Sheet Shape)

Therefore, for example, in a case where the second base material having a sheet shape and a thickness of 0.04 mm is bent due to the application of the load as described above and, thus, the maximum displacement amount is 0.01 mm, the maximum deformation ratio is 25%. Therefore, this second base material having a sheet shape has a flexibility.

Effect of the Invention

According to the invention, a dye-sensitized solar cell element having excellent durability is provided.

MODE(S) FOR CARRYING OUT THE INVENTION

First Embodiment

Figure 1:
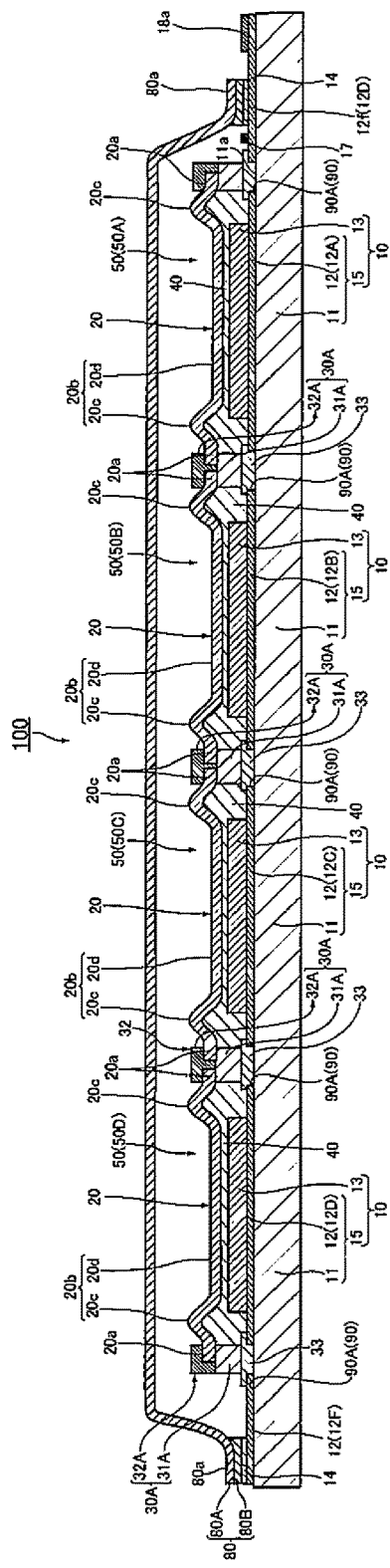
FIG. 1 is a cross-sectional view illustrating a first embodiment of a dye-sensitized solar cell element of the invention.
Figure 2:
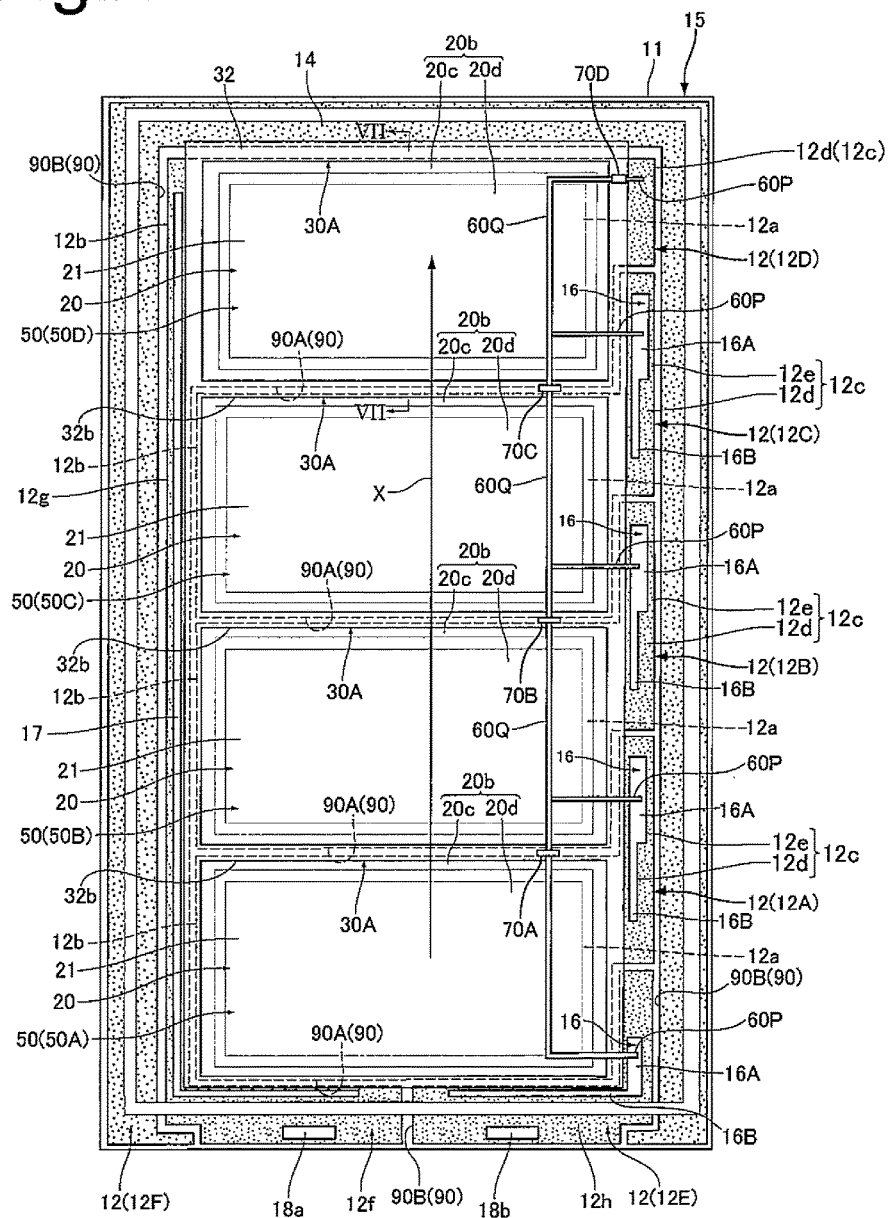
FIG. 2 is a plan view illustrating a portion of the first embodiment of the dye-sensitized solar cell element of the invention.
Figure 3:
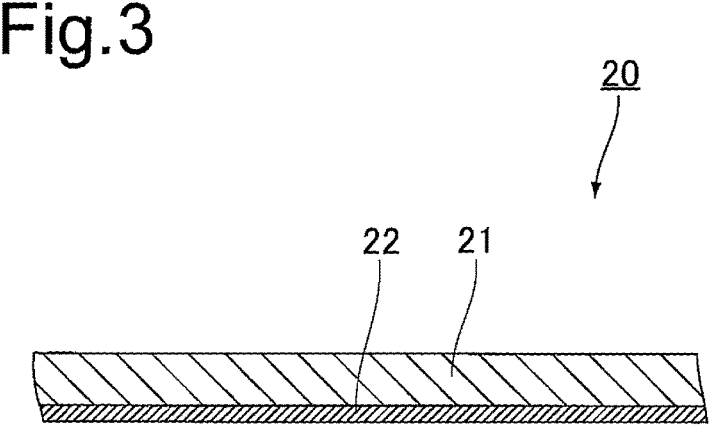
FIG. 3 is a partial cross-sectional view illustrating a second base material of FIG. 1.
Figure 4:
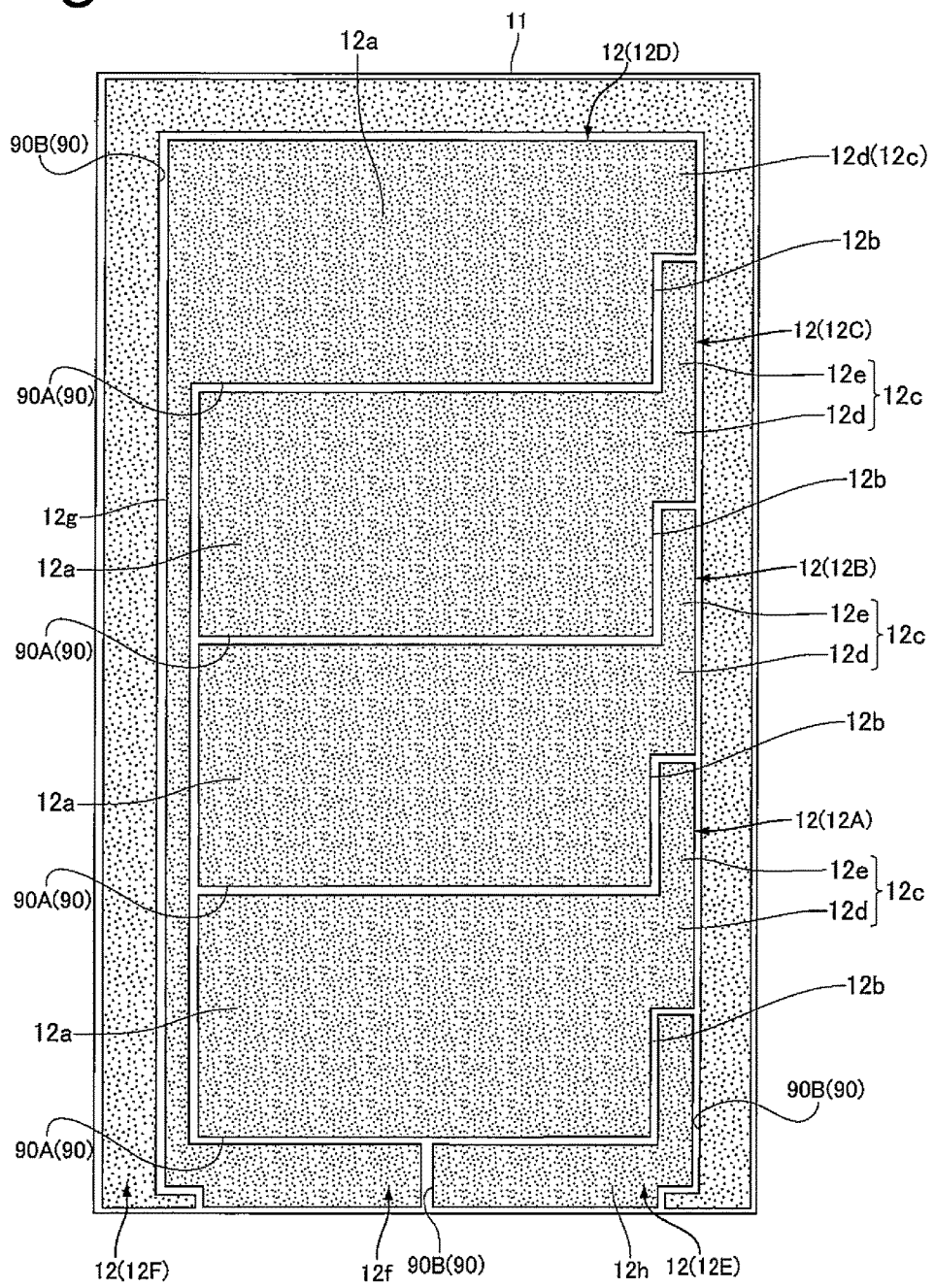
FIG. 4 is a plan view illustrating a pattern of a transparent conductive film in the dye-sensitized solar cell element of FIG. 1.
Figure 5:
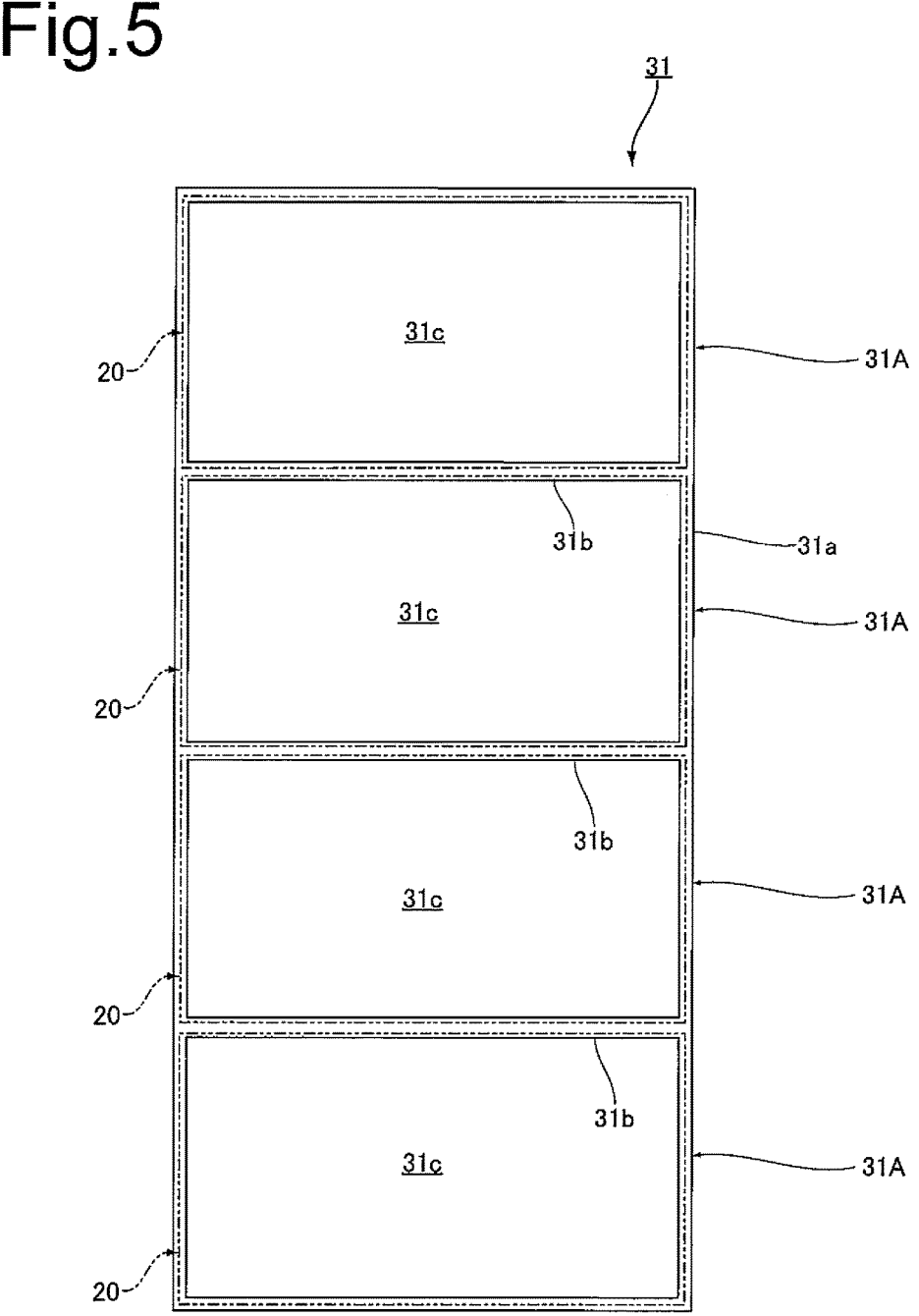
FIG. 5 is a plan view illustrating a first integrated sealing portion of FIG. 1.
Figure 6:
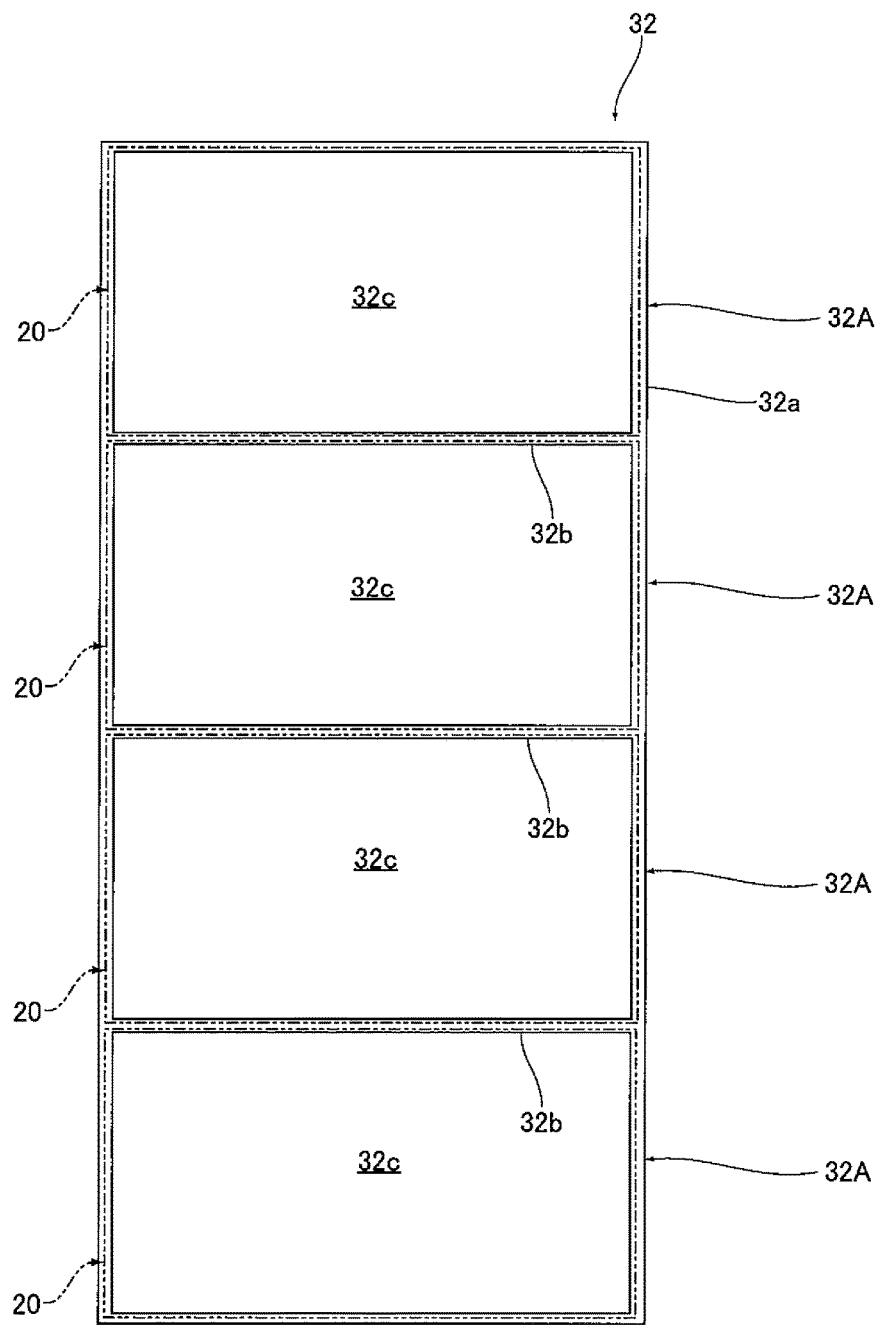
FIG. 6 is a plan view illustrating a second integrated sealing portion of FIG. 1.
Figure 7:
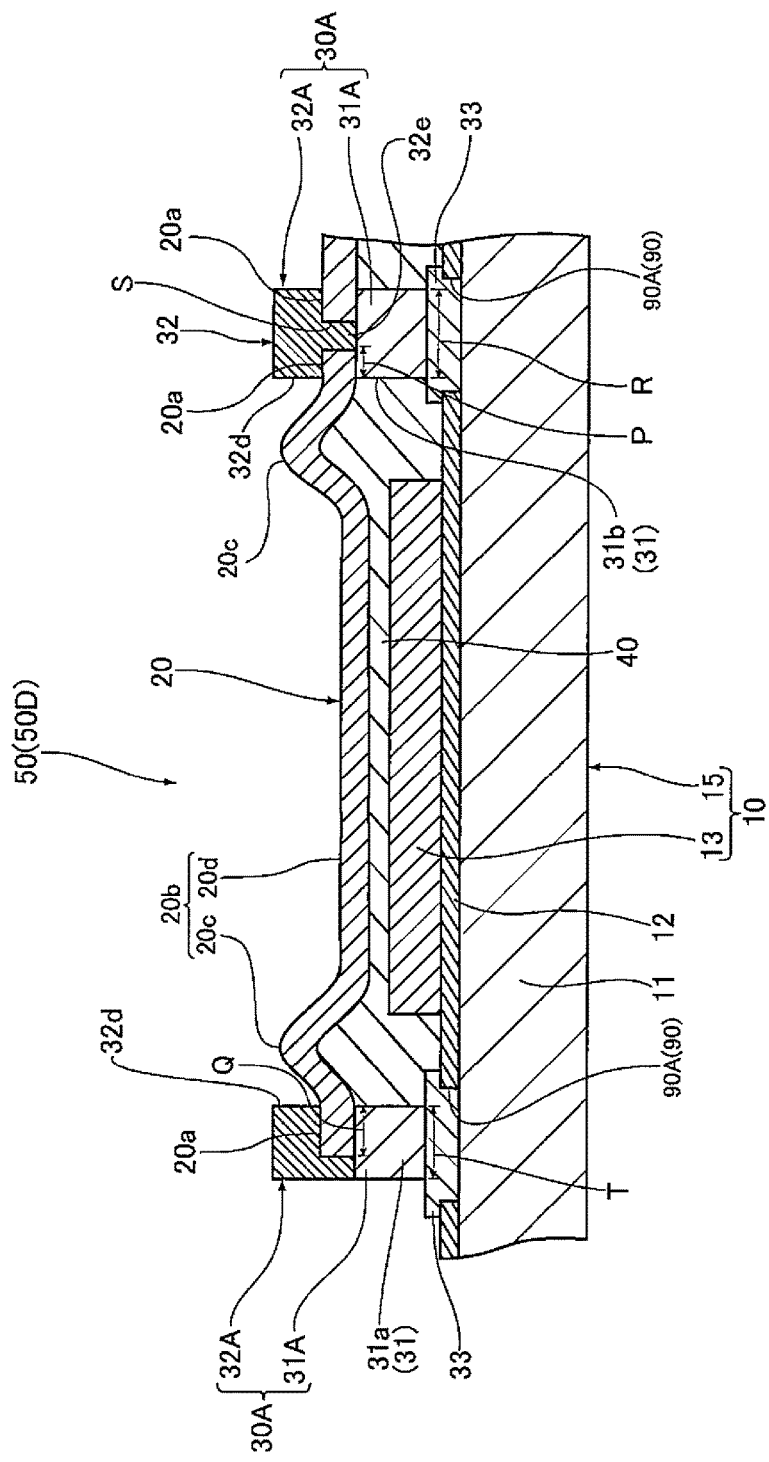
FIG. 7 is a cross-sectional view taken along line VII-VII of FIG. 2.
Figure 8:
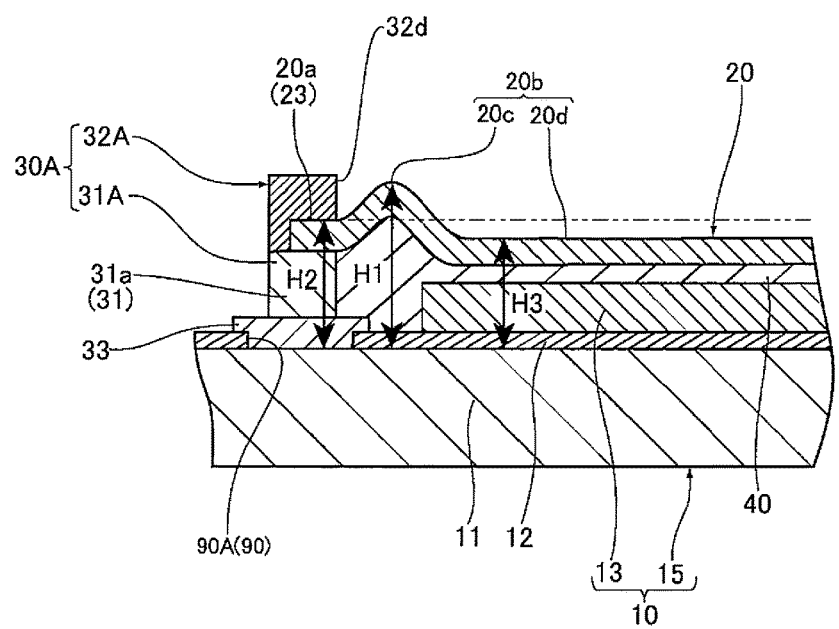
FIG. 8 is a partial enlarged view of FIG. 7.
Figure 9:
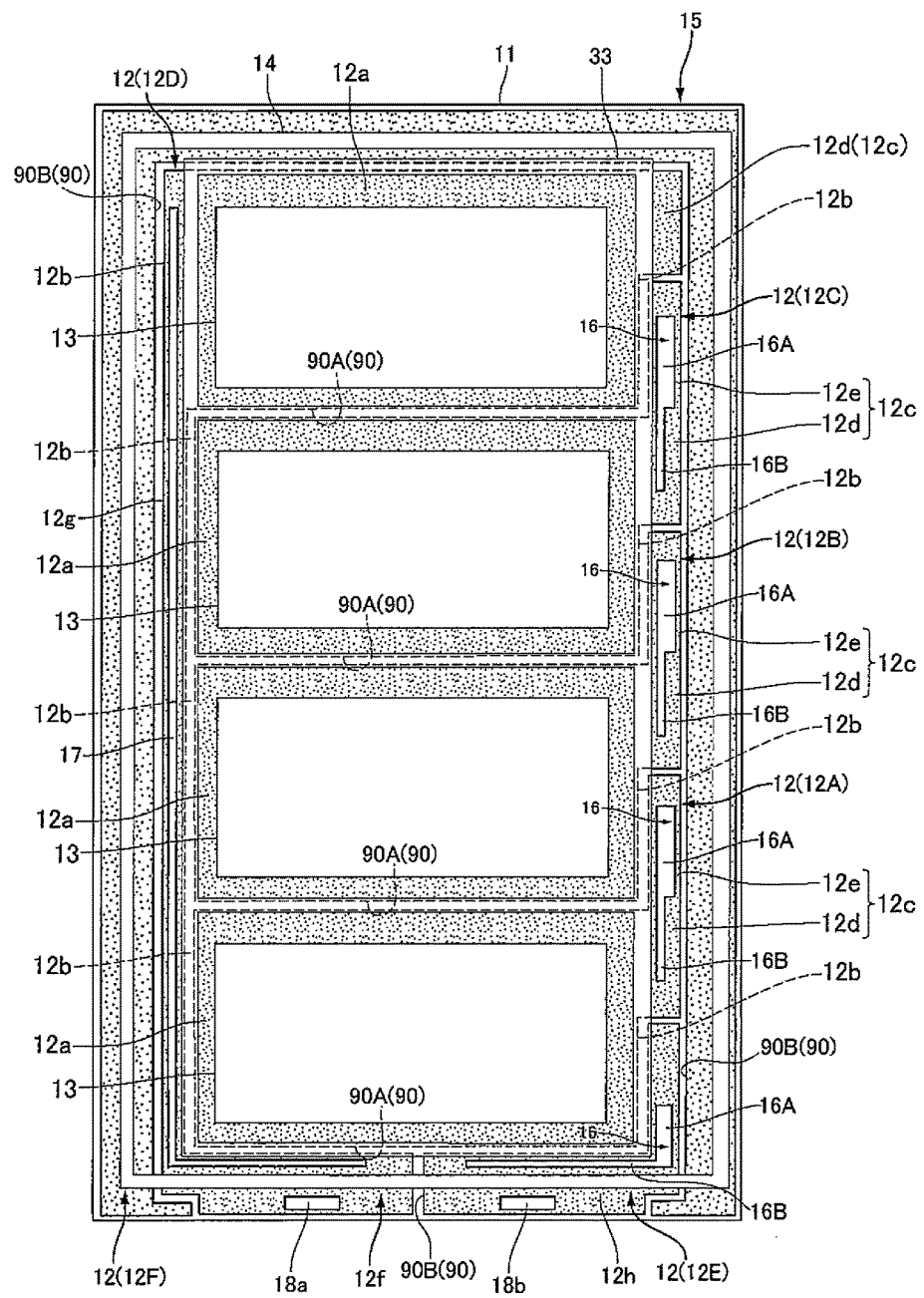
FIG. 9 is a plan view illustrating a working electrode on which a coupling portion for fixing a back sheet is formed.

Hereinafter, a first embodiment of a dye-sensitized solar cell element of the invention will be described in detail with reference to FIGS. 1 to 9. FIG. 1 is a cross-sectional view illustrating a first embodiment of a dye-sensitized solar cell element of the invention. FIG. 2 is a plan view illustrating a portion of the first embodiment of the dye-sensitized solar cell element of the invention. FIG. 3 is a partial cross-sectional view illustrating a second base material of FIG. 1. FIG. 4 is a plan view illustrating a pattern of a transparent conductive film in the dye-sensitized solar cell module of FIG. 1. FIG. 5 is a plan view illustrating a first integrated sealing portion of FIG. 1. FIG. 6 is a plan view illustrating a second integrated sealing portion of FIG. 1. FIG. 7 is a cross-sectional view taken along line VII-VII of FIG. 2. FIG. 8 is a partial enlarged view of FIG. 7. FIG. 9 is a plan view illustrating a working electrode on which a coupling portion for fixing a back sheet is formed.

As illustrated in FIG. 1, a dye-sensitized solar cell module (hereinafter, referred to as the "DSC Module" in some cases) 100 as a dye-sensitized solar cell element has a plurality (four in FIG. 1) of dye-sensitized solar cells (hereinafter, referred to as the "DSC" in some cases) 50 having a transparent substrate 11 and a back sheet 80 which is provided so as to cover the DSC 50 on the side of one surface 11a of the transparent substrate 11. As illustrated in FIG. 2, the plurality of DSCs 50 are connected in series by a conductive material 60P. Hereinafter, for convenience of description, the four DSCs 50 of the DSC module 100 are referred to as DSCs 50A to 50D in some cases.

As illustrated in FIG. 1, each of the plurality of DSCs 50 is equipped with a working electrode 10 having a conductive substrate 15, a counter electrode 20 facing the conductive substrate 15, and an annular sealing portion 30A bonding the conductive substrate 15 and the counter electrode 20. An electrolyte 40 is filled in the cell space formed by the conductive substrate 15, the counter electrode 20, and the annular sealing portion 30A.

As illustrates in FIG. 3, the counter electrode 20 is equipped with a metal substrate 21 and a catalyst layer 22 which is provided to the working electrode 10 side of the metal substrate 21 and promotes the catalytic reaction. In addition, in two adjacent DSCs 50, the counter electrodes 20 are spaced apart from each other. Furthermore, the counter electrode 20 has a flexibility. In the present embodiment, the second base material and the second electrode is constituted by the counter electrode 20.

As illustrated in FIG. 1 and FIG. 2, the working electrode 10 has a transparent conductive substrate 15 and at least one oxide semiconductor layer 13 provided on the conductive substrate 15. The conductive substrate 15 has having a transparent substrate 11, a transparent conductive layer 12 provided on the transparent substrate 11 and an insulating material 33 provided on the transparent substrate 11 and a connecting terminal 16 provided on the transparent conductive layer 12. The oxide semiconductor layer 13 is disposed on the inner side of the annular sealing portion 30A. The transparent substrate 11 is used as the common transparent substrate of the DSCs 50A to 50D. Meanwhile, in the present embodiment, a first base material and a first electrode is constituted by the conductive substrate 15.

As illustrated in FIG. 2 and FIG. 4, the transparent conductive layer 12 is constituted by the transparent conductive layers 12A to 12F provided in a state of being insulated from each other. In other words, the transparent conductive layers 12A to 12F are disposed to interpose a groove 90 between one another. Here, the transparent conductive layers 12A to 12D constitute the transparent conductive layer 12 of the plurality of DSCs 50A to 50D, respectively. In addition, the transparent conductive layer 12E is disposed so as to bend along the sealing portion 30A. The transparent conductive layer 12F is the annular transparent electrode film 12 for fixing the peripheral portion 80a of the back sheet 80 and surrounds the transparent conductive films 12A to 12E (see FIG. 1).

As illustrated in FIG. 4, all of the transparent conductive layers 12A to 12D have a quadrangular-shaped main body portion 12a having a side edge portion 12b and a protruding portion 12c which laterally protrudes from the side edge portion 12b of the main body portion 12a.

As illustrated in FIG. 2, the protruding portion 12c of the transparent conductive layer 12C among the transparent conductive layers 12A to 12D has a projecting portion 12d which laterally projects with respect to the arrangement direction X of the DSCs 50A to 50D and a facing portion 12e which extends from the projecting portion 12d and faces the main body portion 12a of the adjacent DSC 50D via the groove 90.

In the DSC 50B, the protruding portion 12c of the transparent conductive layer 12B has the projecting portion 12d and the facing portion 12e. In addition, in the DSC 50A as well, the protruding portion 12c of the transparent conductive layer 12A has the projecting portion 12d and the facing portion 12e.

Meanwhile, the DSC 50D is connected with the DSC 50C already and there is no other DSC 50 to be connected. For this reason, in the DSC 50D, the protruding portion 12c of the transparent conductive layer 12D does not have a facing portion 12e. In other words, the protruding portion 12c of the transparent conductive layer 12D is constituted by only the projecting portion 12d.

However, the transparent conductive layer 120 further has a first current extracting portion 12f for extracting the current generated in the DSC module 100 to the outside and a connecting portion 12g which connects the first current extracting portion 12f with the main body portion 12a and extends along the side edge portion 12b of the transparent conductive layers 12A to 12C. The first current extracting portion 12f is disposed in the vicinity of the DSC 50A and on the side opposite to the transparent conductive layer 12B with respect to the transparent conductive layer 12A.

On the other hand, the transparent conductive layer 12E also has a second current extracting portion 12h for extracting the current generated in the DSC module 100 to the outside, and the second current extracting portion 12h is disposed in the vicinity of the DSC 50A and on the side opposite to the transparent conductive layer 12B with respect to the transparent conductive layer 12A. Moreover, the first current extracting portion 12f and the second current extracting portion 12h are disposed in the vicinity of the DSC 50A via the groove 90 so as to be adjacent to each other. Here, the groove 90 is constituted by a first groove 90A formed along the edge portion of the main body portion 12a of the transparent conductive film 12 and a second groove 90B which is formed along the edge portion of the part excluding the main body portion 12a of the transparent conductive layer 12 and intersects with the peripheral portion 80a of the back sheet 80.

In addition, as illustrated in FIG. 2, the connecting terminal 16 is provided on each of the protruding portions 12c of the transparent conductive layers 12A to 12C and the transparent conductive layer 12E. Each connecting terminal 16 has the conductive material connecting portion 16A which is connected with the conductive material 60P and extends along the sealing portion 30A on the outer side of the sealing portion 30A and a conductive material non-connecting portion 16B which extends from the conductive material connecting portion 16A along the sealing portion 30A on the outer side of the sealing portion 30A. In the present embodiment, in the transparent conductive layers 12A to 12C, at least a conductive material connecting portion 16A of the connecting terminal 16 is provided on the facing portion 12e of the protruding portion 12c and faces the main body portion 12a of the adjacent DSC 50 to be connected. In the transparent conductive layer 12E, the conductive material connecting portion 16A of the connecting terminal 16 faces the main body portion 12a of the adjacent DSC 50A to be connected. Moreover, the width of the conductive material non-connecting portion 16B is narrower than the width of the conductive material connecting portion 16A. Here, the width of the conductive material connecting portion 16A and the width of the conductive material non-connecting portion 16B are constant, respectively. Meanwhile, the width of the conductive material connecting portion 16A means the length in the direction orthogonal to the extending direction of the conductive material connecting portion 16A and the narrowest width of the width of the conductive material connecting portion 16A, and the width of the conductive material non-connecting portion 16B means the length in the direction orthogonal to the extending direction of the conductive material non-connecting portion 16B and the narrowest width of the width of the conductive material non-connecting portion 16B.

In addition, the conductive material connecting portion 16A of the connecting terminal 16 provided on the protruding portion 12c of the transparent conductive layer 12C of the DSC 50C is connected with the metal substrate 21 of the counter electrode 20 of the adjacent DSC 50D via the conductive material 60P. The conductive material 60P is disposed so as to pass over the sealing portion 30A. In the same manner, the conductive material connecting portion 16A of the connecting terminal 16 of the DSC 50B is connected with the metal substrate 21 of the counter electrode 20 of the adjacent DSC 50C via the conductive material 60P, and the conductive material connecting portion 16A of the connecting terminal 16 of the DSC 50A is connected with the metal substrate 21 of the counter electrode 20 of the adjacent DSC 50B via the conductive material 60P. The conductive material connecting portion 16A of the connecting terminal 16 on the transparent conductive layer 12E is connected with the metal substrate 21 of the counter electrode 20 of the adjacent DSC 50A via the conductive material 602.

In addition, external connecting terminals 18a and 18b are provided on the first current extracting portion 12f and the second current extracting portion 12h, respectively.

In addition, the counter electrode 20 has an annular bonding edge portion 20a which is bonded to the sealing portion 30A and a main body portion 20b in the inner side of the bonding edge portion 20a. Herein, a portion of the main body portion 20b becomes a convex bending portion 20c which is bent to be convex toward a side opposite to the conductive substrate 15. In the embodiment, the convex bending portion 20c has an annular shape. Furthermore, the convex bending portion 20c is arranged at a position adjacent to the bonding edge portion 20a. In addition, a remaining portion of the main body portion 20b includes a concave bending portion 20d which is bent to be concave toward a side close to the oxide semiconductor layer 13. More specifically, the concave bending portion 20d is arranged in the inner side of the annular convex bending portion 20c. Herein, as illustrated in FIG. 8, a height H1 of the convex bending portion 20c from the transparent substrate 11 is larger than a height H2 of the bonding edge portion 20a from the transparent substrate 11. In addition, a height H3 of the concave bending portion 20d is smaller than the height H2 of the bonding edge portion 20a.

As illustrated in FIG. 1, the sealing portion 30A has an annular first sealing portion 31A provided between the conductive substrate 15 and the counter electrode 20 and a second sealing portion 32A which is provided so as to be superimposed on the first sealing portion 31A and sandwiches an edge portion 20a of the counter electrode 20 together with the first sealing portion 31A. In addition, as illustrated in FIG. 5, the adjacent first sealing portions 31A are integrated so as to constitute a first integrated sealing portion 31. That is to say, the first integrated sealing portion 31 is constituted by an annular-shaped part 31a (hereinafter, referred to as the "annular portion") which is not provided between the two adjacent counter electrodes 20 and a part 31b (hereinafter, referred to as the "partitioning portion") which is provided between the two adjacent counter electrodes 20 and partitions an inner side opening 31c of the annular-shaped part 31a. In addition, as illustrated in FIG. 6, second sealing portions 32A are integrated between the adjacent counter electrodes 20 so as to constitute a second integrated sealing portion 32. The second integrated sealing portion 32 is constituted by an annular-shaped part 32a (hereinafter, referred to as the "annular portion") which is not provided between the two adjacent counter electrodes 20 and a part 32b (hereinafter, referred to as the "partitioning portion") which is provided between the two adjacent counter electrodes 20 and partitions an inner side opening 32c of the annular-shaped part 32a.

In addition, as illustrated in FIG. 1, between the first sealing portion 31A and the groove 90, an insulating material 33 composed of a glass frit is provided so as to enter into the groove 90 between the adjacent transparent conductive layers 12A to 12F and to spread over the adjacent transparent conductive layers 12. To describe in detail, the insulating material 33 also covers the edge portion of the main body portion 12 forming the first groove 90A as well as enters into the first groove 90A formed along the edge portion of the main body portion 12a of the transparent conductive layer 12 of the groove 90.

As illustrated in FIG. 7, the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. Furthermore, the width R of the partitioning portion 31b of the first integrated sealing portion 31 is 100% or more and less than 200% of the width T of the annular portion 31a of the first integrated sealing portion 31.

In addition, the second integrated sealing portion 32 has a main body portion 32d provided on the side opposite to the working electrode 10 of the counter electrode 20 and an adhesive portion 32e provided between the adjacent counter electrodes 20. The second integrated sealing portion 32 is adhered to the first integrated sealing portion 31 by the adhesive portion 32e.

As illustrated in FIG. 1, the back sheet 80 is provided on the conductive substrate 15. The back sheet 80 includes a laminate 80A including a weather-resistant layer and a metal layer and an adhesive portion 80B which is provided on the side opposite to the metal layer with respect to the laminate 80A and adheres to the conductive substrate 15 via the coupling portion 14. Here, the adhesive portion 80B is provided in order to make the back sheet 80 adhere to the conductive substrate 15, and as illustrated in FIG. 1, the adhesive portion 80B may be formed on the peripheral portion of the laminate 80A. However, the adhesive portion 80B may be provided on the entire surface of the DSC 50 side of the laminate 80A. The peripheral portion 80a of the back sheet 80 is connected with the transparent conductive layers 12D, 12E, and 12F among the transparent conductive layers 12 by the adhesive portion 80B via the coupling portion 14. Here, the adhesive portion 80B is spaced apart from the sealing portion 30A of the DSC 50. Moreover, the coupling portion 14 is also spaced apart from the sealing portion 30A. Meanwhile, in the DSC module 100, the electrolyte 40 is not filled in the space which is on the inner side than the back sheet 80 and the outer side of the sealing portion 30A.

In addition, as illustrated in FIG. 2, in the transparent conductive layer 12D, a current collecting wiring 17 having a lower resistance than the transparent conductive layer 12D extends so as to pass through the main body portion 12a, the connecting portion 12g, and the current extracting portion 12f. This current collecting wiring 17 is disposed so as not to intersect with the coupling portion 14 of the back sheet 80 with the conductive substrate 15. That is to say, the current collecting wiring 17 is disposed on the inner side than the coupling portion 14.

Meanwhile, as illustrated in FIG. 2, bypass diodes 70A to 70D are connected in parallel with the DSCs 50A to 50D, respectively. Specifically, the bypass diode 70A is fixed on the partitioning portion 32b of the second integrated sealing portion 32 between the DSC 50A and the DSC 50B, the bypass diode 70B is fixed on the partitioning portion 32b of the second integrated sealing portion 32 between the DSC 50B and the DSC 50C, and the bypass diode 70C is fixed on the partitioning portion 32b of the second integrated sealing portion 32 between the DSC 50C and the DSC 50D. The bypass diode 70D is fixed on the sealing portion 30A of the DSC 50D. In addition, the conductive material 60Q is fixed to the metal substrate 21 of the counter electrode 20 so as to pass through the bypass diodes 70A to 70D. Moreover, the conductive material 60P branches out from the conductive materials 60Q between the bypass diodes 70A and 70B, between the bypass diodes 70B and 70C, and between the bypass diodes 70C and 70D, respectively, and is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is also fixed to the metal substrate 21 of the counter electrode 20 of the DSC 50A, and this conductive material 60P connects the bypass diode 70A with the conductive material connecting portion 16A of the connecting terminal 16 on the transparent conductive layer 12E. Moreover, the bypass diode 70D is connected with the transparent conductive layer 12D via the conductive material 60P.

In addition, a desiccant 95 (not shown) is provided on the counter electrode 20 of each DSC 50.

According to the above-described DSC module 100, if the DSC module is placed under an environment where a change in temperature is large, the space among the conductive substrate 15, the counter electrode 20, and the sealing portion 30A is expanded or contracted. At this time, even when the counter electrode 20 is likely to be in a strained state due to an excessive stress applied on the counter electrode 20, since a portion of the main body portion 20b of the counter electrode 20 is the convex bending portion 20c, the stress is absorbed into the convex bending portion 20c. For this reason, the stress applied on the interface between the bonding edge portion 20a of the counter electrode 20 and the sealing portion 30A can be sufficiently reduced. For this reason, even in a case where the DSC module 100 is placed under an environment where a change in temperature is high, it is possible to have excellent durability.

In addition, in the DSC module 100, the remaining portion of the main body portion 20b of the counter electrode 20 includes the concave bending portion 20d which is bent to be concave toward a side close to the oxide semiconductor layer 13. For this reason, an inter-electrode distance between the conductive substrate 15 and the counter electrode 20 can be reduced. For this reason, the DSC module 100 can have excellent photoelectric conversion characteristics.

Furthermore, in the DSC module 100, the convex bending portion 20c is arranged at a position adjacent to the bonding edge portion 20a. The interface between the bonding edge portion 20a and the sealing portion 30A is easily applied with a stress. In this respect, if the convex bending portion 20c is arranged at a position adjacent to the bonding edge portion 20a, the application of the excessive stress on the bonding edge portion 20a can be effectively suppressed.

Furthermore, in the DSC module 100, the groove 90 is formed along the edge portion of the transparent conductive layer 12, and this groove 90 has the first groove 90A formed along the edge portion of the main body portion 12a of the transparent conductive layer 12 disposed on the inner side of the annular sealing portion 30A. Moreover, the insulating material 33 composed of a glass frit enters into the first groove 90A, and also this insulating material 33 covers the edge portion of the main body portion 12a forming the first groove 90A as well. For this reason, even if a crack is formed inside the transparent substrate 11 and at the position downward the groove 90 along the groove 90 and the crack continues to the edge portion of the main body portion 12a, the penetration of moisture, which has passed through the crack, from the outside of the sealing portion 30A is sufficiently suppressed by the insulating material 33. Particularly, in the DSC module 100, the insulating material 33 which covers the edge portion of the main body portion 12a forming the first groove 90A and enters into the first groove 90A is composed of a glass frit. For this reason, the DSC module 100 exhibits higher sealing performance compared to a case in which the insulating material 33 is a resin. For this reason, according to the DSC module 100, it is possible to exhibit excellent durability.

In addition, in the DSC module 100, the sealing portion 30A and the insulating material 33 are disposed so as to be superimposed on each other. For this reason, it is possible to further increase the area of the part contributing to the power generation when seen from the light receiving surface side of the DSC module 100 compared to a case in which the sealing portion 30A and the insulating material 33 are disposed so as not to be superimposed on each other. For this reason, it is possible to more improve the aperture ratio.

In addition, in the DSC module 100, the first current extracting portion 12f and the second current extracting portion 12h are disposed in the vicinity of the DSC 50A and on the side opposite to the transparent conductive layer 12B with respect to the transparent conductive layer 12A, and the first current extracting portion 12f of the transparent conductive layer 12A and the second current extracting portion 12h of the transparent conductive layer 12E are disposed so as to be adjacent to each other via the groove 90. For this reason, in the DSC module 100, it is possible to dispose the external connecting terminals 18a and 18b to the first current extracting portion 12f and the second current extracting portion 12h, respectively, so as to be adjacent to each other. Hence, it is possible to set the number of connectors for extracting the current from the external connecting terminals 18a and 18b to the outside to one. In other words, the first current extracting portion 12f and the second current extracting portion 12h are disposed to be greatly spaced apart from each other, for example, in a case in which the first current extracting portion 12f is disposed on the side opposite to the transparent conductive layer 12c with respect to the transparent conductive layer 12D, and thus the external connecting terminals 18a and 18b are disposed to be greatly spaced apart from each other as well. In this case, two connectors of a connector to be connected with the external connecting terminal 18a and a connector to be connected with the external connecting terminal 18b are required in order to extract the current from the DSC module 100. However, according to the DSC module 100, it is possible to dispose the external connecting terminals 18a and 18b so as to be adjacent to each other, and thus only one connector is required. For this reason, according to the DSC module 100, it is possible to achieve space saving. In addition, the generated current is low in the DSC module 100 when the DSC module 100 is used under a low illuminance. Specifically, the generated current is 2 mA or lower. For this reason, it is possible to sufficiently suppress the deterioration of the photoelectric conversion performance of the DSC module 100 even if a part of the transparent conductive layer 12D of the DSC 50D on one end side of the DSC 50A and DSC 50D at both ends of the DSCs 50A to 50D is disposed next to the second current extracting portion 12h which is electrically connected with the metal substrate 21 of the counter electrode 20 of the DSC 50A on the other end side via the groove 90 as the first current extracting portion 12f.

In addition, in the DSC module 100, the DSCs 50A to 50D are arranged in a line along the X direction, the transparent conductive layer 12D of the DSC 50D on one end side of the DSC 50A and DSC 50D at both ends of the DSCs 50A to 50D has the main body portion 12a provided on the inner side of the sealing portion 30A, the first current extracting portion 12f, and the connecting portion 12g which connects the main body portion 12a with the first current extracting portion 12f. For this reason, it is possible to more shorten the installation region of the connecting terminal 16 provided along the arrangement direction (X direction in FIG. 2) of the DSCs 50A to 50D in order to connect two adjacent DSCs 50 compared to a case in which the DSCs 50C and 50D of a part of the DSCs 50A to 50D are folded back in the middle and the DSC 50A and the DSC 50D are disposed so as to be adjacent to each other, and thus it is possible to achieve space saving to a greater extent. Furthermore, according to the DSC module 100, the generated current is usually low in the DSC module 100 in a case in which the DSC module 100 is used in a low illuminance environment, and thus it is possible to sufficiently suppress the deterioration of the photoelectric conversion characteristics although the DSC module 100 further has the first connecting portion 12g which connects the main body portion 12a with the first current extracting portion 12f.

Moreover, in the DSC module 100, the current collecting wiring 17 is disposed so as not to intersect with the coupling portion 14 of the conductive substrate 15 with the back sheet 80. For this reason, the following advantages are obtained. Namely, first, the current collecting wiring 17 generally exhibits air permeability since it is porous and thus gas such as water vapor is permeable through it. In this case, it is possible to prevent the water vapor or the like from penetrating from the outside into the space between the back sheet 80 and the conductive substrate 15 through the current collecting wiring 17 when the current collecting wiring 17 is disposed so as not to intersect with the coupling portion 14 of the conductive substrate 15 with the back sheet 80 As a result, it is possible for the DSC module 100 to exhibit excellent durability. Furthermore, it is possible to sufficiently suppress the deterioration of the photoelectric conversion characteristics even if the generated current increases since the current collecting wiring 17 has a lower resistance than the transparent conductive layer 12D.

Furthermore, the connecting terminal 16 is less likely to peel off from the protruding portion 12c of the transparent conductive layer 12 as the width of the connecting terminal 16 is narrower in a case in which the DSC module 100 is placed in an environment in which the temperature change is great. With regard to that point, in the DSC module 100, the conductive material non-connecting portion 16B of the connecting terminal 16 has a narrower width than the conductive material connecting portion 16A connected with the conductive material 60P. For this reason, the conductive material non-connecting portion 16B of the connecting terminals 16 is less likely to peel off from the protruding portion 12c of the transparent conductive layer 12. Hence, the conductive material non-connecting portion 16B does not peel off from the transparent conductive layer 12 and thus it is possible to maintain the connection with the transparent conductive layer 12 even if the conductive material connecting portion 16A peels off from the protruding portion 12c of the transparent conductive layer 12. Furthermore, it is possible to normally operate the DSC module 100 even if the conductive material connecting portion 16A peels off from the protruding portion 12c of the transparent conductive layer 12. Consequently, according to the DSC module 100, it is possible to improve the connection reliability. In addition, the conductive material 60P connected with the metal substrate 21 of the counter electrode 20 of one DSC 50 of two adjacent DSCs 50 is connected with the conductive material connecting portion 16A on the protruding portion 12c of the other DSC 50, and the conductive material connecting portion 16A is provided on the protruding portion 12c and the outer side of the sealing portion 30A. In other words, the connection of two adjacent DSCs 50 is performed on the outer side of the sealing portion 30A. For this reason, according to the DSC module 100, it is possible to improve the aperture ratio.

In addition, in the DSC module 100, in the DSC 50 that is connected with the adjacent DSC 50 among the DSCs 50A to 50D, the protruding portion 12c has the projecting portion 12d which laterally projects from the main body portion 12a and the facing portion 12e which extends from the projecting portion 12d and faces the main body portion 12a of the adjacent DSC 50, and at least the conductive material connecting portion 16A of the connecting terminal 16 is provided on the facing portion 12e.

In this case, at least the conductive material connecting portion 16A of the connecting terminal 16 is provided on the facing portion 12e facing the main body portion 12a of the adjacent DSC 50, and thus it is possible to sufficiently prevent the conductive material 60P connected with the conductive material connecting portion 16A from passing over the metal substrate 21 of the counter electrode 20 of the adjacent DSC 50 unlike the case in which at least the conductive material connecting portion 16A of the connecting terminal 16 is not provided on the facing portion 12e facing the main body portion 12a of the adjacent DSC 50. As a result, it is possible to sufficiently prevent the short circuit between the adjacent DSCs 50.

In addition, in the DSC module 100, both of the conductive material connecting portion 16A and the conductive material non-connecting portion 16B are disposed along the sealing portion 30A. For this reason, it is possible to save the space required for the connecting terminal 16 compared to the case of disposing the conductive material connecting portion 16A and the conductive material non-connecting portion 16B in the direction away from the sealing portion 30A.

Furthermore, in the DSC module 100, the adhesive portion 80B of the back sheet 80 is spaced apart from the sealing portion 30A of the DSC 50. For this reason, it is sufficiently suppressed that the sealing portion 30A is stretched since the adhesive portion 80B is constricted at a low temperature and thus an excessive stress is applied to the interface between the sealing portion 30A and the conductive substrate 15 or the counter electrode 20. In addition, at a high temperature as well, it is sufficiently suppressed that the sealing portion 30A is pressed since the adhesive portion 80B expands and thus an excessive stress is applied to the interface between the sealing portion 30A and the conductive substrate 15 or the counter electrode 20. In other words, it is sufficiently suppressed that an excessive stress is applied to the interface between the sealing portion 30A and the conductive substrate 15 or the counter electrode 20 both at a high temperature and a low temperature. For this reason, it is possible for the DSC module 100 to exhibit excellent durability.

Furthermore, in the DSC module 100, the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. For this reason, it is possible to more sufficiently improve the aperture ratio of the DSC module 100. In addition, in the DSC module 100, the adjacent first sealing portions 31A are integrated between the adjacent counter electrodes 20 and the adjacent second sealing portions 32A are integrated between the adjacent counter electrodes 20. Here, the sealing portion exposed to the atmosphere is in two places in between the adjacent DSCs 50 when the adjacent first sealing portions 31A are not integrated. In contrast to this, in the DSC module 100, the sealing portion exposed to the atmosphere is in one place in between the adjacent DSCs 50 since the adjacent first sealing portions 31A are integrated. In other words, the sealing portion exposed to the atmosphere is in only one place of the partitioning portion 31b in between the adjacent DSCs 50 since the first integrated sealing portion 31 is constituted by the annular portion 31a and the partitioning portion 31b. In addition, the penetration distance of moisture or the like from the atmosphere to the electrolyte 40 extends since the first sealing portions 31A are integrated. For this reason, it is possible to sufficiently reduce the amount of moisture or air penetrating from the outside of the DSC 50 in between the adjacent DSCs 50. In other words, it is possible to sufficiently improve the sealing ability of the DSC module 100. In addition, according to the DSC module 100, the adjacent first sealing portions 31A are integrated. For this reason, it is possible to secure a sufficient sealing width at the partitioning portion 31*b* even if the width P of the adhesive portion of the surface on the conductive substrate 15 side of the counter electrode 20 with the partitioning portion 31*b* of the first integrated sealing portion 31 is narrower than the width Q of the adhesive portion of the surface on the conductive substrate 15 side of the counter electrode 20 with the annular portion 31*a* of the first integrated sealing portion 31. In other words, according to the DSC module 100, it is possible to sufficiently increase the bonding strength of the first sealing portion 31A with the conductive substrate 15 and the bonding strength of the first sealing portion 31A with the counter electrode 20 while improving the aperture ratio. As a result, it is possible to improve the aperture ratio as well as it is possible to sufficiently suppress the peeling of the first sealing portion 31A from the conductive substrate 15 and the counter electrode 20 even if the electrolyte 40 expands and thus an excessive stress directed from the inner side to the outer side of the first sealing portion 31A is applied in the case of using the DSC module 100 under a high temperature, and thus it is possible to exhibit excellent durability.

Furthermore, in the DSC module 100, the width R of the counter electrode 20 with the partitioning portion 31*b* of the first integrated sealing portion 31 is 100% or more and less than 200% of the width T of the annular portion 31*a* of the first integrated sealing portion 31. In this case, the width of the partitioning portion 31*b* is 100% or more of the width T of the annular portion 31*a* in the partitioning portion 31*b* of the first integrated sealing portion 31, and thus the penetration distance of moisture or the like from the atmosphere to the electrolyte 40 extends compared to a case in which the width R of the partitioning portion 31*b* is less than 100% of the width T of the annular portion 31*a* in the partitioning portion 31*b* of the first integrated sealing portion 31. For this reason, it is possible to more sufficiently suppress that the moisture penetrates from the outside through the partitioning portion 31*b* present between the adjacent DSCs 50. On the other hand, it is possible to more improve the aperture ratio compared to a case in which the width R of the partitioning portion 31*b* exceeds 200% of the width T of the annular portion 31*a*.

In addition, in the DSC module 100, the second sealing portion 32A is adhered to the first sealing portion 31A, and the bonding edge portion 20*a* of the counter electrode 20 is sandwiched by the first sealing portion 31A and the second sealing portion 32A. For this reason, the peeling is sufficiently suppressed by the second sealing portion 32A even if the stress in the direction away from the working electrode 10 with respect to the counter electrode 20 is applied. In addition, the partitioning portion 32*b* of the second integrated sealing portion 32 is adhered to the first sealing portion 31A through the gap S between the adjacent counter electrodes 20 and thus it is reliably prevented that the counter electrodes 20 of the adjacent DSCs 50 come in contact with each other.

Next, the working electrode 10, the coupling portion 14, the photosensitizing dye, the counter electrode 20, the insulating material 33, the sealing portion 30A, the electrolyte 40, the conductive materials 60P and 60Q, the back sheet 80, and the desiccant will be described in detail.

(Working Electrode)

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the DSC module 100 and is not particularly limited, but it may be set into the range of from 50 to 10000 µm, for example.

Examples of the material contained in the transparent conductive layer 12 may include a conductive metal oxide such as indium-tin-oxide (ITO), tin oxide ($SnO_2$), and fluorine-doped-tin-oxide (FTO). The transparent conductive layer 12 may be constituted by a single layer or a laminate consisting of a plurality of layers containing different conductive metal oxides. It is preferable that the transparent conductive layer 12 contain FTO since FTO exhibits high heat resistance and chemical resistance in a case in which the transparent conductive layer 12 is constituted by a single layer. The transparent conductive layer 12 may further contain a glass frit. The thickness of the transparent conductive layer 12 may be set into the range of from 0.01 to 2 µm, for example.

In addition, the resistance value of the connecting portion 12*g* of the transparent conductive layer 12D of the transparent conductive layer 12 is not particularly limited but is preferably equal to or less than the resistance value represented by the following Equation (1).

Resistance value=number of DSC 50 connected in series×120Ω (1)

In this case, it is possible to sufficiently suppress the deterioration of the performance of the DSC module 100 compared to a case in which the resistance value of the connecting portion 12*g* exceeds the resistance value represented by Equation (1) above. In the present embodiment, the number of DSCs 50 is 4 and thus the resistance value represented by Equation (1) above becomes 480Ω, and consequently, the resistance value of the connecting portion 12*g* is preferably 480Ω or less.

The thickness of the insulating material 33 is usually from 10 to 30 µm and preferably from 15 to 25 µm.

The connecting terminal 16 contains a metallic material. Examples of the metallic material may include silver, copper and indium. These may be used singly or in combination of two or more kinds thereof.

In addition, the connecting terminal 16 may be constituted by the same material as or a different material from the conductive material 602 but it is preferable to be constituted by the same material.

In this case, it is possible to more sufficiently improve the adhesive property of the connecting terminal 16 with the conductive material 60P since the connecting terminal 16 and the conductive material 60P are constituted by the same material. For this reason, it is possible to more improve the connection reliability of the DSC module 100.

In the connecting terminal 16, the width of the conductive material non-connecting portion 16B is not particularly limited as long as it is narrower than the width of the conductive material connecting portion 16A, but it is preferable to be equal to or less than ½ of the width of the conductive material connecting portion 16A.

In this case, it is possible to more improve the connection reliability of the DSC module 100 compared to a case in which the width of the conductive material non-connecting portion 16B exceeds ½ of the width of the conductive material connecting portion 16A.

The width of the conductive material connecting portion 16A is not particularly limited but is preferably from 0.5 to 5 mm and more preferably from 0.8 to 2 mm.

The oxide semiconductor layer 13 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_2O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds of these.

The oxide semiconductor layer 13 is usually constituted by an absorbing layer for absorbing light, but may be constituted by an absorbing layer and a reflective layer to return the light that is transmitted through the absorbing layer to the absorbing layer by reflecting the light.

The thickness of the oxide semiconductor layer 13 may be set to from 0.5 to 50 μm, for example.

(Coupling Portion)

The material constituting the coupling portion 14 is not particularly limited as long as it can make the back sheet 80 adhere to the transparent conductive layer 12, and it is possible to use, for example, a glass frit, a resin material which is the same as the resin material used for the sealing portion 31A, or the like as the material constituting the coupling portion 14. Among them, the coupling portion 14 is preferably a glass frit. It is possible to effectively suppress the penetration of moisture or the like from the outside of the back sheet 80 since the glass frit exhibits higher sealing ability than the resin material.

(Photosensitizing Dye)

Examples of the photosensitizing dye may include a ruthenium complex having a ligand containing a bipyridine structure, terpyridine structure or the like, or an organic dye such as porphyrin, eosin, rhodamine, or merocyanine.

(Counter Electrode)

As described above, the counter electrode 20 is equipped with a metal substrate 21 and a conductive catalyst layer 22 which is provided on the working electrode 10 side of the metal substrate 21 and promotes the reduction reaction on the surface of the counter electrode 20.

The metal substrate 21 is constituted by, for example, a corrosion-resistant metallic material such as titanium, nickel, platinum, molybdenum, tungsten, aluminum, or stainless steel. The thickness of the metal substrate 21 is appropriately determined depending on the size of the DSC module 100 and is not particularly limited, but it may be set to from 0.005 to 0.1 mm, for example.

The catalyst layer 22 is constituted by platinum, a carbon-based material, or a conductive polymer. Here, a carbon nanotube is suitably used as the carbon-based material.

(Sealing Portion)

The sealing portion 30A is constituted by the first sealing portion 31A and the second sealing portion 32A.

Examples of the material constituting the first sealing portion 31A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

The thickness of the first sealing portion 31A is usually from 40 to 90 μm and preferably from 60 to 80 μm.

The width P of the adhesive portion of the counter electrode 20 with the partitioning portion 31b is 25% or more and less than 100% of the width Q of the adhesive portion of the counter electrode 20 with the annular portion 31a of the first integrated sealing portion 31. In this case, it is possible to exhibit more excellent durability compared to a case in which the width P of the adhesive portion is less than 25% of the width Q of the adhesive portion. The width P of the adhesive portion is more preferably 30% or more and even more preferably 40% or more of the width Q of the adhesive portion.

In the DSC module 100, the width R of the partitioning portion 31b of the first integrated sealing portion 31 is preferably 100% or more and less than 200% and more preferably from 120 to 180% of the width T of the annular portion 31a of the first integrated sealing portion 31.

In this case, it is possible to balance a great aperture ratio with excellent durability.

Examples of the material constituting the second sealing portion 32A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer in the same manner as the first sealing portion 31A.

The thickness of the second sealing portion 32A is usually from 20 to 45 μm and preferably from 30 to 40 μm.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 40 may use a mixture of the ionic liquid above with the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Meanwhile, the electrolyte 40 contains a redox couple consisting of $I^-/I_3^-$, and the concentration of $I_3^-$ is preferably 0.006 mol/L or less, more preferably from 0 to $6\times10^{-6}$ mol/L, and even more preferably from 0 to $6\times10^{-8}$ mol/L. In this case, it is possible to more reduce the leakage current since the concentration of $I_3^-$ which carries electrons is low. For this reason, it is possible to more increase the open circuit voltage, and thus it is possible to more improve the photoelectric conversion characteristics.

(Conductive Material)

As the conductive materials 602 and 60Q, for example, a metal film is used. It is possible to use, for example, silver or copper as the metallic material constituting the metal film.

(Back Sheet)

As described above, the back sheet 80 includes the laminate 80A including a weather resistant layer and a metal layer and the adhesive portion 80B which is provided on the surface of the DSC 50 side of the laminate 80A and adheres the laminate 80A to the coupling portion 14.

The weather resistant layer may be constituted by, for example, polyethylene terephthalate or polybutylene terephthalate.

The thickness of the weather resistant layer may be from 50 to 300 µm, for example.

The metal layer may be constituted by, for example, a metallic material containing aluminum. The metallic material is usually constituted by aluminum simple substance but may be an alloy of aluminum with other metals. Examples of the other metals may include copper, manganese, zinc, magnesium, lead, and bismuth. Specifically, a 1000 series aluminum is desirable in which other metals are added to aluminum of 98% or higher purity in a trace quantity. This is because this 1000 series aluminum is inexpensive and excellent in workability compared to other aluminum alloys.

The thickness of the metal layer is not particularly limited but may be from 12 to 30 µm, for example.

The laminate 80A may further include a resin layer. Examples of the material constituting the resin layer may include a butyl rubber, a nitrile rubber, and a thermoplastic resin. These can be used singly or in combination of two or more kinds thereof. The resin layer may be formed on the entire surface on the side opposite to the weather resistant layer of the metal layer or may be formed only on the peripheral portion thereof.

Examples of the material constituting the adhesive portion 80B may include a butyl rubber, a nitrile rubber, and a thermoplastic resin. These can be used singly or in combination of two or more kinds thereof. The thickness of the adhesive portion 80B is not particularly limited but may be from 300 to 1000 µm, for example.

(Desiccant)

The desiccant may be in a sheet shape or granular. The desiccant may be one which absorbs moisture, for example, and examples of the desiccant may include silica gel, alumina, and zeolite.

Figure 10:
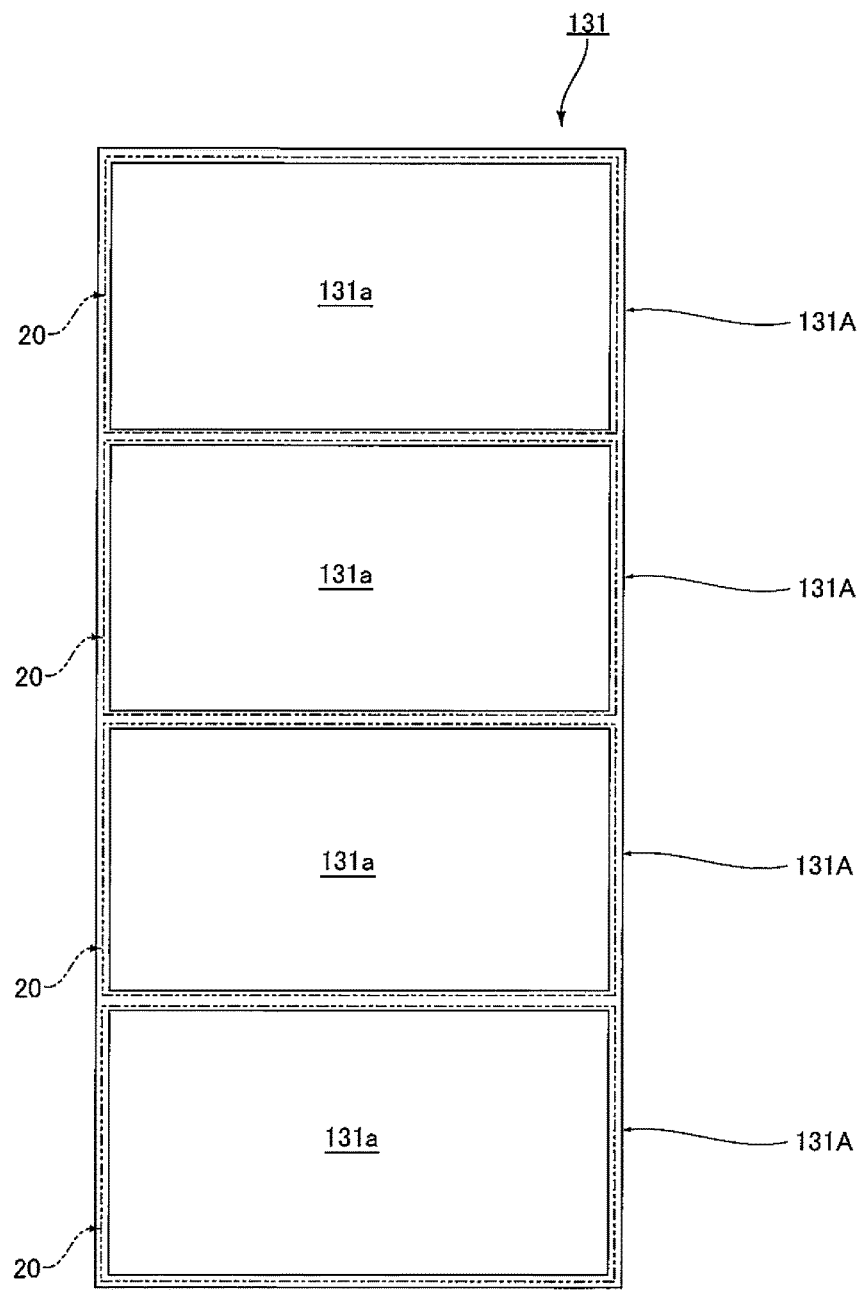
FIG. 10 is a plan view illustrating a first integrated sealing portion forming body for forming the first integrated sealing portion of FIG. 5.

Next, the method of manufacturing the DSC module 100 will be described with reference to FIG. 4, FIG. 9 and FIG. 10. FIG. 10 is a plan view illustrating a first integrated sealing portion forming body for forming a first integrated sealing portion of FIG. 5.

First, a laminate obtained by forming a transparent conductive layer on one transparent substrate 11 is prepared.

As the method of forming the transparent conductive layer, a sputtering method, a vapor deposition method, a spray pyrolysis deposition method (SPD), or a CVD method is used.

Next, as illustrated in FIG. 4, the groove 90 is formed with respect to the transparent conductive layer, and the transparent conductive layers 12A to 12F which are disposed in an insulated state to interpose the groove 90 between one another are formed. Specifically, the four transparent conductive layers 12A to 12D corresponding to the DSCs 50A to 50D are formed so as to have the quadrangular-shaped main body portion 12a and the protruding portion 12c. At this time, the transparent conductive layers 12A to 12C corresponding to the DSCs 50A to 50C are formed such that the protruding portion 12c has not only the projecting portion 12d but also the facing portion 12e which extends from the projecting portion 12d and faces the main body portion 12a of the adjacent DSC 50. In addition, the transparent conductive layer 12D is formed so as to have not only the quadrangular-shaped main body portion 12a and the projecting portion 12d but also the first current extracting portion 12f and the connecting portion 12g connecting the first current extracting portion 12f and the main body portion 12a. At this time, the first current extracting portion 12f is formed so as to be disposed on the side opposite to the transparent conductive layer 12B with respect to the transparent conductive layer 12A. Moreover, the transparent conductive layer 12E is formed so as to form the second current extracting portion 12h. At this time, the second current extracting portion 12h is formed so as to be disposed on the side opposite to the transparent conductive layer 12B with respect to the transparent conductive layer 12A and to be disposed next to the first current extracting portion 12f via the groove 90.

It is possible to form the groove 90 by, for example, a laser scribing method using a YAG laser, a $CO_2$ laser or the like as the light source.

In this manner, a transparent conductive layer 12 is formed on the transparent substrate 11.

Next, a precursor of the connecting terminal 16 constituted by the conductive material connecting portion 16A and the conductive material non-connecting portion 16B is formed on the protruding portion 12c of the transparent conductive layers 12A to 12C. Specifically, the precursor of the connecting terminal 16 is formed such that the conductive material connecting portion 16A is provided on the facing portion 12e. In addition, the precursor of the connecting terminal 16 is also formed on the transparent conductive layer 12E. In addition, the precursor of conductive material non-connecting portion 16B is formed so as to be narrower than the width of the conductive material connecting portion 16A. The precursor of the connecting terminal 16 can be formed, for example, by coating and drying a silver paste.

Moreover, a precursor of the current collecting wiring 17 is formed on the connecting portion 12g of the transparent conductive layer 12D. The precursor of the current collecting wiring 17 can be formed, for example, by coating and drying a silver paste.

In addition, precursors of the external connecting terminals 18a and 18b for extracting the current to the outside are respectively formed on the first current extracting portion 12f and the second current extracting portion 12h of the transparent conductive layer 12A. The precursor of the external connecting terminal can be formed, for example, by coating and drying a silver paste.

Furthermore, a precursor of the insulating material 33 composed of a glass frit is formed so as to enter into the first groove 90A formed along the edge portion of the main body portion 12a and to cover the edge portion of the main body portion 12a as well. The insulating material 33 can be formed, for example, by coating and drying a paste containing a glass frit.

In addition, in order to fix the back sheet 80, in the same manner as the insulating material 33, a precursor of the annular coupling portion 14 is formed so as to surround the insulating material 33 and to pass through the transparent conductive layer 12D, the transparent conductive layer 12E, and the transparent conductive layer 12F.

Furthermore, a precursor of the oxide semiconductor layer 13 is formed on the main body portion 12a of each of the transparent conductive layers 12A to 12D. The precursor of the oxide semiconductor layer 13 can be formed by printing and then drying a paste for oxide semiconductor layer formation containing oxide semiconductor particles.

The paste for oxide semiconductor layer formation contains a resin such as polyethylene glycol and a solvent such as terpineol in addition to the oxide semiconductor particles.

It is possible to use, for example, a screen printing method, a doctor blading method, or a bar coating method as the printing method of the paste for oxide semiconductor layer formation.

Finally, the precursor of the connecting terminal 16, the precursor of the insulating material 33, the precursor of the coupling portion 14, and the precursor of the oxide semiconductor layer 13 are collectively fired to form the connecting terminal 16, the insulating material 33, the coupling portion 14, and the oxide semiconductor layer 13.

At this time, the firing temperature varies depending on the kind of the oxide semiconductor particles or the glass frit but is usually from 350 to 600° C., and the firing time also varies depending on the kind of the oxide semiconductor particles or the glass frit but is usually from 1 to 5 hours.

In this manner, as illustrated in FIG. 9, the working electrode 10 is obtained in which the coupling portion 14 for fixing the back sheet 80 is formed and which has the conductive substrate 15.

Next, the photosensitizing dye is supported on the oxide semiconductor layer 13 of the working electrode 10. For this, the photosensitizing dye may be adsorbed on the oxide semiconductor layer 13 by immersing the working electrode 10 in a solution containing the photosensitizing dye, the extra photosensitizing dye is then washed out with the solvent component of the above solution, and drying is performed, thereby the photosensitizing dye may be adsorbed on the oxide semiconductor layer 13. However, it is also possible to support the photosensitizing dye on the oxide semiconductor layer 13 by coating a solution containing the photosensitizer dye on the oxide semiconductor layer 13 and then drying to adsorb the photosensitizing dye on the oxide semiconductor layer 13.

Next, the electrolyte 40 is disposed on the oxide semiconductor layer 13.

Next, as illustrated in FIG. 10, a first integrated sealing portion forming body 131 for forming the first integrated sealing portion 31 is prepared. The first integrated sealing portion forming body 131 can be obtained by preparing one sheet of resin film for sealing composed of the material constituting the first integrated sealing portion 31 and forming a quadrangular-shaped opening 131a in the resin film for sealing as many as the number of the DSCs 50. The first integrated sealing portion forming body 131 has a structure formed by integrating a plurality of first sealing portion forming bodies 131A.

Thereafter, this first integrated sealing portion forming body 131 is adhered on the conductive substrate 15. At this time, the first integrated sealing portion forming body 131 is adhered so as to be superimposed on the insulating material 33 constituting the conductive substrate 15. The adhesion of the first integrated sealing portion forming body 131 to the conductive substrate 15 can be performed by heating the first integrated sealing portion forming body 131 to melt. In addition, the first integrated sealing portion forming body 131 is adhered to the conductive substrate 15 such that the main body portion 12a of the transparent conductive layer 12 is disposed on the inner side of the first integrated sealing portion forming body 131.

Meanwhile, the counter electrodes 20 are prepared to have the same number as the number of the DSCs 50.

The counter electrode 20 can be obtained by forming the conductive catalyst layer 22 which promotes the reduction reaction on the surface of the counter electrode 20 on the metal substrate 21.

Next, one more piece of the first integrated sealing portion forming body 131 described above is prepared. Thereafter, each of the plural counter electrodes 20 is bonded so as to close each of the openings 131a of the first integrated sealing portion forming body 131.

Next, the first integrated sealing portion forming body 131 adhered to the counter electrode 20 and the first integrated sealing portion forming body 131 adhered to the conductive substrate 15 are superimposed and melted by heating while applying a pressure to the first integrated sealing portion forming body 131. At this time, if an inner side portion of the main body portion 20b of the counter electrode 20 on the annular portion adjacent to the bonding portion 20a is pressed, the electrolyte 40 existing between the oxide semiconductor layer 13 and the main body portion 20b of the counter electrode 20 is moved to the periphery, so that the annular convex bending portion 20c is formed at a position adjacent to the bonding edge portion 20a of the counter electrode 20. At the same time, the concave bending portion 20d is formed in the inner side of the annular convex bending portion 20c. In this manner, the first integrated sealing portion 31 is formed between the conductive substrate 15 and the counter electrode 20. At this time, the first integrated sealing portion 31 is formed so that a width P of the adhesive portion between the surface of the counter electrode 20 close to the conductive substrate 15 and the partitioning portion 31b of the first integrated sealing portion 31 is smaller than a width Q of the adhesive portion between the surface of the counter electrode 20 close to the conductive substrate 15 and the annular portion 31a of the first integrated sealing portion 31. In addition, the first integrated sealing portion 31 is formed so that a width R of the partitioning portion 31b of the first integrated sealing portion 31 is equal to or more than 100% of and less than 200% of a width T of the annular portion 31a of the first integrated sealing portion 31. The formation of the first integrated sealing portion 31 may be performed under the atmospheric pressure or under a reduced pressure. However, the formation is preferably performed under a reduced pressure.

Next, the second integrated sealing portion 32 is prepared (see FIG. 6). The second integrated sealing portion 32 has a structure formed by integrating a plurality of the second sealing portions 32A. The second integrated sealing portion 32 can be obtained by preparing one sheet of resin film for sealing and forming a quadrangular-shaped opening 32c in the resin film for sealing as many as the number of the DSCs 50. The second integrated sealing portion 32 is bonded to the counter electrode 20 so as to sandwich the bonding edge portion 20a of the counter electrode 20 together with the first integrated sealing portion 31. The adhesion of the second integrated sealing portion 32 to the counter electrode 20 can be performed by heating the second integrated sealing portion 32 to melt.

Examples of the resin film for sealing may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer. It is preferable that the constituent material of the resin film for sealing to form the second integrated sealing portion 32 have a higher melting point than the constituent material of the resin film for sealing to form the first integrated sealing portion 31. In this case, the second sealing portion 32A is harder than the first sealing portion 31A, and thus it is possible to effectively prevent the contact between the counter electrodes 20 of the adjacent DSCs 50. In addition, the first sealing portion 31A is softer than the second sealing portion 32A, and thus it is possible to effectively alleviate the stress applied to the sealing portion 30A.

Next, the bypass diodes 70A, 70B, and 70C are fixed to each of the three partitioning portions 32b of the second sealing portions 32. In addition, the bypass diode 70D is fixed on the sealing portion 30A of the DSC 50D as well.

Thereafter, the conductive material 60Q is fixed to the metal substrate 21 of the counter electrode 20 of the DSCs 50B and 50C so as to pass through the bypass diodes 70A to 70D. Moreover, the conductive material 60P is formed such that each of the conductive materials 60Q between the bypass diodes 70A and 70B, between the bypass diodes 70B and 70C, and between the bypass diodes 70C and 70D is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is fixed to the metal substrate 21 of the counter electrode 20 of the DSC 50A so as to connect the conductive material connecting portion 16A on the transparent conductive layer 12E and the bypass diode 70A. Moreover, the transparent conductive layer 12D is connected with the bypass diode 70A by the conductive material 60P.

At this time, with regard to the conductive material 602, a paste containing a metallic material constituting the conductive material 602 is prepared, and this paste is coated from the counter electrode 20 over the conductive material connecting portion 16A of the connecting terminal 16 of the adjacent DSC 50 and cured. With regard to the conductive material 60Q, a paste containing a metallic material constituting the conductive material 60Q is prepared, and this paste is coated on each of the counter electrodes 20 so as to link the adjacent bypass diodes and cured. At this time, as the paste above, it is preferable to use a low-temperature curing type paste which is capable of being cured at a temperature of 90° C. or less from the viewpoint of avoiding an adverse effect on the photosensitizing dye.

Finally, the back sheet 80 is prepared, and the peripheral portion 80a of the back sheet 80 is adhered to the coupling portion 14. At this time, the back sheet 80 is disposed such that the adhesive portion 80B of the back sheet 80 is spaced apart from the sealing portion 30A of the DSC 50.

The DSC module 100 is obtained in the manner described above.

Meanwhile, in the description above, a method to collectively fire the precursor of the connecting terminal 16, the precursor of the insulating material 33, the precursor of the coupling portion 14, and the precursor of the oxide semiconductor layer 13 is used in order to form the connecting terminal 16, the insulating material 33, the coupling portion 14, and the oxide semiconductor layer 13, but the connecting terminal 16, the insulating material 33, the coupling portion 14, and the oxide semiconductor layer 13 may be formed by separately firing each of the precursors.

Second Embodiment

Figure 11:
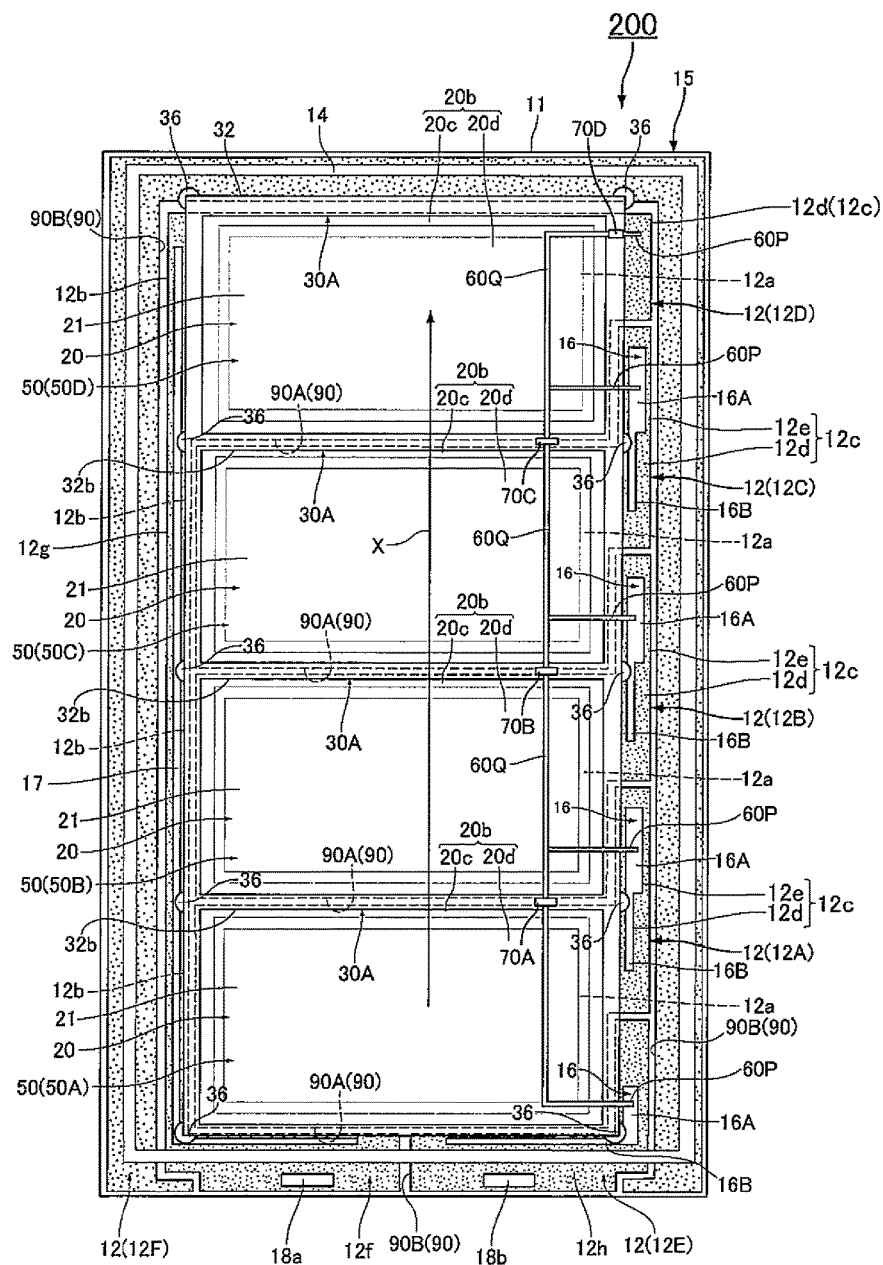
FIG. 11 is a plan view illustrating a portion of a second embodiment of the dye-sensitized solar cell element of the invention.
Figure 12:
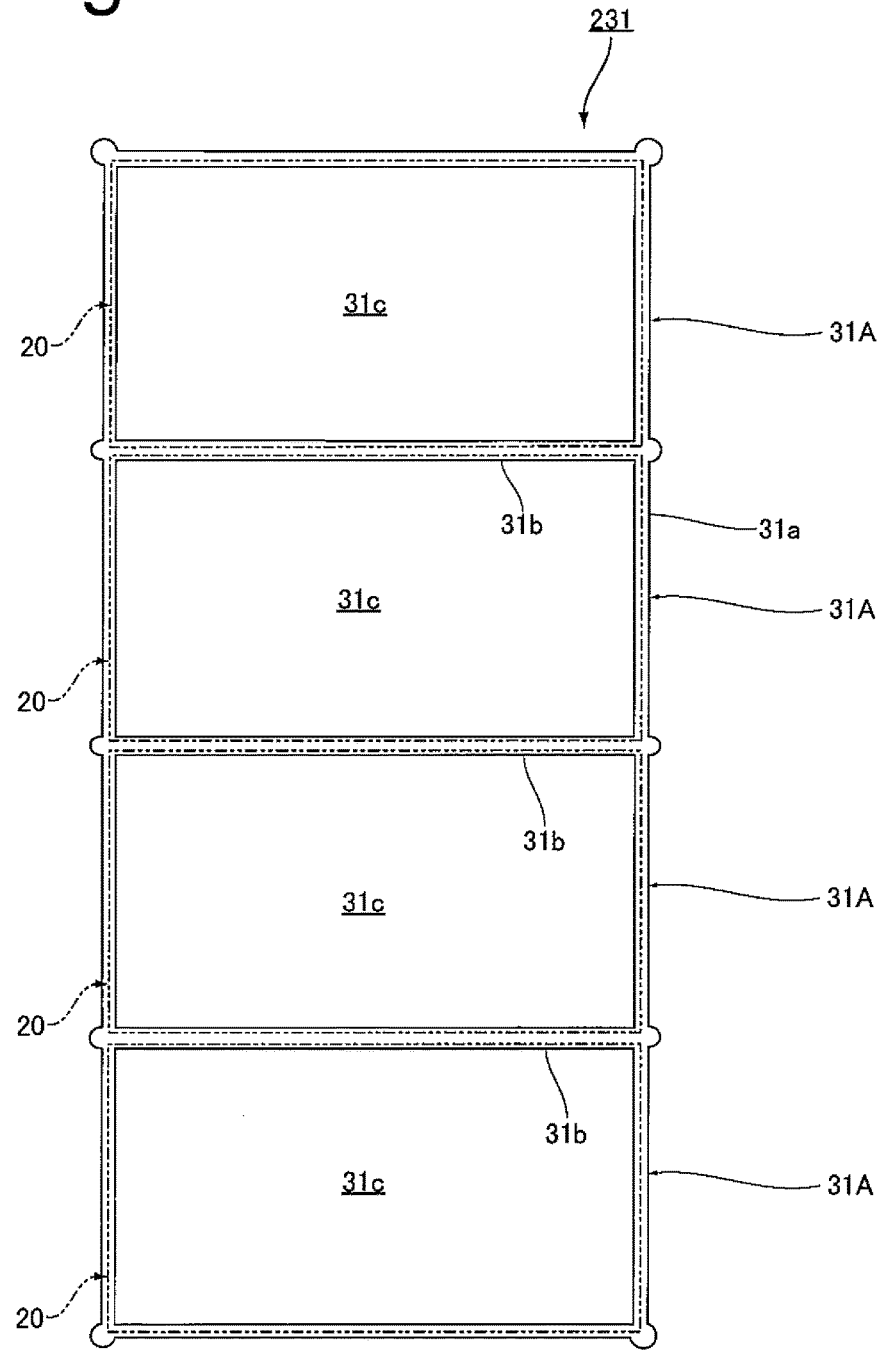
FIG. 12 is a plan view illustrating a first integrated sealing portion of FIG. 11.
Figure 13:
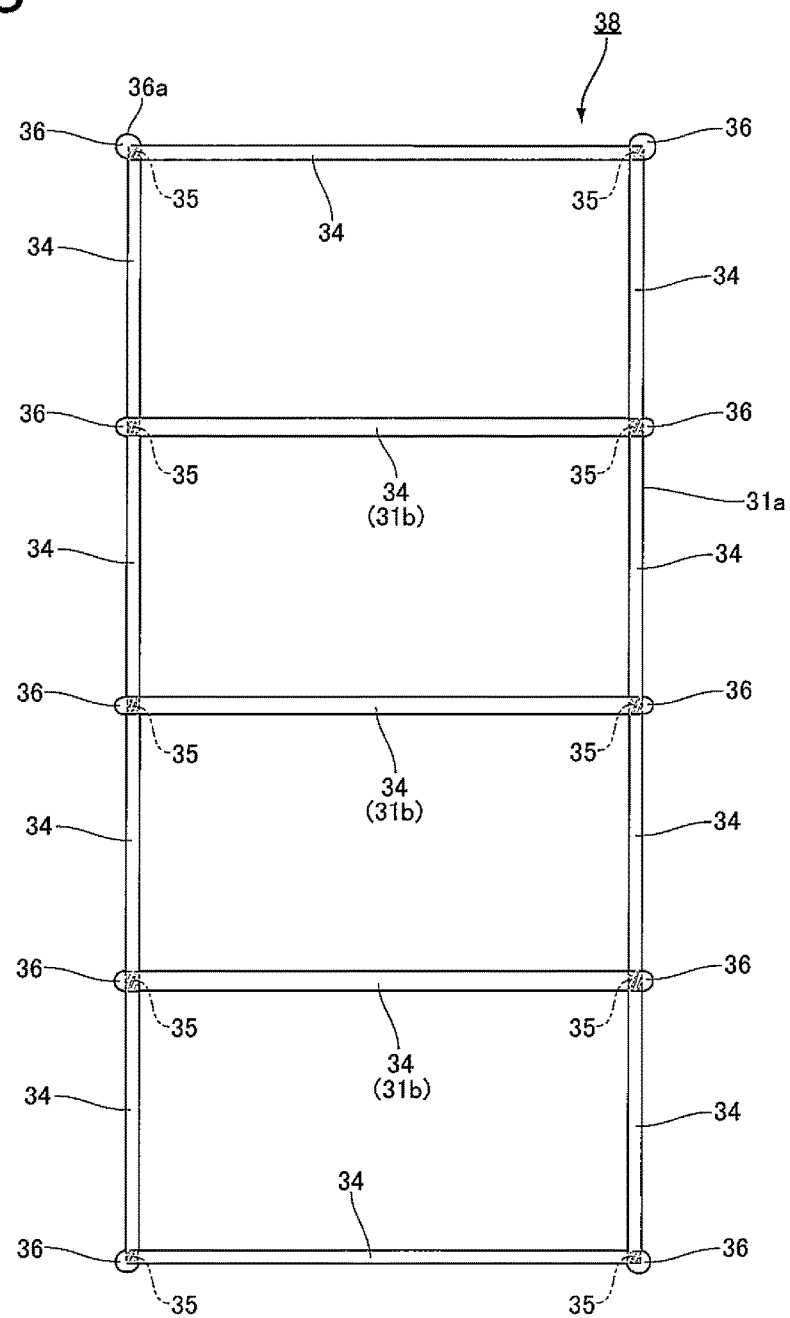
FIG. 13 is a view illustrating a bonding surface between the first integrated sealing portion of FIG. 12 and a conductive substrate.

Next, a second embodiment of the dye-sensitized solar cell element of the invention will be described in detail with reference to FIGS. 4, and 11 to 13. FIG. 11 is a plan view illustrating a portion of a second embodiment of the dye-sensitized solar cell element of the invention. FIG. 12 is a plan view illustrating a first integrated sealing portion of FIG. 11. FIG. 13 is a view illustrating a bonding surface between the first integrated sealing portion of FIG. 12 and the working electrode.

As illustrated in FIG. 11, a DSC module 200 of the embodiment is different from the DSC module 100 of the first embodiment in terms of a first sealing portion 30A.

As illustrated in FIG. 1, the sealing portion 30A includes the annular first sealing portion 31A which is provided between the conductive substrate 15 and the counter electrode 20 and the second sealing portion 32A which is provided to superimpose the first sealing portion 31A and clamps the edge portion 20a of the counter electrode 20 together with the first sealing portion 31A. In addition, as illustrated in FIG. 12, the first sealing portions 31A adjacent to each other are integrated to constitute a first integrated sealing portion 231. In other words, the first integrated sealing portion 231 is configured by a portion (hereinafter, referred to as an "annular portion") 31a which has an annular shape and is not provided between the two counter electrodes 20 adjacent to each other and portions (hereinafter, referred to as "partitioning portions") 31b which are provided between the two counter electrodes 20 adjacent to each other and partition an inner aperture 31c of the annular portion 31a. Herein, as illustrated in FIG. 13, the bonding surface 38 between the first integrated sealing portion 231 and the insulating material 33, the transparent conductive film 12, and the connecting terminal 16 constituting the conductive substrate 15 has a plurality of linear portions 34 and outward-swelling portions 36 which swell toward outer sides of intersecting portions 35 of the plurality of linear portions 34. In addition, as illustrated in FIG. 6, the second sealing portions 32A are integrated between the counter electrodes 20 adjacent to each other to constitute the second integrated sealing portion 32. The second integrated sealing portion 32 is configured by a portion (hereinafter, referred to as an "annular portion") 32a which has an annular shape and is not provided between the two counter electrodes 20 adjacent to each other and portions (hereinafter, referred to as "partitioning portions") 32b which are provided between the two counter electrodes 20 adjacent to each other and partition an inner aperture 32c of the annular portion 32a.

According to the DSC module 200, if the DSC module 200 is placed under a high-temperature environment and the conductive substrate 15 is thermally expanded, a stress directing toward outer sides of the intersecting portions 35 of the linear portions 34 is concentrated on the bonding surface 38 between the integrated sealing portion 31 and the insulating material 33, the transparent conductive film 12, and the connecting terminal 16 constituting the conductive substrate 15 accordingly. In this respect, in the DSC module 200, the bonding surface 38 has the outward-swelling portions 36 which swell toward outer sides of the intersecting portions 35. For this reason, the stress is also distributed to the outward-swelling portions 36. As a result, a decrease in strength of adhesion between the integrated sealing portion 31 and the conductive substrate 15 is sufficiently suppressed, so that it is possible to have excellent durability.

As described above, the bonding surface 38 between the integrated sealing portion 31 and the conductive substrate 15 has the plurality of linear portions 34 and the outward-swelling portions 36 which swell toward outer sides of the intersecting portions 35 of the linear portions 34.

Herein, the shape of the edge portion 36a of the outward-swelling portion 36 is not particularly limited, but, for example, it may be a shape where straight-lined portions are connected in series or a circular arc shape. However, the circular arc shape is preferred. In this case, even in a case where the DSC module 100 is placed under a high-temperature environment and, thus, a stress directing toward outer sides with respect to the outward-swelling portions 36 is applied, since the edge portions 36a of the outward-swelling portions 36 are formed to have the circular arc shapes, the stress can be distributed over the entire edge portions 36a.

Figure 14:
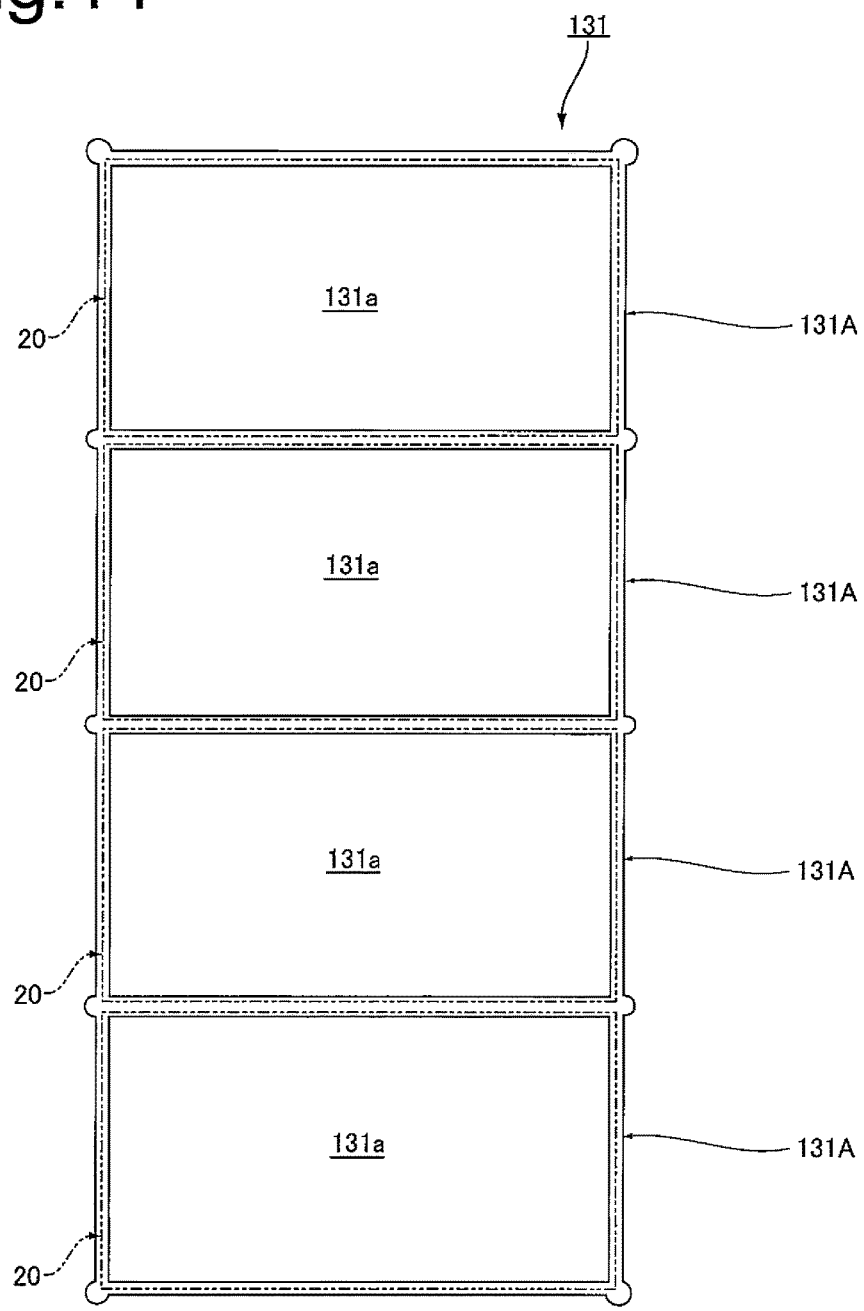
FIG. 14 is a plan view illustrating a first integrated sealing portion forming body for forming the first integrated sealing portion of FIG. 12.

A method of manufacturing the DSC module 200 is the same as that of the DSC module 100 except that the first integrated sealing portion forming body is formed so as to have the shape illustrated in FIG. 14. FIG. 14 is a plan view illustrating a first integrated sealing portion forming body for forming the first integrated sealing portion of FIG. 12. The invention is not limited to the above-described embodiments. For example, in the above-described embodiments, the DSCs 50A to 50D are arrayed in a row along the X direction of FIG. 2. However, like in the DSC module 300 illustrated in FIG. 15, the DSCs 50C and 50D as portions of the DSCs 50A to 50D may be arranged to be folded back in the middle thereof, and the DSC 50A and the DSC 50D may be arranged so that they are adjacent to each other. In this case, unlike the DSC modules 100 and 200, in the transparent conductive film 12D, the connecting portion 12g may not be necessarily provided between the main body portion 12a and the first current extracting portion 12f. For this reason, the current collecting wiring 17 may not also be necessarily provided.

Figure 16:
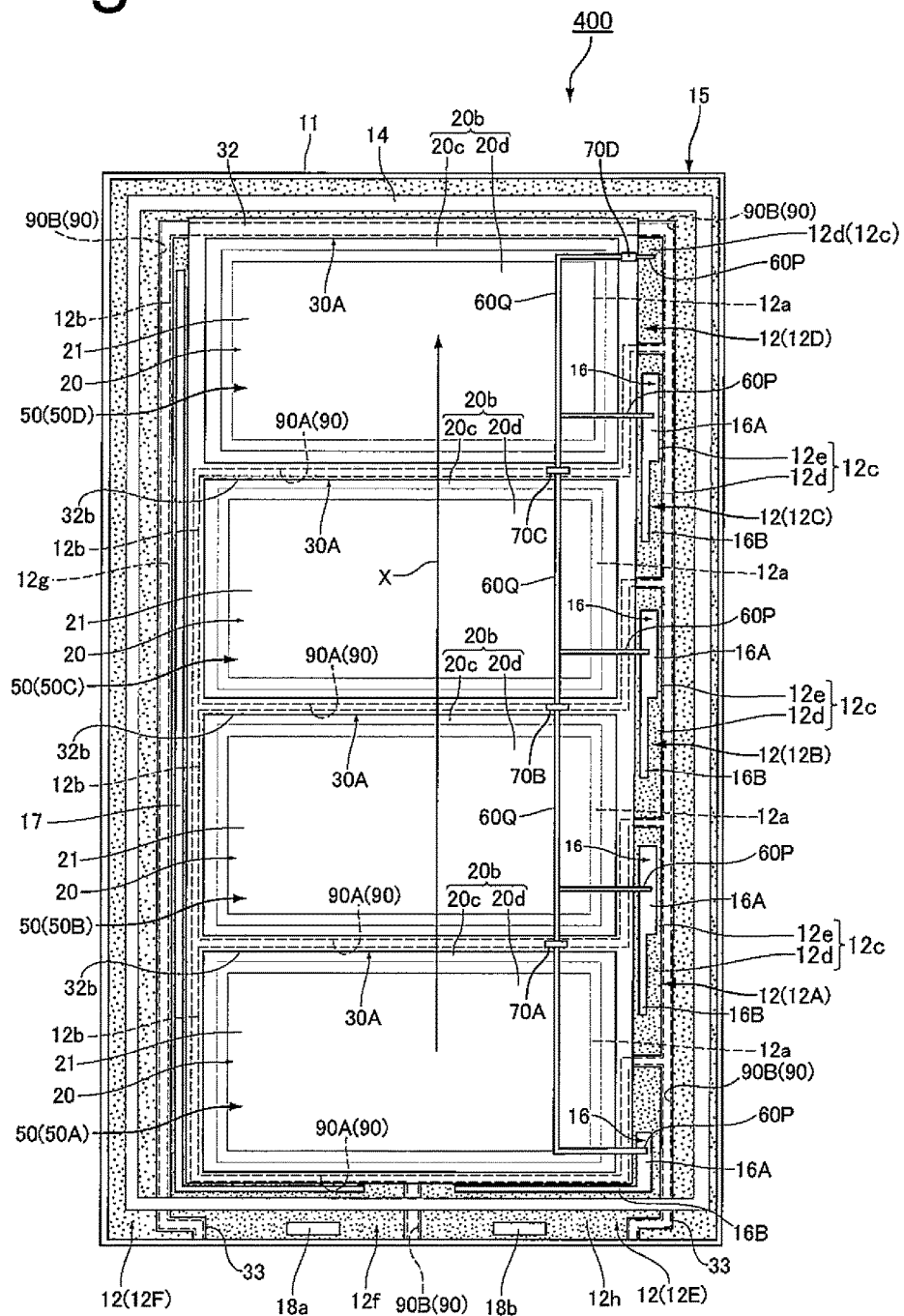
FIG. 16 is a plan view illustrating a portion of a fourth embodiment of the dye-sensitized solar cell element of the invention.

In addition, in the above-described embodiments, the second groove 90B which intersects the coupling portion 14 between the back sheet 80 and the conductive substrate 15 is not covered with the insulating material 33 made of a glass frit. However, like the DSC module 400 illustrated in FIG. 16, the second groove 90B is preferably covered with the insulating material 33 made of a glass frit. Meanwhile, in FIG. 16, the back sheet 80 is omitted. As illustrated in FIG. 16, if the second groove 90B intersects the coupling portion 14, moisture can be infiltrated through the second groove 90B into the space between the back sheet 80 and the conductive substrate 15. In this case, the insulating material 33 enters into the second groove 90B, and the insulating material 33 covers an edge portion of the portion of the transparent conductive film 12 excluding the main body portion 12a, so that the infiltration of the moisture from the outer side of the back sheet 80 into the inner side is sufficiently suppressed. For this reason, the entrance of the moisture being infiltrated into the space between the back sheet 80 and the conductive substrate 15 into the inner side of the sealing portion 30A through the sealing portion 30A is sufficiently suppressed. For this reason, a deterioration in durability of the DSC module 400 can be sufficiently suppressed.

Figure 17:
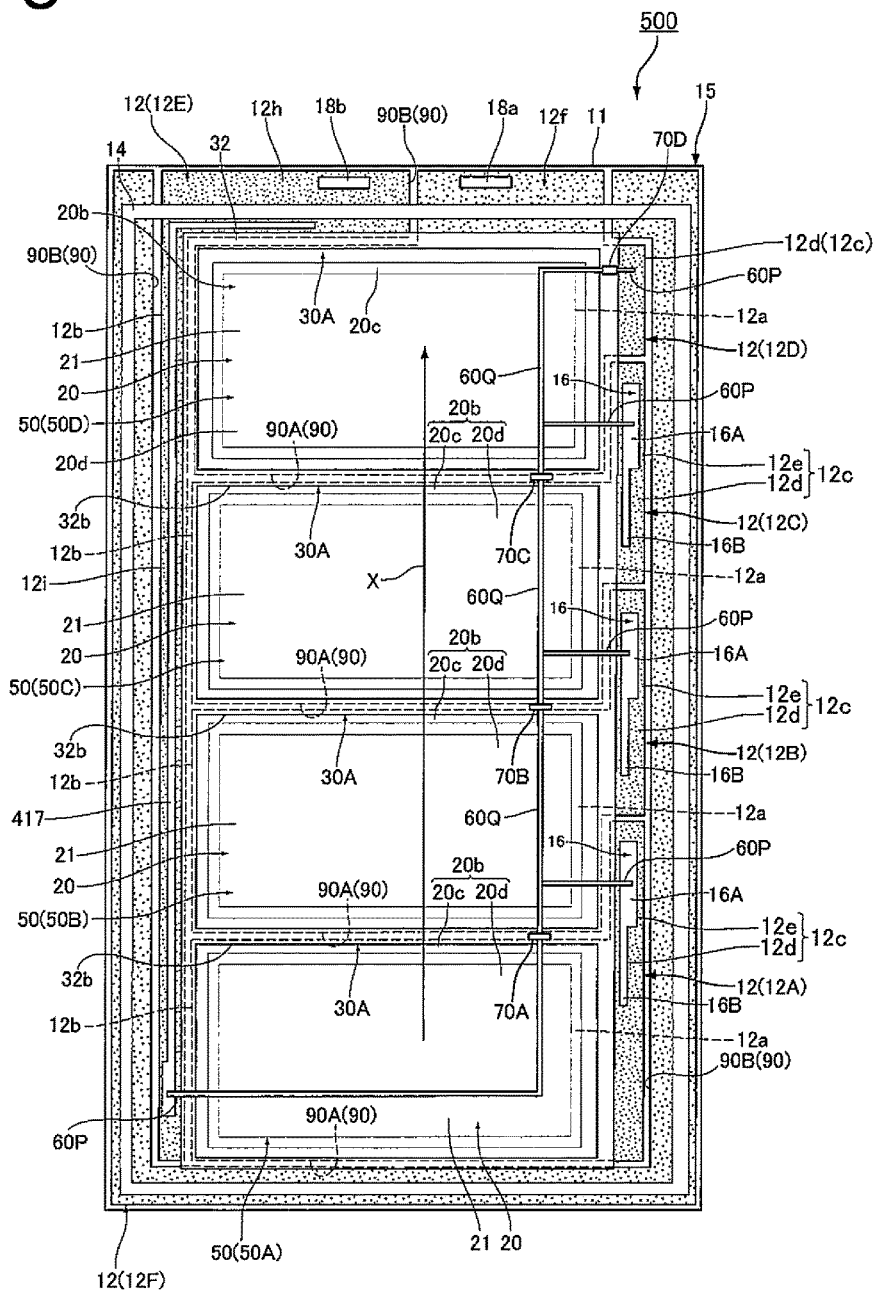
FIG. 17 is a plan view illustrating a portion of a fifth embodiment of the dye-sensitized solar cell element of the invention.

Furthermore, in the above embodiment, the first current extracting portion 12f and the second current extracting portion 12h are disposed in the vicinity on the DSC 50A side, but the first current extracting portion 12f and the second current extracting portion 12h may be disposed in the vicinity on the DSC 50D side as illustrated in a DSC module 500 illustrated in FIG. 17. In this case, the first current extracting portion 12f is provided so as to protrude on the side opposite to the DSC 50C with respect to the main body portion 12a of the transparent conductive layer 12D to the outer side of the sealing portion 30A. On the other hand, the second current extracting portion 12h is provided on the side opposite to the DSC 50C with respect to the main body portion 12a of the transparent conductive layer 12D. In addition, the connecting portion 12i as a second connecting portion extends along the transparent conductive layers 12A to 12D, and this connecting portion 12i connects the second current extracting portion 12f and the metal substrate 21 of the counter electrode 20 of the DSC 50A. Specifically, a current collecting wiring 417 is provided on the connecting portion 12i along the connecting portion 12i, and this current collecting wiring 417 is connected with the conductive material 60P extending from the bypass diode 70A. It is possible to achieve space saving while exhibiting excellent photoelectric conversion characteristics by this DSC module 500 as well. Meanwhile, in this case, it is the same as the above embodiment that it is preferable that the resistance value of the connecting portion 12i be equal to or less than the resistance value represented by the following Equation (1).

$$\text{Resistance value} = \text{number of DSC 50 connected in series} \times 120\Omega \tag{1}$$

In the above-described embodiments, the concave bending portion 20d may not be provided. Namely, the height H2 of the bonding edge portion 20a from the transparent substrate 11 may be equal to the height H3 of the concave bending portion 20d from the transparent substrate 11.

In addition, in the above-described embodiments, the convex bending portion 20c may not be necessarily provided at a position adjacent to the bonding edge portion 20a, but the convex bending portion may be provided at a position separated from the bonding edge portion 20a.

Furthermore, in the above-described embodiment, the convex bending portion 20c has an annular shape. However, the convex bending portion 20c may not necessarily have an annular shape. For example, the convex bending portion may be provided on only a portion of the annular portion adjacent to the bonding edge portion 20a.

Figure 18:
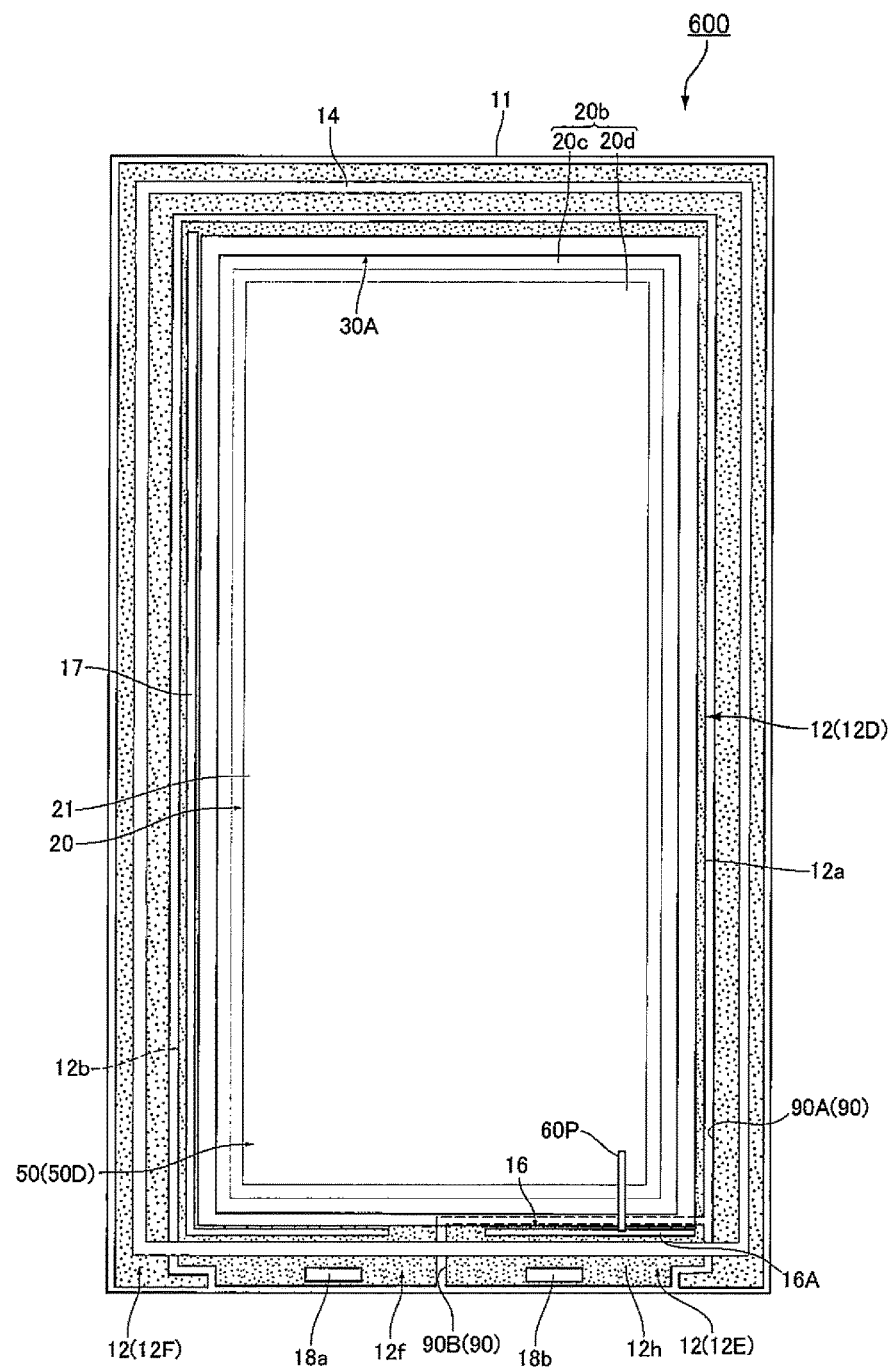
FIG. 18 is a plan view illustrating a portion of a sixth embodiment of the dye-sensitized solar cell element of the invention.

Furthermore, in the above-embodiments, the plurality of DSCs 50 are used but, like a dye-sensitized solar cell element 600 illustrated in FIG. 18, only one DSC 50 may be used. Meanwhile, in the dye-sensitized solar cell element 600 illustrated in FIG. 18, the DSC 50A to DSC 50C are omitted, and the connecting terminal 16 provided on the second current extracting portion 12h is electrically connected with the metal substrate 21 of the counter electrode 20 of the DSC 50D via the conductive material 60P. In addition, in the dye-sensitized solar cell element 600, the connecting terminal 16 is constituted by only the conductive material connecting portion 16A, and this conductive material connecting portion 16A is disposed between the sealing portion 30A and the coupling portion 14. In other words, the conductive material connecting portion 16A is not disposed at the position facing the side edge portion 12b of the main body portion 12a of the transparent conductive layer 12D of the DSC 50D. For this reason, it is possible to increase the oxide semiconductor layer 13 in size to the space at the part at which the conductive material connecting portion 16A is disposed in the DSC module 100 of the first embodiment. In this case, it is possible to increase the area for power generation in size as well as to effectively utilize the wasted space.

In addition, in the above-described embodiments, the counter electrode 20 constitutes a second base material. However, like the DSC 700 illustrated in FIG. 19, instead of the counter electrode 20, an insulating substrate 701 may be used as the counter substrate. In this case, a structure body 702 is arranged in the space among the insulating substrate 701, the sealing portion 31a, and the conductive substrate 15. The structure body 702 is provided on the surface of the side close to the insulating substrate 701 among the conductive substrate 15. The structure body 702 is configured by an oxide semiconductor layer 13, a porous insulating layer 703, and a counter electrode 720 in this order from the side close to the conductive substrate 15. In addition, an electrolyte 40 is arranged in the space. The electrolyte 40 is infiltrated into the inner portions of the oxide semiconductor layer 13 and the porous insulating layer 703. Herein, as the insulating substrate 701, for example, a glass substrate, a resin film, or the like may be used. In addition, as the counter electrode 720, the same as the counter electrode 20 may be used. Alternatively, the counter electrode 720 may be configured with, for example, a single porous layer containing a carbon or the like. The porous insulating layer 703 is used to mainly prevent physical contact between the oxide semiconductor layer 13 and the counter electrode 720 and to make the electrolyte 40 infiltrate into the inner portion thereof. As the porous insulating layer 703, for example, a sintered body of an oxide may be used. Meanwhile, in the DSC 700 illustrated in FIG. 19, only one structure body 702 is provided in the space among the sealing portion 31a, the conductive substrate 15, and the insulating substrate 701. However, a plurality of the structure bodies 702 may be provided. In addition, the porous insulating layer 703 is provided between the oxide semiconductor layer 13 and the counter electrode 720. However, the porous insulating layer may be provided between the conductive substrate 15 and the counter electrode 720 so as to surround the oxide semiconductor layer 13. In this configuration as well, physical contact between the oxide semiconductor layer 13 and the counter electrode 720 can be prevented.

Figure 19:
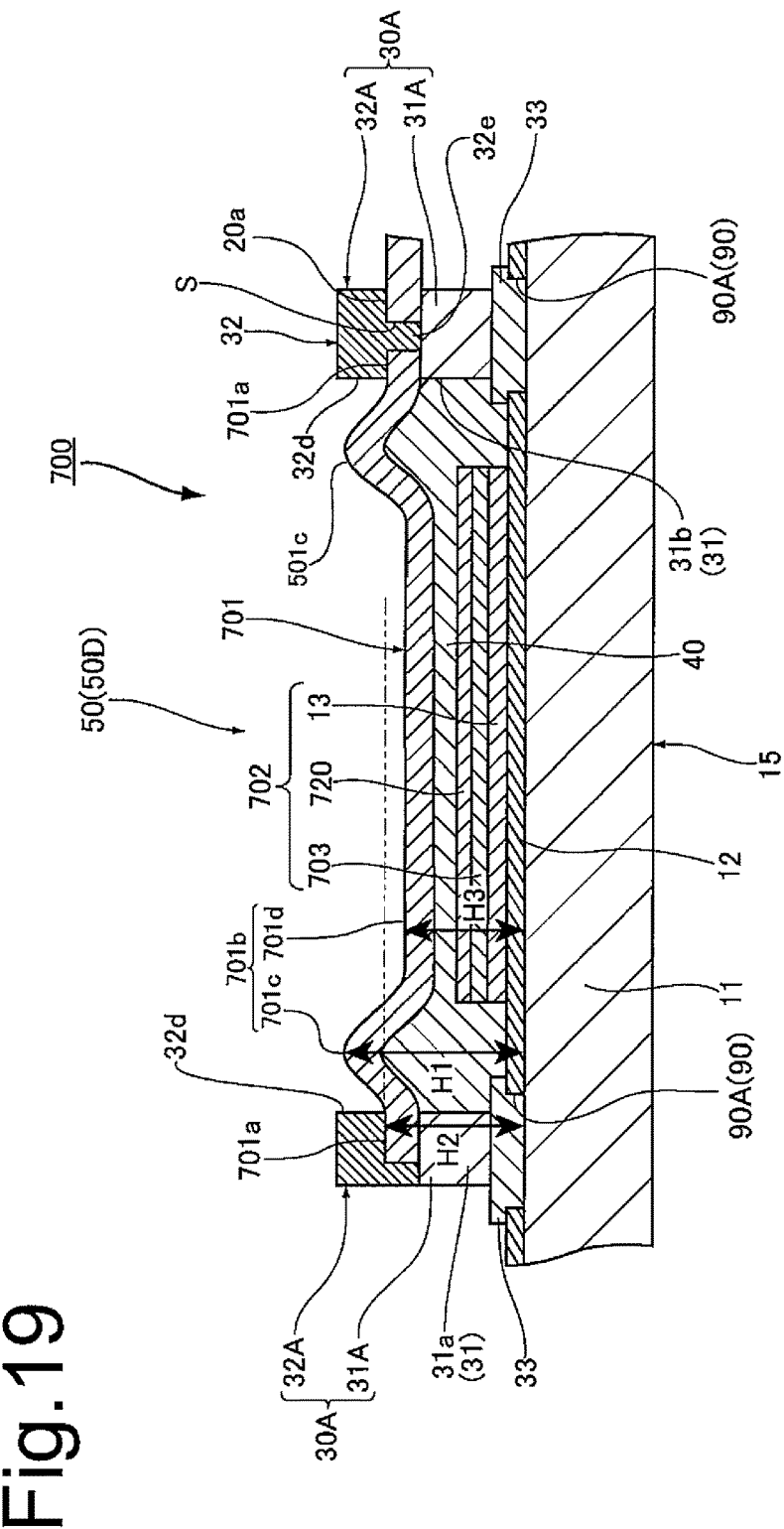
FIG. 19 is a plan view illustrating a portion of a seventh embodiment of the dye-sensitized solar cell element of the invention.

Meanwhile, in FIG. 19, a portion of the main body portion 701b of the insulating substrate 701 becomes a convex bending portion 701c which is bent to be convex toward a side opposite to the conductive substrate 15. In FIG. 19, the convex bending portion 701c has an annular shape. Furthermore, the convex bending portion 701c is arranged at a position adjacent to the bonding edge portion 701a. In addition, the remaining portion of the main body portion 701b has a concave bending portion 701d which is bent to be concave toward a side close to the oxide semiconductor layer 13. Specifically, the concave bending portion 701d is arranged in an inner side of the annular convex bending portion 701c. Herein, as illustrated in FIG. 19, a height H1 of the convex bending portion 701c from the transparent substrate 11 is larger than a height H2 of the bonding edge portion 701a from the transparent substrate 11. In addition, a height H3 of the concave bending portion 701d is smaller than the height H2 of the bonding edge portion 701a.

Meanwhile, in FIG. 19, the concave bending portion 701d may not be provided. Namely, the height H2 of the bonding edge portion 701a from the transparent substrate 11 may be equal to the height H3 of the concave bending portion 701d from the transparent substrate 11. In addition, in FIG. 19, the convex bending portion 701c may not be necessarily provided at a position adjacent to the bonding edge portion 701a. The convex bending portion may be provided at a position separated from the bonding edge portion 701a.

In addition, in the above-described embodiments, the counter electrode 20 of the DSC module 200 has the convex bending portion 20c. However, like the DSC module 800 illustrated in FIG. 20, even in a case where the counter electrode 20 does not have the convex bending portion 20c, it is possible to have excellent durability (See FIGS. 21 and 22).

Figure 20:
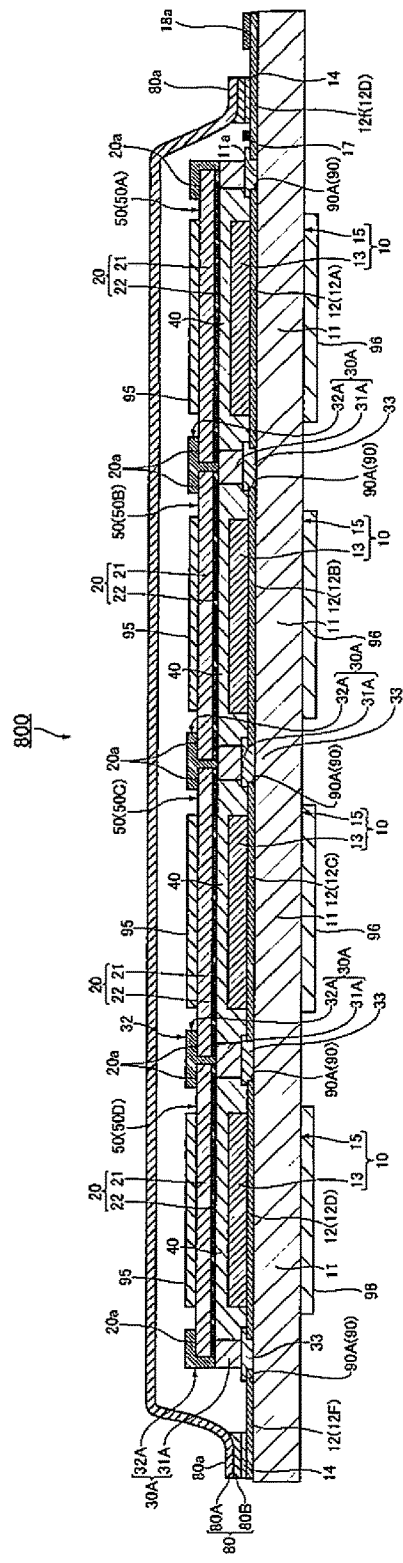
FIG. 20 is a cross-sectional view illustrating a first reference form of the dye-sensitized solar cell element.

In addition, in the DSC module 800 illustrated in FIG. 20, the DSCs 50A to 50D are arrayed in a row along the X direction of FIG. 2. However, like the DSC module 900 illustrated in FIG. 23, the DSCs 50C and 50D as portions of the DSCs 50A to 50D may be arranged to be folded back in the middle thereof, and the DSC 50A and the DSC 50D may be arranged so that they are adjacent to each other. In this case, unlike the DSC module 100, in the transparent conductive film 12D, the connecting portion 12g may not be necessarily provided between the main body portion 12a and the first current extracting portion 12f. For this reason, the current collecting wiring 17 may not also be necessarily provided.

Figure 24:
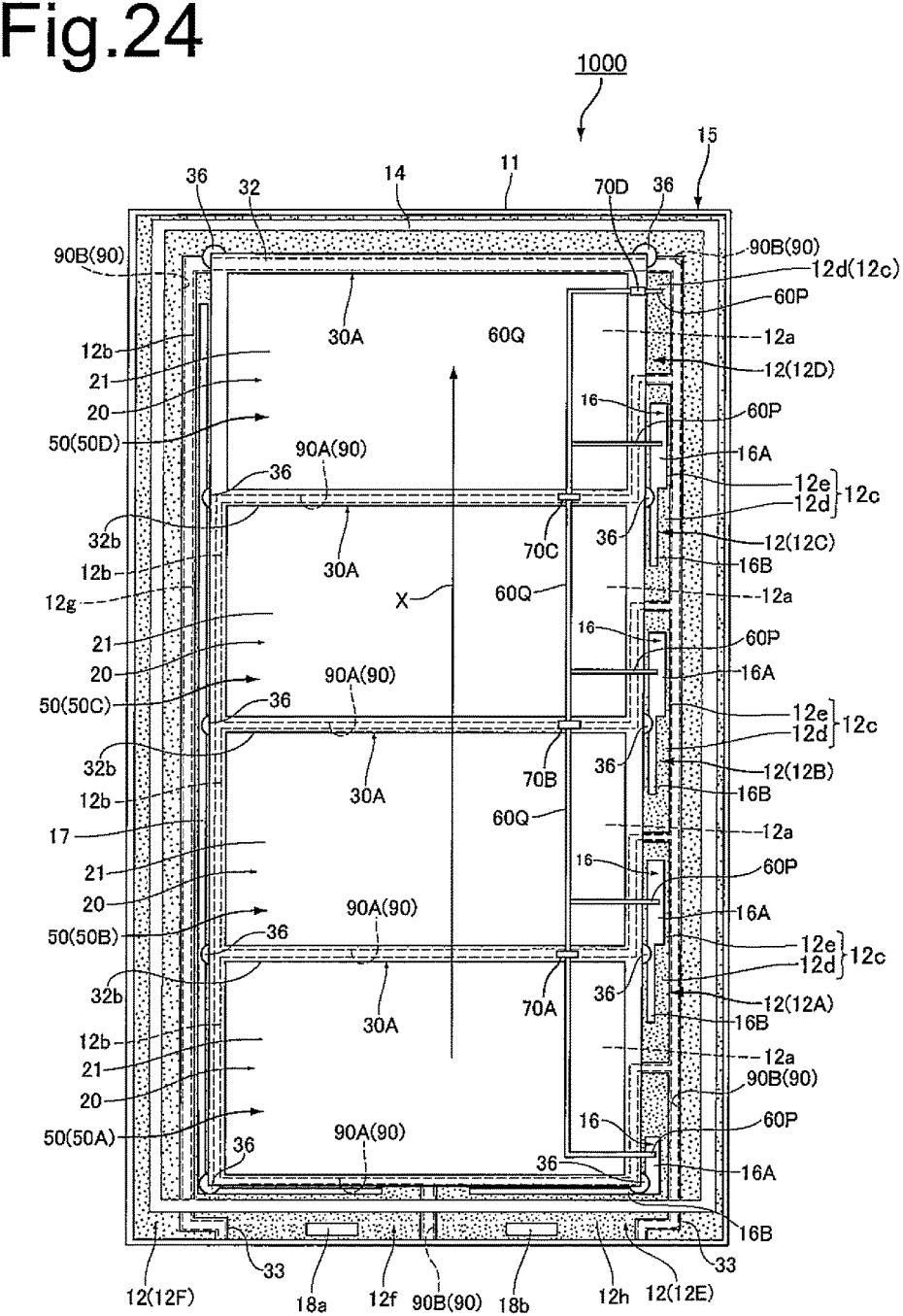
FIG. 24 is a plan view illustrating a portion of a third reference form of the dye-sensitized solar cell element.

In addition, in the DSC module 800 illustrated in FIG. 20, the second groove 90B which intersects the coupling portion 14 between the back sheet 80 and the conductive substrate 15 is not covered with the insulating material 33 made of a glass frit. However, like the DSC module 1000 illustrated in FIG. 24, the second groove 90B is preferably covered with the insulating material 33 made of a glass frit. Meanwhile, in FIG. 24, the back sheet 80 is omitted. As illustrated in FIG. 24, if the second groove 90B intersects the coupling portion 14, moisture can be infiltrated through the second groove 90B into the space between the back sheet 80 and the conductive substrate 15. In this case, the insulating material 33 enters into the second groove 90B, and the insulating material 33 covers an edge portion of the portion of the transparent conductive film 12 excluding the main body portion 12a, so that the infiltration of the moisture from the outer side of the back sheet 80 into the inner side is sufficiently suppressed. For this reason, the entrance of the moisture being infiltrated into the space between the back sheet 80 and the conductive substrate 15 into the inner side of the sealing portion 30A through the sealing portion 30A is sufficiently suppressed. For this reason, a deterioration in durability of the DSC module 1000 can be sufficiently suppressed.

Figure 25:
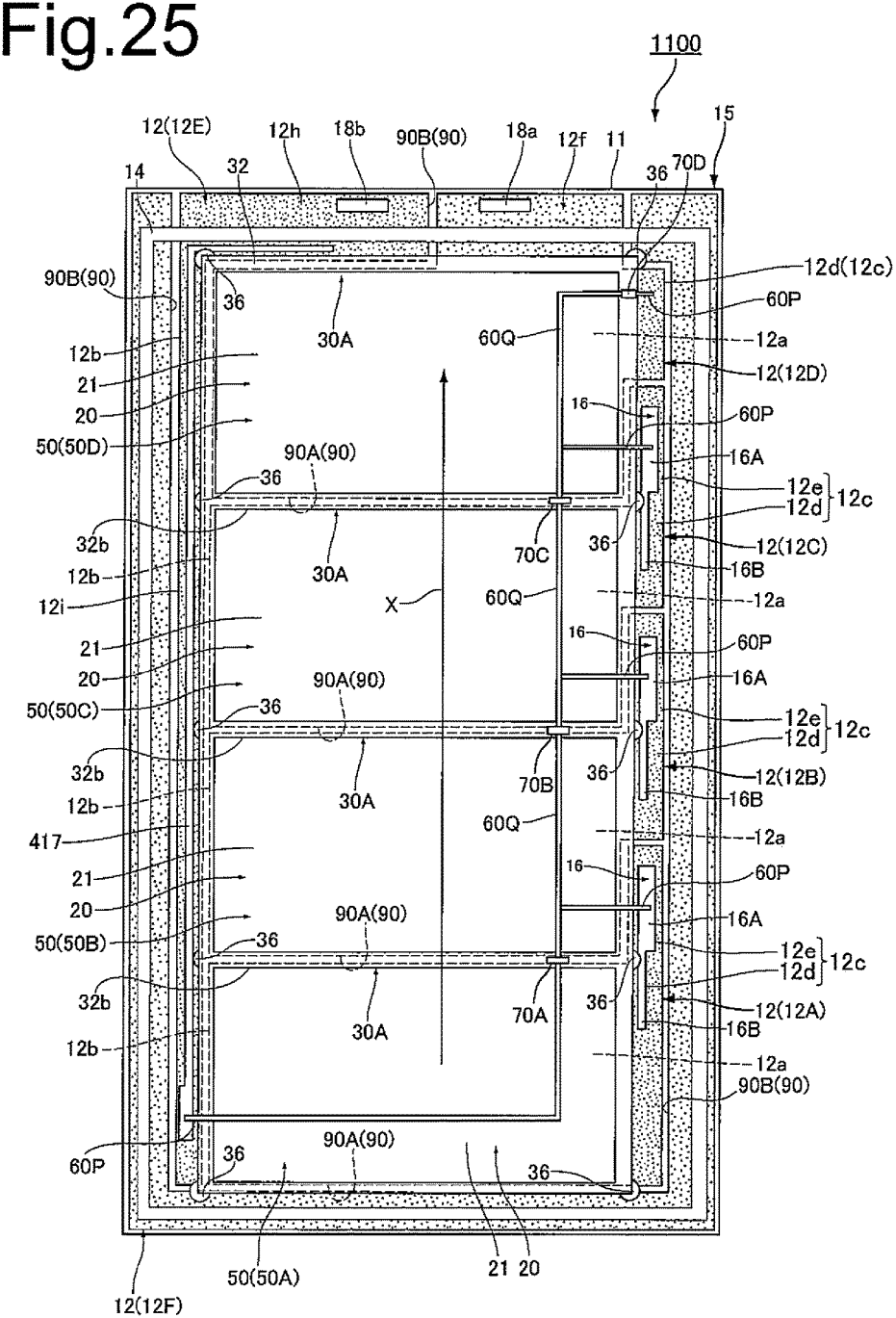
FIG. 25 is a plan view illustrating a portion of a fourth reference form of the dye-sensitized solar cell element.

Furthermore, in the DSC module 800 illustrated in FIG. 20, the first current extracting portion 12f and the second current extracting portion 12h are arranged in the periphery of a side close to the DSC 50A. However, as illustrated in the DSC module 1100 illustrated in FIG. 25, the first current extracting portion 12f and the second current extracting portion 12h may be arranged in the periphery of a side close to the DSC 50D. In this case, the first current extracting portion 12f is provided so to protrude up to the outer side of the sealing portion 30A toward the side opposite to the DCS 50C with respect to the main body portion 12a of the transparent conductive film 12D. On the other hand, the second current extracting portion 12h is provided on a side opposite to the DSC 50C with respect to the main body portion 12a of the transparent conductive film 12D. In addition, a connecting portion 12i as a second connecting portion extends along the transparent conductive films 12A to 12D, and the connecting portion 12i is connected to the second current extracting portion 12f and the metal substrate 21 of the counter electrode 20 of the DSC 50A. Specifically, a current collecting wiring 417 is provided along the connecting portion 12i on the connecting portion 12i, and this current collecting wiring 417 is connected to a conductive material 60P extending from a bypass diode 70A. According to the DSC module 1100 as well, it is possible to save space while having excellent photoelectric conversion characteristics. Meanwhile, in this case, like the above-described embodiments, a resistance value of the connecting portion 12i is preferably equal to or less than the resistance value expressed by the following formula (1):

Resistance Value=Number of DSCs 50 connected in series×120Ω    (1)

Figure 26:
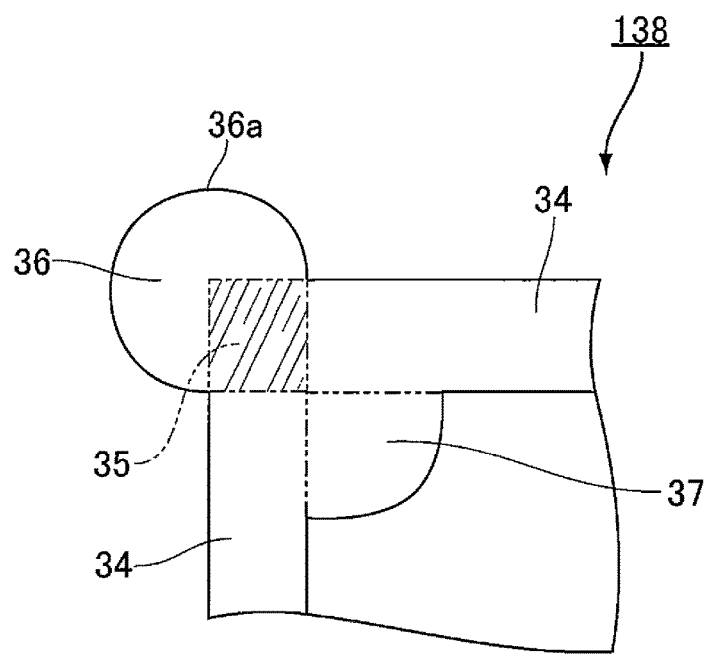
FIG. 26 is a partial view illustrating a modified example of the bonding surface of FIG. 13.

In addition, in the DSC module 800 illustrated in FIG. 20, as illustrated in FIG. 26, preferably, the bonding surface 138 between the integrated sealing portion and the conductive substrate 15 further has inward-swelling portions 37 which swell toward inner sides of the intersecting portions 35.

In this case, if the DSC module 800 is placed under a low temperature environment and, thus, the working electrode 10 is contracted, a stress directing toward the inner sides with respect to the intersecting portions 35 of the linear portions 34 is concentrated on the bonding surface 138 between the integrated sealing portion and the working electrode 10 accordingly. In this respect, in the DSC module 800, the bonding surface 138 has the inward-swelling portions 37 which swell toward inner sides of the intersecting portions 35. For this reason, the stress is also distributed to the inward-swelling portions 37. As a result, a decrease in strength of adhesion between the integrated sealing portion and the working electrode 10 is sufficiently suppressed, so that it is possible to have more excellent durability compared to a case where the bonding surface 138 does not has the inward-swelling portion 37.

Figure 27:
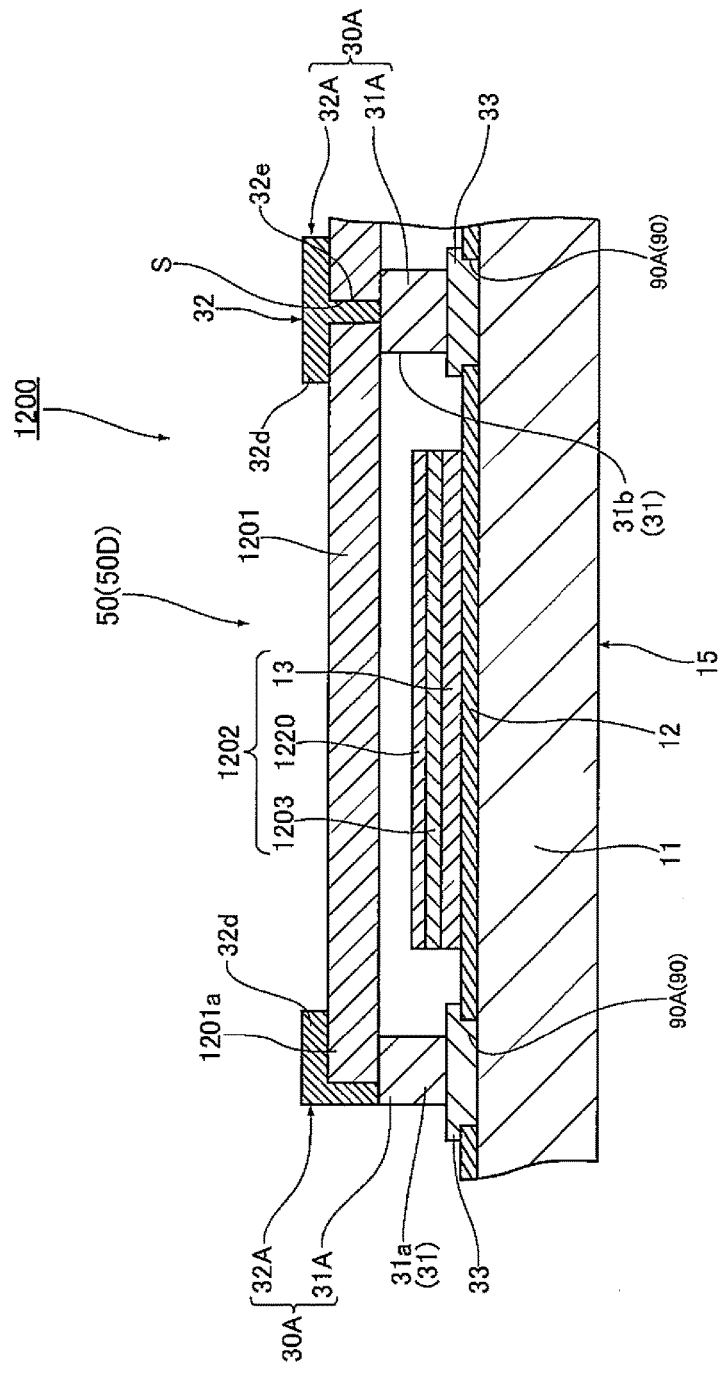
FIG. 27 is a partial cross-sectional view illustrating a fifth reference form of the dye-sensitized solar cell element.

In addition, in the DSC module 800 illustrated in FIG. 20, the counter electrode 20 constitutes the second base material. However, like the DSC module 1200 illustrated in FIG. 27, instead of the counter electrode 20, an insulating substrate 1201 may be used as the counter substrate. In this case, a structure body 1202 is arranged in the space among the insulating substrate 1201, the sealing portion 31a, and the conductive substrate 15. The structure body 1202 is provided on the surface of the side close to the insulating substrate 1201 among the conductive substrate 15. The structure body 1202 is configured by a porous oxide semiconductor layer 13, a porous insulating layer 1203, and a counter electrode 1220 in this order from the side close to the conductive substrate 15. In addition, the electrolyte is disposed in the space. The electrolyte is infiltrated into the inner portions of the porous oxide semiconductor layer 13 and the porous insulating layer 1203. As the electrolyte, the same as the electrolyte 40 may be used. Herein, as the insulating substrate 1201, for example, a glass substrate, a resin film, or the like may be used. In addition, as the counter electrode 1220, the same as the counter electrode 20 may be used. Alternatively, the counter electrode 1220 may be configured with, for example, a single porous layer containing a carbon or the like. The porous insulating layer 1203 is used to mainly prevent physical contact between the porous oxide semiconductor layer 13 and the counter electrode 1220 and to make the electrolyte 40 infiltrate into the inner portion thereof. As the porous insulating layer 1203, for example, a sintered body of an oxide may be used. Meanwhile, in the dye-sensitized solar cell 1200 illustrated in FIG. 27, only one structure body 1202 is provided in the space among the sealing portion 31a, the conductive substrate 15, and the insulating substrate 1201. However, a plurality of the structure bodies 1202 may be provided. In addition, the porous insulating layer 1203 is provided between the porous oxide semiconductor layer 13 and the counter electrode 1220. However, the porous insulating layer 1203 may be provided between the conductive substrate 15 and the counter electrode 1220 so as to surround the porous oxide semiconductor layer 13. In this configuration as well, physical contact between the porous oxide semiconductor layer 13 and the counter electrode 1220 can be prevented.

Figure 28:
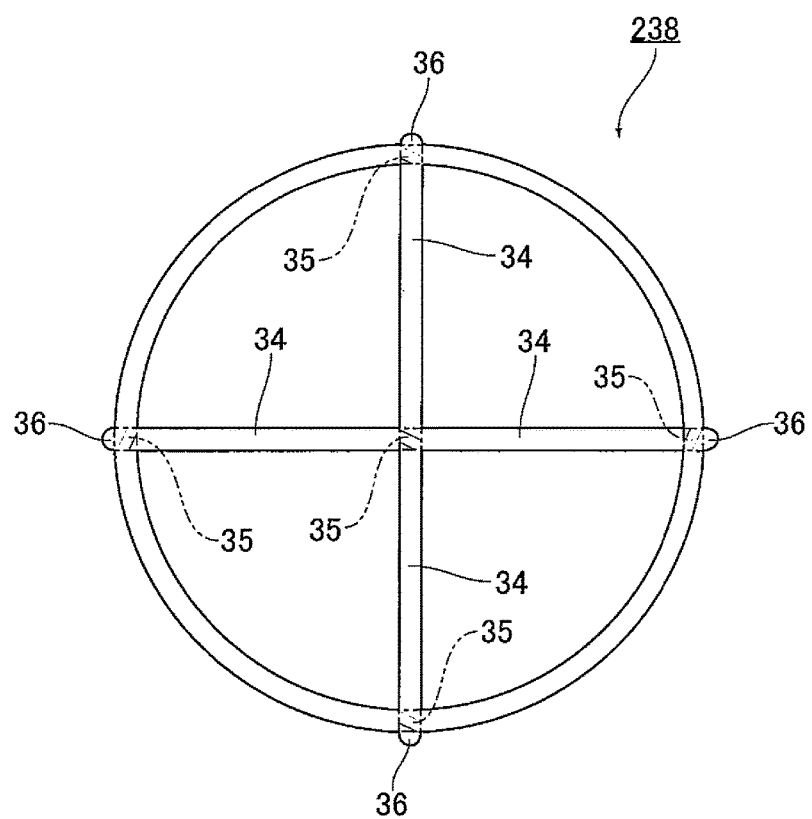
FIG. 28 is a view illustrating another modified example of the bonding surface.

Furthermore, in the DSC module 800 illustrated in FIG. 20, the bonding surface 38 includes only the linear portions 34 having a straight line shape as the linear portions. However, like a bonding surface 238 illustrated in FIG. 28, linear portions having a circular arc shape as well as the linear portions 34 having a straight line shape may be included as the linear portions.

Furthermore, in the DSC module 800 illustrated in FIG. 20, only the bonding surface 38 between the first integrated sealing portion 31A and the conductive substrate 15 has the outward-swelling portion 36, but the bonding surface between the first integrated sealing portion 31A and the counter electrode 20 does not have the outward-swelling portion 36. However, the bonding surface 38 between the first integrated sealing portion 31A and the conductive substrate 15 may not have the outward-swelling portion 36, and only the bonding surface between the first integrated sealing portion 31A and the counter electrode 20 may have the outward-swelling portion 36. Alternatively, only the bonding surface 38 between the first integrated sealing portion 31A and the conductive substrate 15 may have the outward-swelling portion 36, and the bonding surface between the first integrated sealing portion 31A and the counter electrode 20 may also have the outward-swelling portion 36.

Figure 29:
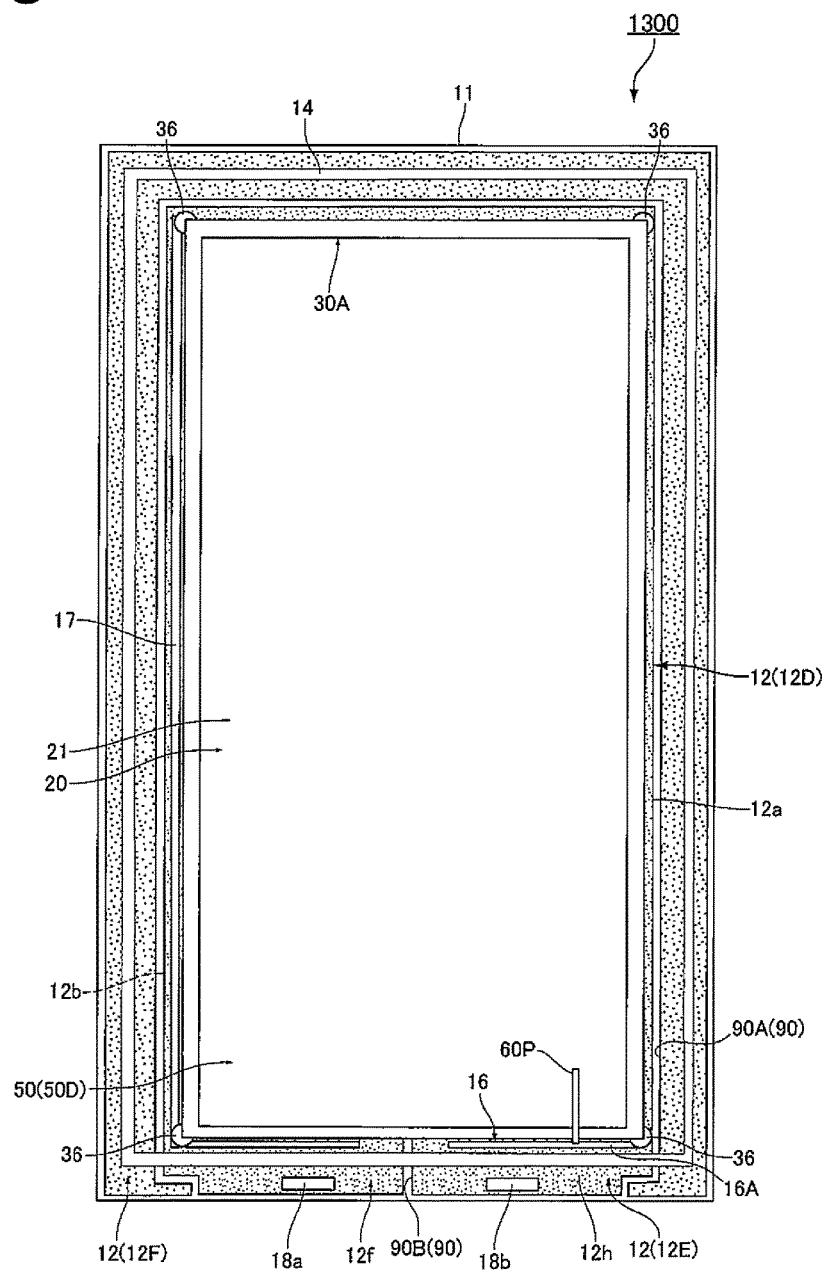
FIG. 29 is a plan view illustrating a portion of a sixth reference form of the dye-sensitized solar cell element.

Furthermore, in the DSC module 800 illustrated in FIG. 20, a plurality of DSCs 50 are used. However, like a DSC module 1300 illustrated in FIG. 29, only one DSC 50 may be used. In this case, the bonding surface between the sealing portion 30A and the conductive substrate 15 has the outward-swelling portion 36. In addition, in the DSC module 1300 illustrated in FIG. 29, the DSCs 50A to 50C are omitted, and the connecting terminal 16 provided on the second current extracting portion 12h and the metal substrate 21 of the counter electrode 20 of the DSC 50D are electrically connected to each other through the conductive material 60P. In addition, in the DSC module 1300, the connecting terminal 16 is configured with only the conductive material connecting portion 16A, and the conductive material connecting portion 16A is arranged between the sealing portion 30A and the coupling portion 14. Namely, the conductive material connecting portion 16A is not arranged at a position of the transparent conductive film 12D of the DCS 50D facing a side edge portion 12b of the main body portion 12a. For this reason, in the DSC module 1300, the oxide semiconductor layer 13 can be extended up to the space of the portion where the conductive material connecting portion 16A is arranged. In this case, a useless space can be effectively used, and a surface area of generating electricity can be increased.

In addition, in the above embodiment, the groove 90 has the second groove 90B, but the second groove 90B may not be necessarily formed.

In addition, in the above embodiment, the widths of the conductive material connecting portion 16A and the conductive material non-connecting portion 16B of the connecting terminal 16 are set to be constant, but each of the widths of the conductive material connecting portion 16A and the conductive material non-connecting portion 16B may change along the extending direction of the connecting terminal 16. For example, the width may monotonically increase from the end portion on the farthest side from the conductive material connecting portion 16A of the conductive material non-connecting portion 16B toward the end portion on the closest side thereof, and the width may monotonically increase from the end portion of the conductive material non-connecting portion 16B side of the conductive material connecting portion 16A toward the end portion on the farthest side from the conductive member non-connecting portion 16B.

In addition, in the above embodiment, the conductive material connecting portion 16A and the conductive material non-connecting portion 16B are provided along the sealing portion 30A, respectively, but these may be formed so as to extend in the direction away from the sealing portion 30A. However, in this case, it is preferable that the conductive material connecting portion 16A be disposed at the position closer to the sealing portion 30A than the conductive material non-connecting portion 16B. In this case, it is possible to more shorten the conductive material 60P.

Alternatively, in the connecting terminal 16 formed on the transparent conductive layers 12A to 12C, the conductive material non-connecting portion 16B may be disposed so that its extending direction is orthogonal to the extending direction of the conductive material connecting portion 16A.

In addition, the width of the conductive material connecting portion 16A may be equal to or less than the width of the conductive material non-connecting portion 16B.

In addition, in the above embodiment, the second sealing portion 32A is adhered to the first sealing portion 31A, but the second sealing portion 32A may not be adhered to the first sealing portion 31A.

Furthermore, in the above embodiment, the sealing portion 30A is constituted by the first sealing portion 31A and the second sealing portion 32A, but the second sealing portion 32A may be omitted.

In addition, in the above embodiment, the width P of the adhesive portion of the counter electrode 20 with the partitioning portion 31b of the first integrated sealing portion 31 is narrower than the width Q of the adhesive portion of the counter electrode 20 with the annular portion 31a of the first integrated sealing portion 31, but the width P of the adhesive portion may be equal to or more than the width Q of the adhesive portion.

Furthermore, in the above embodiment, the width R of the partitioning portion 31b of the first integrated sealing portion 31 is 100% or more and less than 200% of the width T of the annular portion 31a of the first integrated sealing portion 31, but the width R of the partitioning portion 31b may be less than 100% or 200% or more of the width T of the annular portion 31a of the first integrated sealing portion 31.

In addition, in the above embodiment, the back sheet 80 is adhered to the transparent conductive layer 12 via the coupling portion 14 made of a glass frit, but the back sheet 80 is not required to be necessarily adhered to the transparent conductive layer 12 via the coupling portion 14.

Furthermore, in the above embodiment, the coupling portion 14 is spaced apart from the insulating material 33, but it is preferable that both of these be constituted by a glass frit and integrated. In this case, the interface between the coupling portion 14 and the conductive substrate 15 and the interface between the sealing portion 30A and the conductive substrate 15 are not present even if moisture penetrates into the space between the back sheet 80 and the conductive substrate 15. In addition, both of the insulating material 33 and the coupling portion 14 are composed of a glass frit and thus have a higher sealing ability compared to a resin. For this reason, it is possible to sufficiently suppress the penetration of moisture through the interface between the coupling portion 14 and the conductive substrate 15 and the interface between the insulating material 33 and the conductive substrate 15.

In addition, in the above embodiment, the insulating material 33 is composed of a glass frit, but the material constituting the insulating material 33 may be one having a higher melting point than the material constituting the first sealing portion 30A. For this reason, examples of such a material may include a thermosetting resin such as a polyimide resin and a thermoplastic resin in addition to a glass frit. Among them, it is preferable to use a thermosetting resin. In this case, even if the sealing portion 30A exhibits fluidity at a high temperature, the insulating material 33 is less likely to be fluidized even at a high temperature compared to the case of being composed of a thermoplastic resin in the same manner as the case of being composed of a glass frit. For this reason, the contact of the conductive substrate 15 with the counter electrode 20 can be sufficiently suppressed, and thus the short circuit between the conductive substrate 15 and the counter electrode 20 can be sufficiently suppressed.

In addition, in the above-described embodiments, the conductive substrate 15 has the insulating material 33. However, the conductive substrate 15 may not have the insulating material 33. In this case, the sealing portion 30A and the first integrated sealing portion 31A are bonded to the transparent substrate 11 and the transparent conductive film 12.

In addition, in the above-described embodiments, the conductive substrate 15 has the connecting terminal 16. However, the conductive substrate may not include the connecting terminal 16.

Moreover, in the above embodiment, the plurality of DSCs 50 are connected in series but may be connected in parallel.

Figure 15:
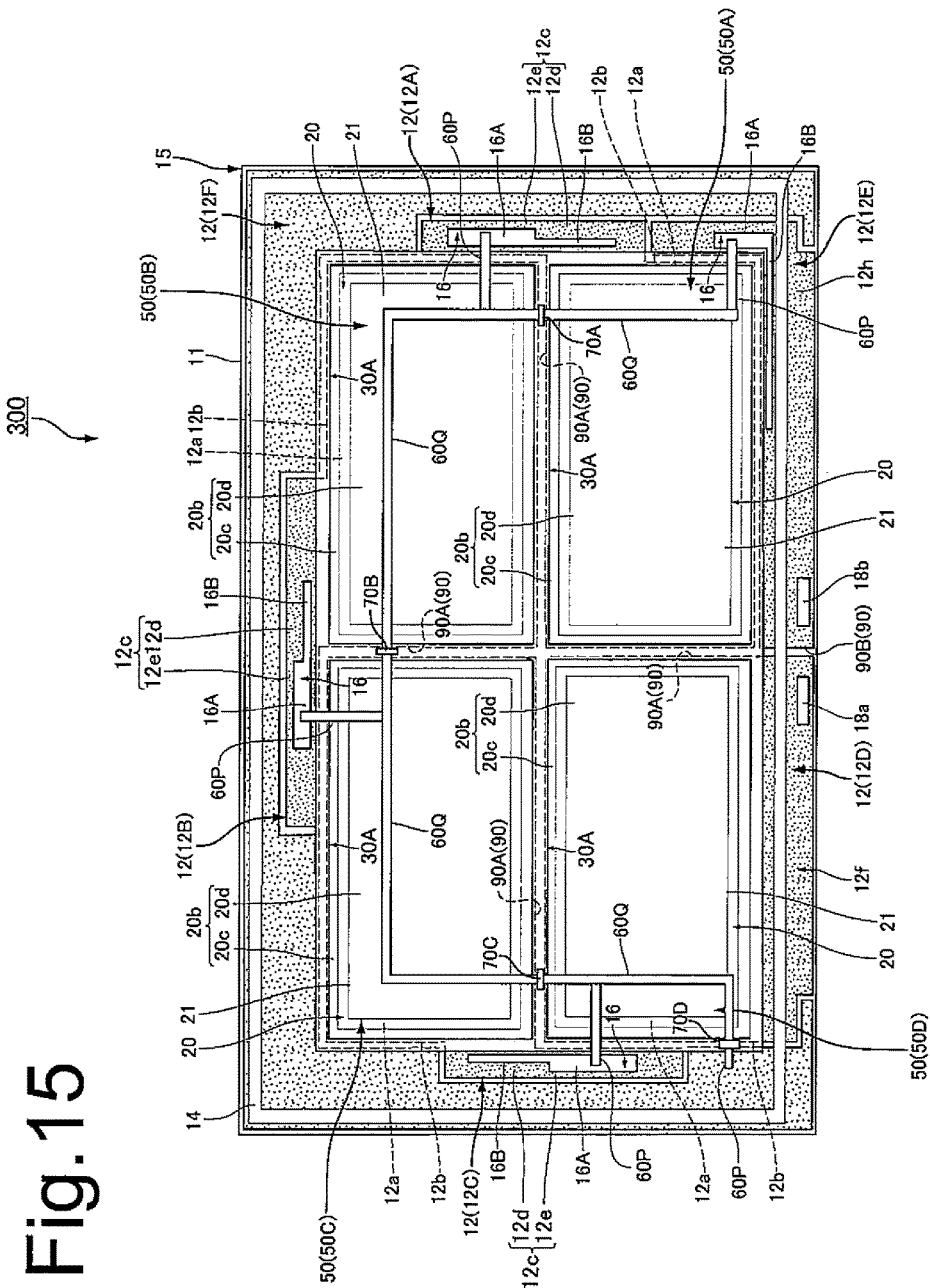
FIG. 15 is a plan view illustrating a portion of a third embodiment of the dye-sensitized solar cell element of the invention.
Figure 23:
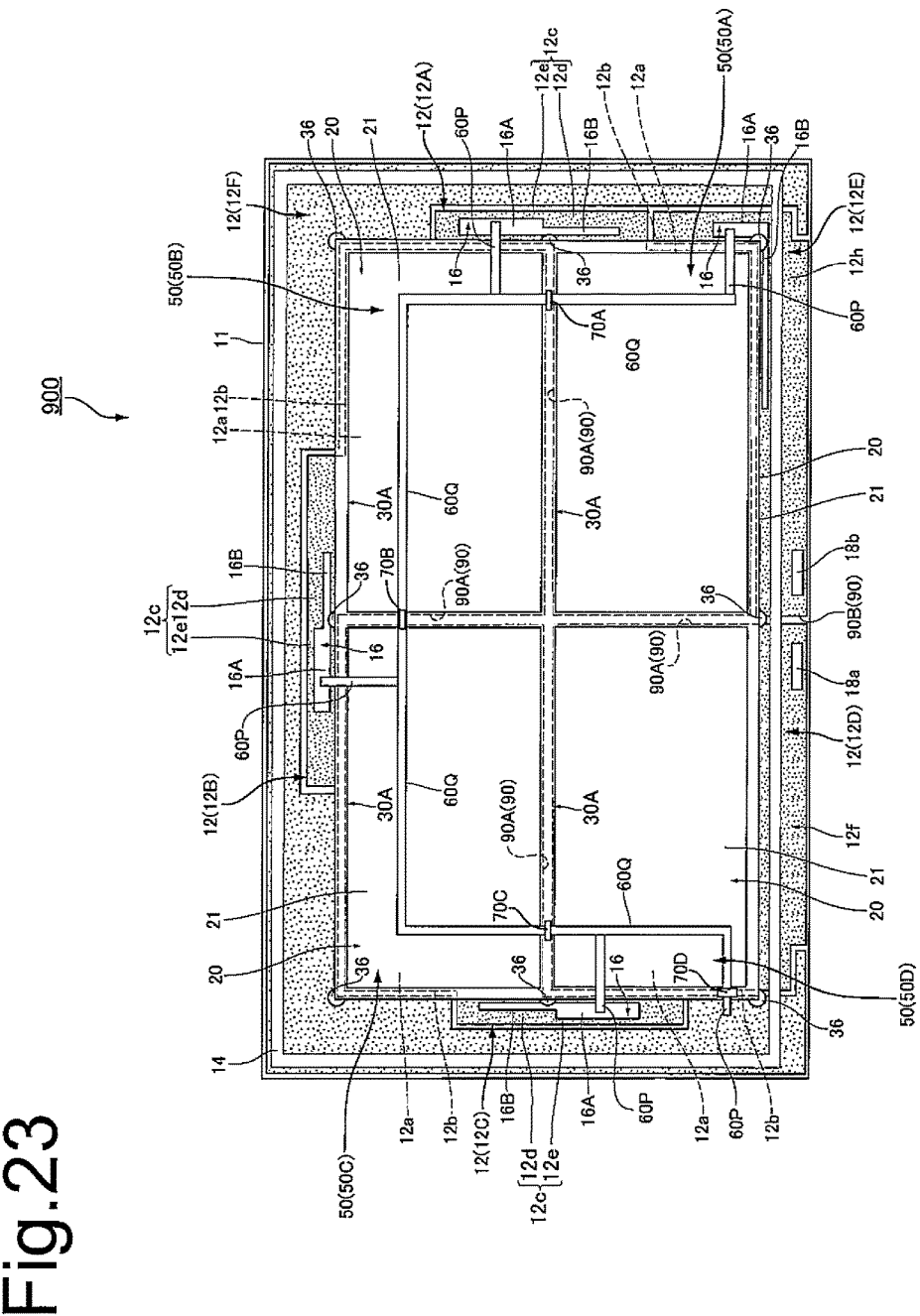
FIG. 23 is a plan view illustrating a portion of a second reference form of the dye-sensitized solar cell element.

In addition, in the above-described embodiments, the number of DSCs 50 is four. However, the number of DSCs may be one or more, and it is not limited to four. In this manner, in a case where a plurality of the DSCs 50 are included, it is preferable that the DSCs 50 be arrayed in a fixed direction as illustrated in FIGS. 11 and 16 in comparison with a case where portions of the DSCs 50A to 50D are folded back in the middle thereof as illustrated in FIGS. 15 and 23. In this manner, in a case where the DSCs 50 are arrayed in a fixed direction, it is possible to select both an even number and an odd number as the number of the DSC 50 and thus it is possible to freely determine the number of the DSC 50, and it is possible to improve the degree of freedom of the design as a result.

Hereinafter, the content of the invention will be described more specifically with reference to Examples, but the invention is not limited to the following Examples.

Example 1

First, a laminate obtained by forming a transparent conductive layer composed of FTO having a thickness of 1 μm on a transparent substrate which is composed of glass and has a thickness of 1 mm was prepared. Next, as illustrated in FIG. 4, the groove 90 was formed on the transparent conductive layer 12 by a $CO_2$ laser (V-460 manufactured by Universal Laser Systems Inc.), and the transparent conductive layers 12A to 12F were formed. At this time, the width of the groove 90 was set to 1 mm. In addition, each of the transparent conductive layers 12A to 12C was formed so as to have the main body portion having a quadrangular shape of 4.6 cm×2.0 cm and the protruding portion protruding from the side edge portion of one side of the main body portion. In addition, the transparent conductive layer 12D was formed so as to have the main body portion having a quadrangular shape of 4.6 cm×2.1 cm and the protruding portion protruding from the side edge portion of one side of the main body. In addition, the protruding portion 12c of the three transparent conductive layers 12A to 12C among the transparent conductive layers 12A to 12D was constituted by the projecting portion 12d projecting from the one side edge portion 12b of the main body portion 12a and the facing portion 12e which is extended from the projecting portion 12d and faced the main body portion 12a of the adjacent transparent conductive layer 12. In addition, the protruding portion 12c of the transparent conductive layer 12D was constituted only by the projecting portion 12d projecting from the one side edge portion 12b of the main body portion 12a. At this time, the length of the projecting direction (the direction orthogonal to the X direction in FIG. 2) of the projecting portion 12d was set to 2.1 mm and the width of the projecting portion 12d was set to 9.8 mm. In addition, the width of the facing portion 12e was set to 2.1 mm and the length of the facing portion 12e in the extending direction was set to 9.8 mm.

In addition, the transparent conductive layer 12D was formed so as to have not only the main body portion 12a and the protruding portion 12c but also the first current extracting portion 12f and the connecting portion 12g connecting the first current extracting portion 12f and the main body portion 12a. The transparent conductive layer 12E was formed so as to have the second current extracting portion 12h. At this time, the width of the connecting portion 12g was set to 1.3 mm and the length thereof was set to 59 mm. In addition, when the resistance value of the connecting portion 12g was measured by the four probe method, it was 100Ω.

Next, a precursor of the connecting terminal 16 constituted by the conductive material connecting portion 16A and the conductive material non-connecting portion 16B was formed on the protruding portion 12c of the transparent conductive layers 12A to 12C. Specifically, the precursor of the connecting terminal 16 was formed such that a precursor of the conductive material connecting portion 16A was provided on the facing portion 12e and a precursor of the conductive material non-connecting portion 16B was provided on the projecting portion 12d. At this time, the precursor of the conductive material non-connecting portion 16B was formed so as to be narrower than the width of the conductive material connecting portion 16A. The precursor of the connecting terminal 16 was formed by applying the silver paste ("GL-6000X16" manufactured by FUKUDA METAL FOIL & POWDER Co., LTD.) by screen printing and drying it.

Furthermore, a precursor of the current collecting wiring 17 was formed on the connecting portion 12g of the transparent conductive layer 12D. The precursor of the current collecting wiring 17 was formed by applying the silver paste by screen printing and drying it.

In addition, precursors of the external connecting terminals 18a and 18b for extracting the current to the outside were formed on the first current extracting portion 12f and the second current extracting portion 12h of the transparent conductive layer 12A, respectively. The precursors of the external connecting terminals were formed by applying the silver paste by screen printing and drying it.

Moreover, a precursor of the insulating material 33 composed of a glass frit was formed so as to enters into the first groove 90A and to cover the edge portion of the main body portion 12a forming the first groove 90A. The insulating material 33 was formed by applying a paste containing a glass frit by screen printing and drying it. At this time, the edge portion of the transparent conductive layer covered with the insulating material 33 was the part between the groove 90 and the position 0.2 mm away from the groove 90.

In addition, in order to fix the back sheet 80, in the same manner as the insulating material 33, a precursor of the annular coupling portion 14 composed of a glass frit was formed so as to surround the insulating material 33 and to pass through the transparent conductive layer 12D, the transparent conductive layer 12E, and the transparent conductive layer 12F. In addition, at this time, the precursor of the coupling portion 14 was formed such that the precursor of the first current collecting wiring 17 was disposed on the inner side thereof. In addition, the coupling portion 14 was formed such that the first current extracting portion and the second current extracting portion were disposed on the outer side thereof. The coupling portion 14 was formed by applying a paste containing a glass frit by screen printing and drying it.

Furthermore, a precursor of the oxide semiconductor layer 13 was formed on the main body portion 12a of each of the transparent conductive layers 12A to 12D. The precursor of the oxide semiconductor layer 13 was formed by applying the paste for porous oxide semiconductor layer formation containing titania ("PST-21NR" manufactured by JGC C & C) three times by screen printing and drying it, and then by further applying the paste for porous oxide semiconductor layer formation containing titania ("PST-400C" manufactured by JGC C & C) by screen printing and then drying it.

Next, the precursor of the connecting terminal 16, the precursor of the current collecting wiring 17, the precursors of the external connecting terminals 18a and 18b, the precursor of the insulating material 33, the precursor of the coupling portion 14, the precursor of the insulating material 33, and the precursor of the oxide semiconductor layer 13 were fired at 500° C. for 15 minutes to form the connecting terminal 16, the current collecting wiring 17, the external connecting terminals 18a and 18b, the coupling portion 14, the insulating material 33, and the oxide semiconductor layer 13. In this manner, the working electrode 10 was obtained in which the coupling portion 14 is formed and which has the conductive substrate 15. At this time, the width of the conductive material connecting portion of the connecting terminal 16 was 1.0 mm and the width of the conductive material non-connecting portion thereof was 0.3 mm. In addition, the length along the extending direction of the conductive material connecting portion was 7.0 mm and the length along the extending direction of the conductive material non-connecting portion was 7.0 mm. In addition, the dimensions of the current collecting wiring 17, the external connecting terminals 18a and 18b, the coupling portion 14, and the oxide semiconductor layer 13 were as follows, respectively.

Figure 21:
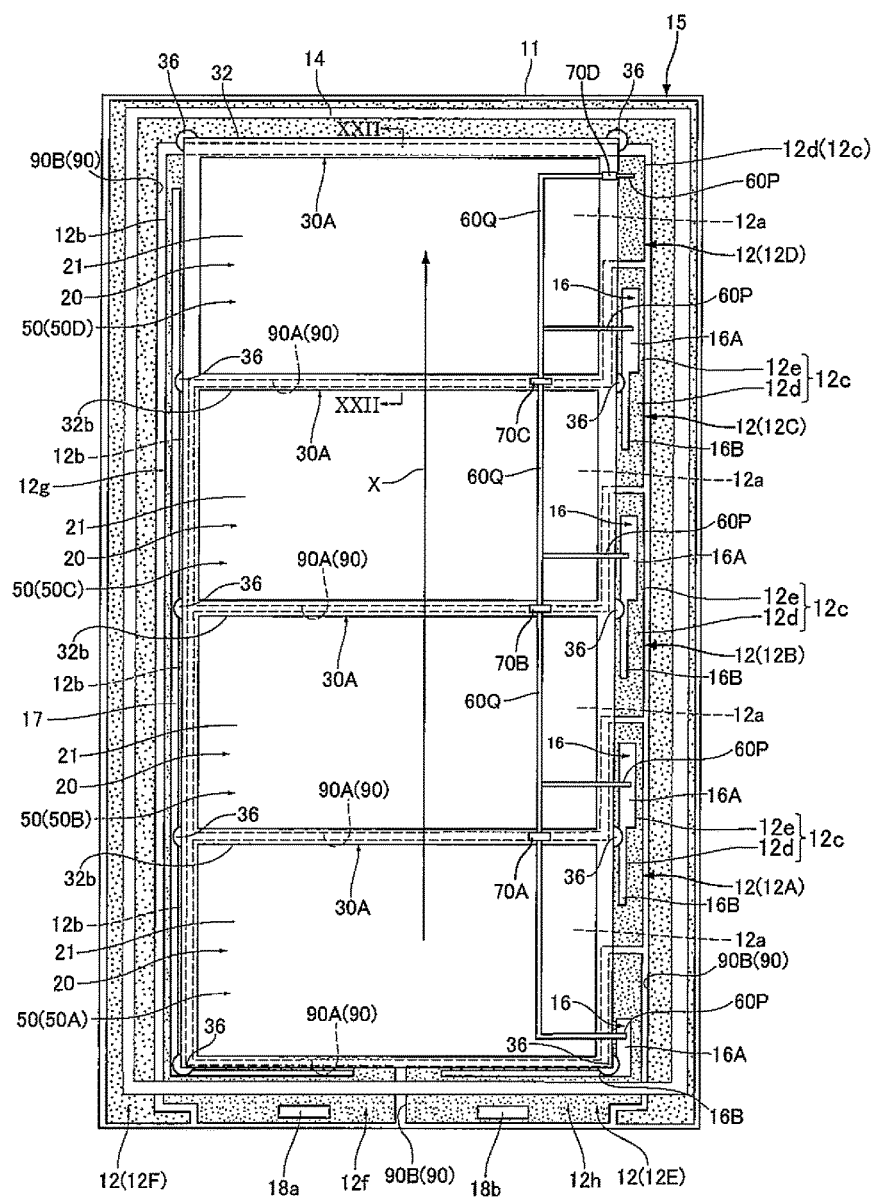
FIG. 21 is a plan view illustrating a portion of FIG. 19.
Figure 22:
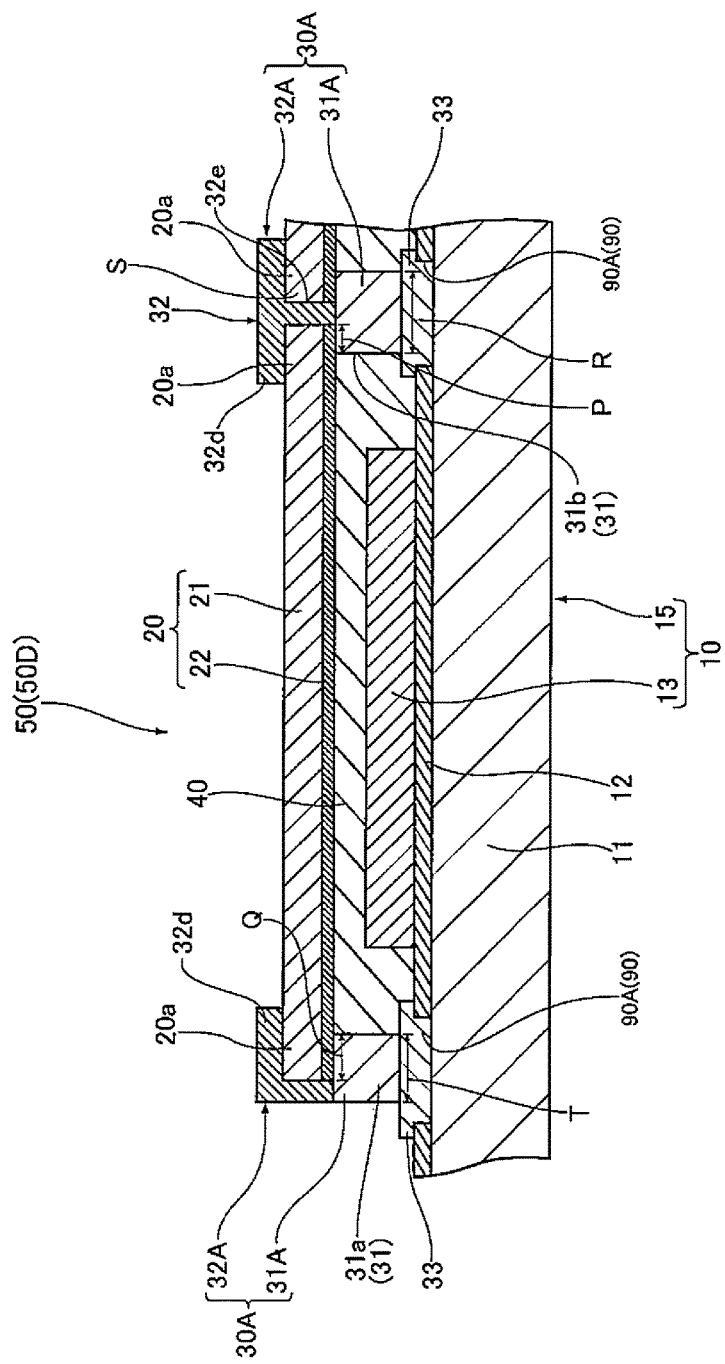
FIG. 22 is a cross-sectional view taken along line XXII-XXII of FIG. 21.

Current collecting wiring 17: 4 µm in thickness, 200 µm in width, 79 mm in length along the X direction in FIG. 2, and 21 mm in length along the direction orthogonal to the X direction in FIG. 2, External connecting terminals 18a and 18b: 20 µm in thickness, 2 µm in width, and 7 mm in length, Coupling portion 14: 50 µm in thickness, 3 mm in width, and Oxide semiconductor layer 13: 14 µm in thickness, 17 mm in length in the X direction in FIG. 2, and 42.1 mm in length in the direction orthogonal to the X direction in FIG. 2

Next, the working electrode was immersed for a whole day and night in a dye solution containing 0.2 mM of a photosensitizing dye consisting of N719 and a mixed solvent prepared by mixing acetonitrile and tert-butanol at a volume ratio of 1:1 as the solvent, and then taken out therefrom and dried, and thus the photosensitizing dye was supported on the oxide semiconductor layer.

Next, the electrolyte composed of 2 M of hexylmethylimidazolium iodide, 0.3 M of n-methylbenzimidazole, 0.1 M of guanidinium thiocyanate in a solvent composed of 3-methoxypropionitrile was coated on the oxide semiconductor layer and dried, and the electrolyte was disposed. At this time, the amount of the electrolyte applied was 31 µL per DSC.

Next, the first integrated sealing portion forming body for forming the first sealing portion was prepared. The first integrated sealing portion forming body was obtained by preparing one sheet of resin film for sealing which had 8.0 cm×4.6 cm×50 µm and was composed of a maleic anhydride-modified polyethylene (trade name: Bynel manufactured by DuPont) and forming four quadrangular-shaped openings in the resin film for sealing. At this time, the first integrated sealing portion forming body was fabricated such that each opening had a size of 1.7 cm×4.4 cm×50 µm, the width of the annular portion was 2 mm, and the width of the partitioning portion partitioning the inner side opening of the annular portion was 2.6 mm.

Thereafter, the first integrated sealing portion forming body was superimposed on the insulating material 33 constituting the conductive substrate 15 and then the first integrated sealing portion forming body was adhered to the insulating material 33 by heating to melt.

Next, four sheets of the counter electrodes were prepared. Two counter electrodes of the four sheets of the counter electrodes were prepared by forming the catalyst layer which had a thickness of 5 nm and was composed of platinum on the titanium foil of 4.6 cm×1.9 cm×40 µm by the sputtering method. The rest two counter electrodes of the four sheets of the counter electrodes were prepared by forming the catalyst layer which had a thickness of 5 nm and was composed of platinum on the titanium foil of 4.6 cm×2.0 cm×40 µm by the sputtering method. In addition, another first integrated sealing portion forming body was prepared and this first integrated sealing portion forming body was adhered to the surface facing the working electrode of the counter electrode in the same manner as above.

Thereafter, the first integrated sealing portion forming body adhered to the working electrode was allowed to face the first integrated sealing portion forming body adhered to the counter electrode, and thus the first integrated sealing portion forming bodies were superimposed on each other. The first integrated sealing portion forming bodies were then melted by heating while applying a pressure to the first integrated sealing portion forming bodies in this state. At this time, the heating and melting was performed while pressing the inner side of the annular portion adjacent to the bonding edge portion of the main body portion of the counter electrode. Thus, an annular convex bending portion was formed at a position adjacent to the bonding edge portion of the counter electrode, and at the same time, a concave bending portion was formed at an inner side of an annular bending portion. In this manner, the first sealing portion was formed between the working electrode and the counter electrode. At this time, the width P of the adhesive portion between the partitioning portion of the first integrated sealing portion and the surface of the counter electrode close to the conductive substrate, the width Q of the adhesive portion between the annular portion of the first integrated sealing portion and the surface of the counter electrode close to the conductive substrate, the width R of the partitioning portion of the first integrated sealing portion, and the width T of the annular portion are as follows:

P=1.0 mm
Q=2.0 mm
R=2.6 mm
T=2.2 mm

Next, the second integrated sealing portion was prepared. The second integrated sealing portion was obtained by preparing one sheet of resin film for sealing which had 8.0 cm×4.6 cm×50 µm and was composed of maleic anhydride modified polyethylene (trade name: Bynel, manufactured by Du Pont) and forming four quadrangular-shaped openings in the resin film for sealing. At this time, the second integrated sealing portion was fabricated such that each opening had a size of 1.7 cm×4.4 cm×50 µm, the width of the annular portion was 2 mm, and the width of the partitioning portion partitioning the inner opening of the annular portion was 2.6 mm. The second integrated sealing portion was bonded to the counter electrode so as to sandwich the edge portion of the counter electrode together with the first integrated sealing portion. At this time, the second integrated sealing portion was bonded to the counter electrode and the first integrated sealing portion by heating the first integrated sealing portion and the second integrated sealing portion to melt while pressing the second integrated sealing portion to the counter electrode.

Next, the desiccant sheet was bonded on the metal substrate of each counter electrode with double-sided tape. The dimensions of the desiccant sheet were 1 mm in thickness×3 cm in length×1 cm in width, and Zeosheet (trade name, manufactured by Shinagawa Chemicals Co., Ltd.) was used as the desiccant sheet.

Next, as illustrated in FIG. 2, the bypass diodes 70A to 70C were respectively fixed to the three partitioning portions of the second integrated sealing portion by applying the low-temperature curing type silver paste (Dotite D500 manufactured by FUJIKURAKASEI CO., LTD.) so as to continue from the terminals at both ends of the bypass diode to the metal substrate 21 of the counter electrode 20. In addition, the bypass diode 70D was fixed on the annular portion of the second integrated sealing portion of the DSC 50D among the four DSCs 50A to 50D by applying the above low-temperature curing type silver paste so as to continue from one terminal of the terminals at both ends of the diode to the counter electrode. In this manner, the conductive material 60Q was formed so as to link the two adjacent bypass diodes with respect to the four bypass diodes 70A to 70D. At this time, the conductive material 60Q was formed by curing the above low-temperature curing type silver paste at 30° C. for 12 hours. RB751V-40 manufactured by ROHM was used as the bypass diode.

In addition, the conductive material 60P was formed by applying the low-temperature curing type silver paste (Dotite D-500 manufactured by FUJIKURAKASEI CO., LTD.)

and curing it so as to connect each of the conductive materials 60Q between the bypass diodes and the conductive material connecting portion on the three transparent conductive layers 12A to 12C, respectively. Moreover, for the bypass diode 70A, the conductive material 60P was formed by applying the above low-temperature curing type silver paste and curing it so as to be connected with the conductive material connecting portion on the transparent conductive layer 12E. At this time, the conductive material 60P was formed by curing the above low-temperature curing type silver paste at 30° C. for 12 hours.

Next, the butyl rubber ("Aikameruto" manufactured by Aica Kogyo Co., Ltd.) was coated on the coupling portion 14 with a dispenser while being heated at 200° C. to form a precursor of the adhesive portion. On the other hand, a laminate, which is obtained by laminating a polybutylene terephthalate (PBT) resin film (50 μm in thickness), aluminum foil (25 μm in thickness), and a film (50 μm in thickness) composed of Bynel (trade name, manufactured by Du Pont) in this order, was prepared. Thereafter, the peripheral portion of this laminate 80A was superimposed on the precursor of the adhesive portion 80B, and a pressure was applied thereto for 10 seconds. In this manner, the back sheet 80 constituted by the adhesive portion 80B and the laminate 80A was obtained on the coupling portion 14. The DSC module was obtained in the manner described above.

Example 2

A DSC module was fabricated in the same manner as in Example 1 except that the concave bending portion was not formed by increasing an applied amount of electrolyte from 31 μL to 50 μL per DSC.

Example 3

A DSC module was fabricated in the same manner as in Example 1 except that, when heating and melting were performed while pressing the first integrated sealing portion forming body, by performing the heating and melting while pressing the inner side portion of the annular portion adjacent to the bonding edge portion of the main body portion of the counter electrode and a portion (U-shaped portion) of the annular portion, a straight-lined convex bending portion was formed in a portion of the annular portion adjacent to the bonding edge portion of the counter electrode, and at the same time, a concave bending portion was formed at a position facing the convex bending portion.

Example 4

A DSC module was fabricated in the same manner as in Example 1 except that the first integrated sealing portion forming body for forming the first sealing portion was prepared as follows.

Namely, first, the first integrated sealing portion forming body was fabricated by preparing one sheet of a resin film for sealing which had 5.0 cm×8.4 cm×50 μm and was composed of a maleic anhydride-modified polyethylene (trade name: Bynel manufactured by DuPont), and processing the resin film for sealing with a cutting plotter so that four quadrangular-shaped openings were formed and the outward-swelling portions were formed at the outer sides of the intersecting portions of the linear portions to be formed at that time. At this time, the edge portions of the outward-swelling portions were formed so as to have a circular arc shape. In addition, the first integrated sealing portion forming body was fabricated so that each opening had a size of 1.7 cm×4.4 cm×50 μm, the width of the linear portion constituting the annular portion was 2 mm, and the width of the linear portion (partitioning portion) partitioning the inner openings of the annular portion was 2.6 mm.

Example 5

A DSC module was fabricated in the same manner as in Example 1 except that the first integrated sealing portion forming body for forming the first sealing portion was prepared as follows.

Namely, first, the first integrated sealing portion forming body was fabricated by preparing one sheet of a resin film for sealing which had 5.0 cm×8.4 cm×50 μm and was composed of a maleic anhydride-modified polyethylene (trade name: Bynel manufactured by DuPont), and processing the resin film for sealing with a cutting plotter so that four quadrangular-shaped openings were formed, the outward-swelling portions were formed at the outer sides of the intersecting portions of the linear portions to be formed at that time and the inward-swelling portions swelling toward the inner sides of the intersecting portions were formed. At this time, the edge portions of the outward-swelling portions and the edge portions of the inward-swelling portions were formed so as to have a circular arc shape. In addition, the first integrated sealing portion forming body was fabricated so that each opening had a size of 1.7 cm×4.4 cm×50 μm, the width of the linear portion constituting the annular portion was 2 mm, and the width of the linear portion (partitioning portion) partitioning an inner opening of the annular portion was 2.6 mm.

Comparative Example 1

A DSC module was fabricated in the same manner as in Example 1 except that, when heating and melting were performed while pressing the first integrated sealing portion forming body, by not pressing the inner side portion of the annular portion adjacent to the bonding edge portion of the main body portion of the counter electrode, the convex bending portion and the concave bending portion were not formed.

Comparative Example 2

A DSC module was fabricated in the same manner as in Example 1 except that the convex bending portion was not formed and only the concave bending portion was formed by decreasing an applied amount of electrolyte from 31 μL to 17 μL per DSC.

(Evaluation of Characteristics)
(Durability)

With respect to the DSC modules obtained in Examples 1 to 5 and Comparative Examples 1 and 2, a heat cycle test was performed with a cycle of increasing a temperature from −40° C. to 90° C. and, after that, decreasing the temperature from 90° C. to −40° C. as one cycle. Next, the number of cycles until the sealing was destructed was measured. The results are listed in Table 1. Meanwhile, at this time, with respect to the DSC modules, it was tested every 50 cycles whether the sealing was destructed. The determination as to whether or not the sealing was destructed was made as follows. Namely, with respect to each DSC, the photoelectric conversion efficiency was measured, and with respect to the DSC where a change in current value generated is 10% or more, it was observed by an optical stereoscopic microscope whether bubbles mixed into the electrolyte existed or not. In a case where bubbles having a diameter of 2 mm or more existed, it was determined that the sealing was destructed.

TABLE 1

|  | Convex Bending Portion | Concave Bending Portion | Outward-Swelling Portion | Inward-Swelling Portion | Durability Number of Cycles Until Sealing Is Destructed (cycles) |
|---|---|---|---|---|---|
| Example 1 | Existence (annular shape) | Existence | None | None | 500 or more |
| Example 2 | Existence (annular shape) | None | None | None | 450 |
| Example 3 | Existence (a portion) | Existence | None | None | 450 |
| Example 4 | Existence (annular shape) | Existence | Existence | None | 500 or more |
| Example 5 | Existence (annular shape) | Existence | Existence | Existence | 500 or more |
| Comparative Example 1 | None | None | None | None | 150 |
| Comparative Example 2 | None | Existence | None | None | 250 |

As listed in Table 1, it was found out that the number of cycles for the DSC modules of Examples 1 to 5 is larger than the number of cycles for the DSC modules of Comparative Examples 1 to 2.

It was confirmed from the results described above that the DSC modules of the invention have excellent durability.

The inventors further performed the following experiments for reference.

Experimental Example 1

A DSC module was fabricated in the same manner as in Example 1 except that, when heating and melting were performed while pressing the first integrated sealing portion forming body, by not pressing the inner side portion of the annular portion adjacent to the bonding edge portion of the main body portion of the counter electrode, the convex bending portion and the concave bending portion were not formed, and the first integrated sealing portion forming body for forming the first sealing portion was prepared as follows.

Namely, first, the first integrated sealing portion forming body was fabricated by preparing one sheet of a resin film for sealing which had 5.0 cm×8.4 cm×50 μm and was composed of a maleic anhydride-modified polyethylene (trade name: Bynel manufactured by DuPont) and processing the resin film for sealing with a cutting plotter so that four quadrangular-shaped openings were formed and outward-swelling portions were formed at the outer sides of the intersecting portions of the linear portions to be formed at that time. At this time, the edge portions of the outward-swelling portions were formed so as to have a circular arc shape. In addition, the first integrated sealing portion forming body was fabricated so that each opening had a size of 1.7 cm×4.4 cm×50 μm, the width of the linear portion constituting the annular portion was 2 mm, and the width of the linear portion (partitioning portion) partitioning inner openings of the annular portion was 2.6 mm.

Experimental Example 2

A DSC module was fabricated in the same manner as in Experimental Example 1 except that, when the resin film for sealing was processed in order to form the first integrated sealing portion, the outward-swelling portions were formed at the outer sides of the intersecting portions of the linear portions to be formed, and the inward-swelling portions swelling toward the inner sides of the intersecting portions were formed.

Experimental Example 3

A DSC module was fabricated in the same manner as in Experimental Example 1 except that, when the resin film for sealing was processed in order to form the first integrated sealing portion, the outward-swelling portions were not formed at the outer side of the intersecting portions of the linear portions to be formed.

(Evaluation of Characteristics)

(Durability)

With respect to the DSC modules obtained in Experimental Examples 1 to 3, the photoelectric conversion efficiency ($\eta_C$) was measured. Subsequently, with respect to the DSC modules obtained in Experimental Examples 1 to 3, after a heat cycle test was performed in accordance with JIS C 8938, the photoelectric conversion efficiency ($\eta$) was also measured. Next, a retention ratio of photoelectric conversion efficiency (photoelectric conversion retention ratio) was calculated based on the following formula.

Retention Ratio of Photoelectric Conversion Efficiency (%)=$\eta/\eta_0 \times 100$ The results are listed in Table 2.

TABLE 2

|  | Outward-Swelling Portion | Inward-Swelling Portion | Durability Photoelectric Conversion Retention Ratio (%) |
|---|---|---|---|
| Experimental Example 1 | Existence | None | 98 |
| Experimental Example 2 | Existence | Existence | 99 |
| Experimental Example 3 | None | None | 73 |

It was found out from the results listed in Table 2 that the photoelectric conversion retention ratios of the DSC modules of Experimental Examples 1 and 2 are higher than that of the DSC module of Experimental Example 3.

It was confirmed from the results described above that the DSC modules of the invention have excellent durability.

EXPLANATIONS OF REFERENCE NUMERALS

11 . . . transparent substrate (first base material)
12 . . . transparent conductive film (first base material)
13 . . . oxide semiconductor layer
15 . . . conductive substrate (first base material, first electrode)
16 . . . connecting terminal (first base material)
20, 520, 1020 . . . counter electrode (second base material, second electrode)
20a . . . bonding edge portion
20b . . . main body portion
20c . . . convex bending portion
20d . . . concave bending portion
30A . . . sealing portion
31 . . . first integrated sealing portion
33 . . . insulating material (first base material)
34 . . . linear portion
35 . . . intersecting portion
36 . . . outward-swelling portion
36a . . . edge portion
37 . . . inward-swelling portion
38, 138, 238 . . . bonding surface
50, 50A to 50D . . . dye-sensitized solar cell
100 to 1100 . . . dye-sensitized solar cell module (dye-sensitized solar cell element)
501, 1001 . . . insulating substrate (second base material)

The invention claimed is:

1. A dye-sensitized solar cell element comprising at least one dye-sensitized solar cell,
wherein each of the at least one dye-sensitized solar cell includes:
a first base material including a transparent substrate;
a second base material having a first surface which faces the first base material and a second opposite surface;
an annular sealing portion which bonds the first base material and the second base material; and
an oxide semiconductor layer which is provided between the first base material and the second base material,
wherein the second base material has flexibility,
wherein the second base material includes an annular bonding edge portion and a main body portion, the annular bonding edge portion including a bonding surface facing the first base material and directly bonded to the sealing portion, and
wherein the main body portion has a first portion and a second portion, the first portion and the second portion having flexibility,
the first portion is a convex bending portion which is convex along the second surface such that a first height being a height from the first base material to the first portion along the second surface is greater than a second height being a height from the first base material to the second portion along the second surface;
wherein a third height being a height from the first base material to the edge portion along the second surface is greater than the second height.

2. The dye-sensitized solar cell element according to claim 1, wherein the first base material is configured as a first electrode, and the second base material is configured as a second electrode.

3. The dye-sensitized solar cell element according to claim 2,
wherein the oxide semiconductor layer is provided on the first electrode, and
wherein the second portion of the main body portion includes a concave bending portion which is bent to be concave toward a side close to the oxide semiconductor layer.

4. The dye-sensitized solar cell element according to claim 1, wherein the convex bending portion is arranged at a position adjacent to the bonding edge portion.

5. The dye-sensitized solar cell element according to claim 1, wherein a bonding surface of the sealing portion bonded to at least one of the first base material and the second base material includes:
a plurality of linear portions; and
outward-swelling portions which swell toward outer sides of intersecting portions of the linear portions.

6. The dye-sensitized solar cell element according to claim 5, wherein the bonding surface of the sealing portion bonded to at least one of the first base material and the second base material further includes inward-swelling portions which swell toward inner sides of the intersecting portions.

7. The dye-sensitized solar cell element according to claim 1,
wherein the at least one dye-sensitized solar cell is a plurality of the dye-sensitized solar cells,
wherein the transparent substrate is used as a common substrate of the plurality of the dye-sensitized solar cells,
wherein the sealing portions of two dye-sensitized solar cells adjacent to each other among the plurality of the dye-sensitized solar cells are integrated to constitute an integrated sealing portion, and
wherein the bonding surface of the integrated sealing portion bonded to at least one of the first base material and the second base material includes:
a plurality of linear portions; and
outward-swelling portions which swell toward outer sides of intersecting portions of the linear portions.

8. The dye-sensitized solar cell element according to claim 7, wherein the bonding surface of the integrated sealing portion bonded to at least one of the first base material and the second base material further includes inward-swelling portions which swell toward inner sides of the intersecting portions.

9. The dye-sensitized solar cell element according to claim 5, wherein an edge portion of the outward-swelling portion has a circular arc shape.

10. The dye-sensitized solar cell element according to claim 1, wherein the maximum height of the first portion is higher than the height of the annular bonding edge portion from the transparent substrate, and
the height of the second portion is the same as, or lower than the height of the annular bonding edge portion.

11. The dye-sensitized solar cell element according to claim 1, wherein the second base material includes a metal substrate.

12. The dye-sensitized solar cell element according to claim 2, wherein the oxide semiconductor layer supports a photosensitizing dye and is provided on the first electrode.

* * * * *